United States Patent [19]

Harris et al.

[11] Patent Number: 5,652,879
[45] Date of Patent: Jul. 29, 1997

[54] DYNAMIC VALUE MECHANISM FOR COMPUTER STORAGE CONTAINER MANAGER ENABLING ACCESS OF OBJECTS BY MULTIPLE APPLICATION PROGRAMS

[75] Inventors: Jared M. Harris, Berkeley; Ira L. Ruben, San Jose, both of Calif.

[73] Assignee: Apple Computer, Inc., Cupertino, Calif.

[21] Appl. No.: 478,428

[22] Filed: Jun. 7, 1995

Related U.S. Application Data

[63] Continuation of Ser. No. 107,449, Aug. 16, 1993, abandoned, which is a continuation-in-part of Ser. No. 60,809, May 12, 1993.

[51] Int. Cl.$^6$ ..................................................... G06F 7/06
[52] U.S. Cl. .................... 395/612; 395/614; 395/615; 395/427; 395/602
[58] Field of Search ........................................ 395/612, 614, 395/615, 427, 602

[56] References Cited

U.S. PATENT DOCUMENTS

| 4,768,149 | 8/1988 | Konopik et al. | 364/200 |
|---|---|---|---|
| 5,151,987 | 9/1992 | Abraham et al. | 395/575 |
| 5,175,810 | 12/1992 | Young et al. | 395/148 |
| 5,206,951 | 4/1993 | Khoyi et al. | 395/261.9 |
| 5,341,478 | 8/1994 | Travis, Jr. et al. | 395/200 |

FOREIGN PATENT DOCUMENTS

| 90480155 | 10/1990 | European Pat. Off. | G06F 9/44 |
|---|---|---|---|
| 91304227 | 10/1991 | European Pat. Off. | G06F 9/44 |
| 92480078 | 3/1992 | European Pat. Off. | G06F 9/44 |
| 0 578 204 A2 | 1/1994 | European Pat. Off. | G06F 15/413 |
| 0 578 209 A2 | 1/1994 | European Pat. Off. | G06F 15/403 |

OTHER PUBLICATIONS

Douglis, Fred; Ousterhout, John, "Log–Structured File Systems", Spring compcon89 of the IEEE Computer Society (Feb. 27–Mar. 3, 1989), pp. 124–129.
Harris, Jed, "Bento Specification", Revision 0.9, Apple Computer, Inc. (Nov. 4, 1991).
Harris, Jed, "Bento Specification", Revision 0.95, Apple Computer, Inc. (Nov. 15, 1991).
Harris, Jed, "Bento Specification", Revision 1.0a1, Apple Computer, Inc. (Dec. 10, 1991).
Harris, Jed, "Bento Specification", Revision 1.0a2, Apple Computer, Inc. (Feb. 16, 1992).
Harris, Jed, "Bento Specification", Revision 1.0a3, Apple Computer, Inc. (Feb. 17, 1992).
OLE Programmer's Reference 1, Overview, 1992, Microsoft Press, Redmond, WA, pp. 161–162.
D'Andrea, Robert J., et al., "Object–Oriented Programming: Concepts and Languages", Proceedings of the IEEE 1990 National Aerospace and Electronics Conference NAECON 1990 (May 21, 1990) vol. 2, pp. 634–639.

Primary Examiner—Kevin A. Kriess
Assistant Examiner—Lucien Toplu
Attorney, Agent, or Firm—Fliesler, Dubb, Meyer & Lovejoy, L.L.P.

[57] ABSTRACT

Computer apparatus stores a subject value and a chain of sequentially associated value handlers for the subject value. The chain includes a top value handler and a bottom value handler, each of the value handlers in the chain except the bottom value handler invoking the respective next value handler when invoked, the bottom value handler performing an operation on the subject value when invoked. The value operations can be data read operations, data write operations, etc., and the value handlers in the chain can perform data transformations and/or data redirections, transparently to its caller.

30 Claims, 5 Drawing Sheets

DYNAMIC VALUE MECHANISM FOR COMPUTER STORAGE CONTAINER MANAGER ENABLING ACCESS OF OBJECTS BY MULTIPLE APPLICATION PROGRAMS

CROSS-REFERENCE TO RELATED APPLICATION

This is a continuation of U.S. patent application Ser. No. 08/107,449, filed Aug. 16, 1993, now abandoned, which is a continuation-in-part of U.S. patent application Ser. No. 08/060,809, entitled STORAGE EAGER FOR COMPUTER SYSTEM, inventors Shui Wing Lo, David J. Austin, Tantek I. Celik, Steven J. Szymanski, and Jared M. Harris, filed May 12, 1993, which is incorporated herein by reference in its entirety.

BACKGROUND

Increasingly, documents and other collections of stored information are made up of multiple content elements, such as text, tables, images, formatting information, mathematical equations and graphs. Often content is created using one application program and then included in documents created by other applications. Subsequently, content elements may be copied out of a document and used in yet another document, and so on.

In the past, different applications typically had no way to exchange multiple content elements, unless they had a "private contract" about the format to be used. Furthermore, one application typically had no way to find the content elements in another application's document, so typically it was not able to obtain content elements from the other application's documents even if it knew the format. Moreover, every application developer who wanted to store multiple content elements in a document typically had to develop a proprietary object storage mechanism.

The use of multiple content elements in a document implicates at least two difficult issues: where each element is located and what the format of the data is. Regarding the first of these issues, it would be desirable if the data in a particular element could be stored in memory, in a local persistent storage device, across the network, or even created dynamically, all in a manner which is transparent to the application program which is operating on an element. In this way the limited resources available to application program developers can be directed toward enhancement of functionality rather than dealing with multiple types of storage devices.

Similarly, with regard to the second issue, it would be desirable if each different content element could have stored in association with it all of the routines which are needed to manipulate it, again, transparently to the application program. This, too, would free up developers' resources for more useful purposes.

In a general way, an individual developer might obtain some of the transparency described above by programming the application using an object-oriented programming language such as C++. Object-oriented programming is described in many references, including, for example, G. Booch, "Object-Oriented Design With Applications" (Benjamin/Cummings Publishing Company: 1991), incorporated herein by reference. Such languages often support the grouping together of both an item of data and a set of "methods" to manipulate the data, in a single "object". These languages also often include, through a mechanism known as "classing" and "sub-classing" of objects, a way to define inheritance relationships. In an inheritance relationship, if a routine to perform a certain type of manipulation is not defined for a particular object in a particular class, then the corresponding routine in the parent class is used instead.

While these languages can be used to address the problems described above for handling multiple content elements, it is not clear how that can be done. Certainly the languages themselves do not provide guidance on how they can be used for such purposes. For example, the inheritance mechanism in C++ is a compile-time mechanism.

The languages also permit a method for a given object (whether the method is defined specifically for the object's own class or is inherited from a superclass) to invoke other methods for operating on the given object. The method can also invoke whatever corresponding method is defined for the object's superclass, for operating on the given object, and need not know exactly which routine that might be. While these features permit some degree of hiding or encapsulation, they do not provide enough flexibility for easy development of application programs which manipulate multiple content elements since to some degree, the application program still needs to know the type of the object it is operating on.

SUMMARY OF THE INVENTION

According to the invention, roughly described, a set of procedures are defined which permit substantially arbitrary composability of chains of handlers. The procedures follow rules which render them independent of the "type" of the value for which they are called, as viewed by the caller. Thus application programs can be written at only a high level of functionality, without needing to be concerned with the differences in the way different types of values need to be handled.

The procedures determine which handler to call to perform a given operation in dependence upon the type of the object for which the procedure was invoked. The handlers, too, are relatively easy to write because like the application program, the rules permit the handlers to call the very same set of procedures (recursively if the very same procedure is called) as are available to the application program. Thus like the application program, handlers too can be written without knowledge of any characteristics of the object for which they are invoked other than the characteristics defining the type for which the handler is specifically written. For example, a read handler for a type which defines a data compression/decompression algorithm need never know where the data is physically located since it merely calls the predefined read value procedure to obtain the data to decompress.

Types can be defined in a tree structure. This further simplifies the writing of handlers since the different characteristics of a type can be divided into many small components, each defined by a different sub-type on the tree. Thus each handler can be written to accomplish only a limited objective (for example an I/O redirection or a data transformation). The predefined procedures automatically follow the chain of handlers defined by a type tree, by knowing where in the chain a given caller of the procedure is. Neither the application program nor the handlers themselves need keep track of this information.

Additionally, the predefined procedures make no assumptions about the types in a type tree. An application developer can define novel types as required by dividing them into subtypes (if desired) and writing handlers for each subtype. As mentioned, the complexity of the handlers depend only on the complexity of the transformation or redirection which they are to individually perform, not on the complexity of either the type tree or the procedures which implement the present invention. So long as the handlers follow certain rules of good behavior, the predefined procedures will be able to follow any such user-defined type tree. Additional procedures are provided for associating the individual handlers to their corresponding types (subtypes), and for building the type trees themselves.

To implement the above procedures, computer apparatus stores a subject value and a chain of sequentially associated value handlers for the subject value. The chain includes a top value handler and a bottom value handler, each of the value handlers in the chain except the bottom value handler invoking the respective next value handler when invoked, the bottom value handler performing an operation on the subject value when invoked. The value operations can be data read operations, data write operations, etc., and the value handlers in the chain can perform data transformations and/or data redirections, transparently to its caller.

The dynamic value chain is not stored in persistent storage; rather it is created when an application program desires to perform a value operation on the subject value. The subject value has a type associated with it which determines the value handlers to be placed in the chain. The chain can have more than one value handler in it for a given value operation if the type associated with the subject value is made up of a hierarchy of sub-types.

BRIEF DESCRIPTION OF THE DRAWINGS

The invention will be described with respect to particular embodiments thereof, and reference will be made to the drawings, in which.

DETAILED DESCRIPTION

Figure 1:
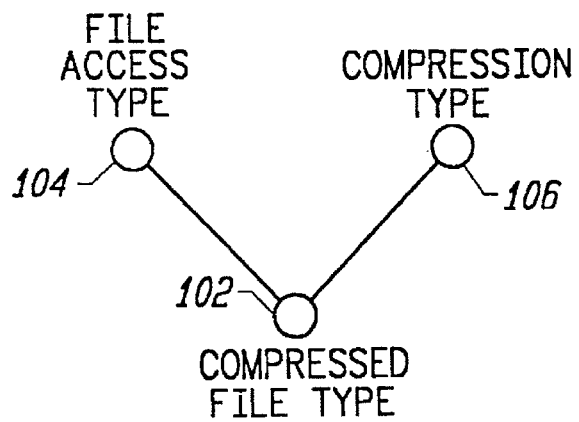
FIGS. 1 and 2 illustrate type trees.

The embodiment described herein takes the form of a Container Manager and its associated data structures which can be used by developers of a wide variety of types of application programs. The Container Manager includes a number of C language type definitions and a number of procedures for implementing the functionality provided by the Container Manager. Together they provide a common application program interface (API) for the different types of application programs.

The structures are described first with respect to their logical organization and subsequently their physical organization in the storage apparatus managed by the container manager. That is, they will be described first with respect to the view which the container manager software provides to an application programmer via the API, and subsequently with respect to the way that logical organization is actually implemented in the present embodiment. While many of the advantages of the present invention derive from the logical organization, it will be apparent that such logical organization implies certain physical structures which are required to maintain the metaphor as viewed by the application developer. The physical organization described hereinafter includes many inventive aspects of the invention, but it is by no means the only physical structure which can support the logical organization presented to the application developer.

TABLE OF CONTENTS

I. GENERAL OVERVIEW
  A. Overview of Container Manager Entities
  B. Overview of Types and Dynamic Values
  C. Format Overview
  D. Format Definition
II. IMPLEMENTATION
  A. Hardware
  B. In-Memory Data Structures
  C. Routines
    1. Session Operations
    2. Object Operations
    3. Type and Property Operations
    4. Value Operations
III. DYNAMIC VALUE HANDLERS
  A. Sample Session Flow
  B. Sample Value Handlers
APPENDIX A
APPENDIX B
APPENDIX C
APPENDIX D

I. GENERAL OVERVIEW

In the present embodiment, an object is a collection of data that "hangs together" and that can be referenced by other data. Objects can be simple or complex, small (a few bytes) or large (up to $2^{64}$ bytes). Compared with objects in languages such as C++, objects of the Container Manager are typically larger and more complex, because they represent user meaningful content elements, rather than the atoms and molecules used to build this content.

For example, a sequence of bytes of data would not by itself be an object, because we can only understand the bytes if we know how they will be used. A paragraph, an image, etc. can be an object if it contains enough information so that we know how to interpret it. Typically an object contains information about what kind of object it is, and some data, which provides the content of the object. In this description, the information "about" the object is called metadata, and the content of the object is called its value.

The Container Manager groups objects in an object container, which is some form of data storage or transmission (such as a file, a piece of RAM, or an inter-application message) that is used to hold one or more objects (both their metadata and their values). These containers are defined by a set of rules for storing multiple objects in a such a container, so that software that understands the rules can find the objects, figure out what kind of objects they are, and use them correctly. The rules accommodate a wide variety of different kinds of objects, different ways that applications want to use objects, and system considerations about how data can be stored.

The Container Manager provides a container definition that can conveniently, efficiently, and reliably hold all the different kinds of objects that users and applications want to group together, store, and exchange. The Container Manager does not define how any given object is structured internally (within its value) so as not to limit the formats which an application developer may want to define. Objects stored in a container can have proprietary or standard formats, they can be designed to use the Container Manager mechanisms or they can be completely ignorant of the existence of the Container Manager.

A. Overview of Container Manager Entities

The Container Manager manipulates and stores data using primary and secondary entities. The primary entities used by the Container Manager are containers, objects, properties, values, and types.

Containers. Every object is in some container. An object consists of a set of properties. The properties are not in any particular order. Each property consists of a set of values with distinct types. The values are not in any particular order. Every object must have at least one property, and that property must have at least one value. Each value consists of a variable length sequence of bytes.

The Container Manager knows very little about a container beyond the objects in it. However, the container always contains a distinguished object, and applications can add arbitrary properties to that object, so applications can specify further information about the container if they wish.

Containers are often files, but they can also be many other forms of storage. For example, in various applications developers already support the following types of containers: blocks of memory, the clipboard, network messages, and Container Manager values. Undoubtedly other types of containers will be useful as well.

Objects. Each Container Manager object has a persistent ID which is unique within its container. Other than that, objects don't really exist independent of their properties. An object contains no information beyond what is stored in its properties.

Properties. A property defines a role for a value. Properties are like field names in a record or struct, with two differences. First, properties can be added freely to an object, so an application should never assume an object only has the properties it knows about. Second, property names are globally unique, so that they can never collide when various different applications add properties to the same object. This also means that the same property name always means the same thing, no matter what object it is in. Properties are distinct from types, just as field names are distinct from the data type of the field.

For example, different properties of an object might indicate the name of an object, the author of the object, a comment, a copyright notice, and so on. These different properties could all have values of the same type: string.

Conversely, a property indicating the date created might have a string, Julian day, or OSI standard date representation. These different formats would not be indicated by the property, but by the type (see below).

Values. Values are where the data is actually stored. In terms of physical location, this data might actually be stored anywhere in a container. In fact, it can be broken up into any number of separate pieces, and the pieces can be stored anywhere. (See the discussion of value segments below.)

Each value may range in size from 0 bytes to $2^{64}$ bytes, although that range can differ in a different embodiment. The overhead per value varies depending on the circumstances. For an object with a single value, the typical overhead will be 21 bytes. For a small value which is one of several values associated with a property, the overhead can be as low as five bytes.

Types. The type of a value describes the format of that value. Types record the structure of a value, whether it is compressed, what its byte ordering is, and so on. The Container Manager provides an open-ended mechanism, so that types can be extended to include whatever metadata is required.

To continue the example above, the type of a string value could indicate the alphabet, whether it was null terminated, and possibly other information (such as the intended language). It might also indicate that the string was stored in a compressed form, and could indicate the compression technique, and the dictionary if one was required. If the string used multi-byte characters, and the byte-ordering was not defined by the alphabet, the type could indicate the byte-ordering within the characters.

The Container Manager defines an inheritance mechanism to make building complex types like this efficient. The structure of types is tied into the mechanism for accessing values, so that the type associated with a value causes the appropriate code to be invoked to access the value, decompress it, byte-swap it, and so on. The specific mechanism for doing this is referred to herein as Dynamic Values.

Secondary Entities. In addition to the primary entities manipulated by the Container Manager, there are several additional entities that play supporting roles in the Container Manager design. These entities are important to fully understand how The Container Manager works, but they do not significantly change the picture given above.

Type and property descriptions. Each property associated with a value is actually a reference to a property description. Similarly, the type of a value is actually a reference to a type description. These type and property descriptions are objects, and their IDs are drawn from the same name-space as other object IDs.

Many type and property descriptions will simply consist of the globally unique name of the type or property. To continue the example above further, the type of a string of 7-bit ASCII, not compressed or otherwise transformed, would simply be described by a globally unique name. This would allow applications to recognize the type.

References to type and property descriptions are distinct from references to ordinary objects in the API to allow language type checking to catch errors in the manipulation of type and property references. However, type and property references can still be passed to the Container Manager routines which manipulate user-defined objects and values, so that value manipulation can be done on types and properties in the same manner as it can be done on user-defined objects.

Globally unique names. Globally unique names are public or private identifiers in a format defined by the ISO 9070 Public Text Identifier standard. They are simply strings written in a subset of 7 bit ASCII. They begin with a name that is assigned by a naming authority designated by ISO (companies can easily register as naming authorities). After this come additional segments, as determined by the naming authority, each of which is unique in the context of the previous segments.

The most common globally unique names will be generated by system vendors or commercial application developers, and may be registered. However, in many cases names will be generated by vertical application developers to record their local types and properties. To meet this need, the naming rules allow for local creation of unregistered unique names, for example by using a product serial number as one of the name segments.

IDs. The Container Manager assigns each object a persistent ID that is unique within the container in which the object is created. These IDs are never reused once they have been assigned, so even if an object is deleted, its ID will never be reassigned.

These IDs are obviously essential to the functioning of the Container Manager format, but they do not appear directly in the API. The only points at which an application actually deals with anything corresponding to an ID is when it needs to store an object reference into a value, or find the object corresponding to a reference retrieved from a value. Even in this case, however, the API does not give the application direct access to an object ID, but only to a token that corresponds to the ID in the context of that particular value. This hiding of actual IDs permits the Container Manager to perform reference tracking.

Refnums. In the API, types, properties, and objects are referred to using opaque reference numbers provided by the Container Manager. The refnums are much more convenient to use than IDs because they are unique within the session, while an ID would need to be used together with a container reference. Since they are opaque, they allow implementations of the API that support caching schemes in which only portions of the container metadata are in memory at any given time.

Refnums have no persistent meaning, so they cannot be stored in values as references to other values. The tokens provided by the reference calls must always be used for persistent references.

Dynamic values. As mentioned above in the discussion on "Types", a Container Manager value can be compressed, encrypted, byte-swapped, etc. during read/write. Furthermore, these transformations can be composed together to form a chain of transformations.

In addition to data transformation, the same mechanism also supports I/O redirection. In this case a value actually stored in a container is a description of how to find the data, rather than the data itself. Such descriptions can be as simple as references to files, or to objects in another container, or as complex as queries that cause data to be retrieved from a database.

Both I/O transformations and I/O redirection are carried out implicitly by the Container Manager library, using "handlers" determined by the type of the value. These handlers are attached to temporary entities called dynamic values created by the library. Dynamic values are never visible to the application, and have no persistent meaning. The Dynamic Value mechanism is described in more detail below.

Value segments. To support interleaving and other uses that require breaking a value up into pieces, The Container Manager allows a value to be stored as multiple segments stored at different locations in the container. These segments are not visible at the API, since the Container Manager routines concatenate them to create a single stream of bytes.

The Container Manager also takes advantage of value segments to represent insertions, deletions, and overwrites of contiguous bytes in a value. This allows the Container Manager to represent these operations directly in recording updates, rather than having to create a new copy of the value.

Handlers. The Container Manager makes use of dynamically linked handlers supplied by the execution environment for two reasons: portability and extensibility. The use of handlers means that the Container Manager library is almost trivially portable, since all the system dependencies are in the handlers. The Container Manager library is also easily extensible, with the addition of newly written handlers, since the handler interfaces are carefully designed to provide cleanly encapsulated abstractions.

The Container Manager employs session handlers, container handlers and value handlers. Session handlers are global to the session as a whole. These include allocating and de-allocating memory, and reporting errors. Container handlers perform all of the actual I/O to containers. These handlers map I/O to the underlying storage in a way that depends on the container type. Container handlers basically provide a stream I/O interface to the container storage.

Value handlers implement both I/O transformations and value indirection. These handlers are determined by the type of each value. New handlers to carry out new types of data transformations or support new types of indirect values can be written at any time.

These handlers are invoked entirely by the library. The accessing application does not need to know that it is using handlers to access the value. Of the three kinds of handlers used by the Container Manager, only the value handlers are described in detail herein since they are the only ones which are important to an understanding of the invention.

B. Overview of Types and Dynamic Values

The Container Manager provides a very powerful mechanism for transforming values during I/O, and for following indirect references. The Container Manager type mechanisms are probably best explained in terms of some usage examples.

Usage example 1—External File. Suppose an application developer would like to have a value that represents a file. When the application calls the Container Manager's Write Value Data procedure (CMWriteValueData) for writing data to the value, we want to actually perform I/O to the file.

The mechanisms described herein allow us to store a reference to the file in a value. When the value is used, an I/O redirection is set up, without the application being aware of it.

Note that this raises the thorny problem of platform-independent file references. The Container Manager avoids this problem. It allows any number of different types of references, implemented by handlers.

Usage Example 2—Compressed Value. Suppose an application developer would like to compress data as it is written to the value, and decompress it as it is read out. In addition to maintaining the data in the value itself, this compression may depend on a dictionary associated with the type of value. Furthermore, the compression routine may need to maintain a state, since the compression at any point may depend on what has already been written.

The mechanisms described herein allow us to give the value a type that causes the compression/decompression handler to be transparently invoked when the application does I/O. Again, this is an extensible mechanism, so that new compression algorithms (or more generally, arbitrary transformations) can be added without modifying the library.

Usage Example 3—Compressed, Format Converted Array. Suppose the value which an application is dealing with is actually an array of pixels. In addition to decompressing it, on a given platform we want to convert each pixel to a different format.

The mechanisms described herein allow us to take two (or more) data transformations, such as compression and format conversion, and compose them together. Just as the application does not need to be aware of the underlying transformations, the individual transformations do not need to be aware of each other.

Usage Example 4—All of the Above. The next step is to put the compressed pixel array out in a file, and convert it to a different format when it is read in. This is all supported using exactly the same composition as used in the previous example. The interfaces to data transformations and I/O redirection are the same, so no special mechanism is required.

Other Usage Examples. To briefly illustrate further where this leads, here are some further examples:
- A value contains a query that is used to look information up in a database. The "I/O redirection" provides access to a table retrieved from the database.
- A value contains a file reference that is encrypted because it also holds the file-server password. A decryption stage is required before the I/O redirector can be applied to the file reference.
- A value contains a query that is used to generate a file reference, which then becomes the basis for a second level of I/O redirection.

Numerous other usages can be developed which can take advantage of the mechanisms described herein.

All of the above examples are based on the types associated with the values involved. The examples depend on two aspects of Container Manager types.

First, every value handler is bound to values only indirectly through the name of a type. Handlers are associated with type names through the CMSetMetaHandler Container Manager operation. This association is session-wide. Then the handler is bound to a particular type in a given container through the name of that type. This binding is done when the container is opened.

Second, even in the simplest examples above, such as the value that is merely an indirection to a file, or the value that is merely compressed, the value essentially has two types: the type visible to the application, which encodes the format of the data from the application's point of view, and the type used to find the appropriate handler for compression, I/O redirection, etc.

As the more complex examples show, multiple types of a value need to be independent. This leads to a view of a value as having multiple, independent types. By analogy with C++ (an analogy which is not perfect, as described below) we call these "base types" of the value's type. Base types can be added to and removed from any Container Manager type using the Container Manager CMAddBaseType() and CMRemoveBaseType() operations.

Base types are normal types, and themselves may have base types. This could be useful, for example, when the combination of file access and decompression is used in a variety of different contexts. The two could be made base types of a new type, and then that new type could be used in various ways, including making it a base type of the "all of the above" type which adds format conversion.

To illustrate the concept of base types, FIG. 1 is a symbolic diagram of a tree having three types 102, 104 and 106. A value may have a "compressed file type" 102 associated with it, but the compressed file type 102 has two base types: a "file access type" 104 and a "compression type" 106. The complex "compressed file type" 102 can be created by first defining the compressed file type 102 object, than calling the Container Manager procedure to add a base type 104 to the type 102, and then by calling the procedure again to add the base type 106 to the compressed file type 102.

Figure 2:
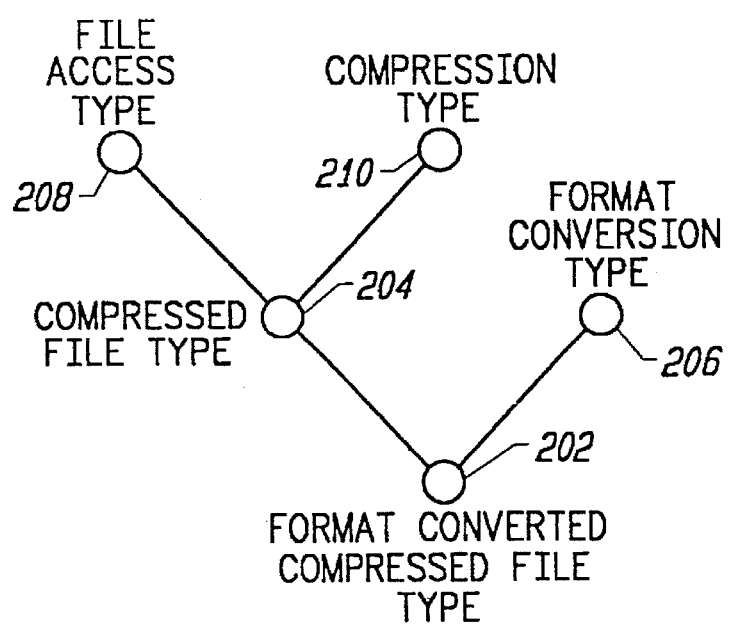

FIG. 2 illustrates a more complex type tree. As shown in FIG. 2, the type "format converted compressed file type" 202 has two base types, "compressed file type" 204 and "format conversion type" 206. As with compressed file type 102 in FIG. 1, compressed file type 204 has two base types, "file access type" 208 and "compression" 210.

The addition of base types will always form a tree routed in the original type. If the same type is used as a base type in more than one place in the tree, the separate uses are treated as entirely separate types.

To understand how a given tree of types will behave, the tree is flattened into a linear "chain" of types. In the present embodiment, this is done by performing a depth-first, post-order walk on the tree. Thus, in the case of FIG. 1, the resulting sequence is file access, compression, then compressed file. If an application program calls the Container Manager routine to read data from a value (CMReadValueData), and the value has the type, "compressed file", then the Container Manager will first call the read handler for the compressed file type 102. The read handler for the compressed file type 102 will then (through another call to CMReadValueData) call the read handler for the compression type 106, which in turn calls (through yet another call to CMReadValueData) the read handler for file access type 104. The read handler for file access type 104 obtains (through yet another call to CMReadValueData) the information which is stored in the container in the storage area allocated to the value which the application desires to read, and uses this information to access the actual data on, for example, a hard disk. This data, obtained from the hard disk, is the return value of the read handler for file access type 104. This data gets decompressed by the read handler for compression type 106, and then returned to the caller by the read handler for the compressed file type 102.

The chain formed by the flattened type tree is considered herein to have a "top" and a "bottom" type which are, respectively in FIG. 1, compressed file type 102 and file access type 104. This means that the first handler to be called for any value operation is the value handler associated with the "top" type on the chain. That handler invokes the next handler on the chain, which in turn invokes the next handler on the chain, and so on down to the "bottom" handler on the chain. The handlers then return one by one to their respective calling handlers, until the "top" handler returns to the application program.

In the type tree of FIG. 2, the depth-first, post-order walk of the tree flattens it into the following linear chain: file access type 208, compression type 210, compressed file type 204, format conversion type 206, and format converted compressed file type 202. Format converted compressed file type 202 is the "top" type on the chain, and "file access" type 206 is the "bottom" type on the chain. Note that compressed file type 204 and format converted compressed file type 202 do not have handlers associated with them (let us assume), they will not have any effect on the value.

In order to support the above examples, the present embodiment assumes two design constraints. First, the application, and each handler, must always think that it is dealing with a "normal" value (i.e. one without redirection or transformations); that is, any redirection or transformation must be completely transparent to the caller. Second, in several cases we saw that handlers might have a non-trivial amount of state to manage.

We address these constraints by giving each handler its own "private" value, called a dynamic value. Dynamic values are transient (i.e. not persistent); they are created just to provide an environment for the handlers, and they are never written to the container, saved in the container's Table Of Contents (TOC), etc. However, they do have refnums and from the "outside" (i.e. from any application code or handler code except the handler that "owns" them) they look exactly like normal values. It will be seen that dynamic values have the same "value header" as real values, except that instead of pointing to storage locations which contain actual value data, they point to a vector of "handlers", one for each of a predefined set of "value operations", to be called when a prior caller desires to use the value.

The following value operations are supported by the Container Manager. The Container Manager routines which implement these operations first check whether the specified value is real or dynamic. If real, then the routine simply operates on the real data. If dynamic, then the routine calls the handler which is associated with the specified value for the specified value operation. Thus for a given dynamic value, a handler can be provided to support each of the following value operations:

---

© 1992 Apple Computer, Inc.

```
CMSize   CMGetValueSize(CMValue value);
CMSize   CMReadValueData(CMValue value, CMPtr buffer,
            CMCount offset, CMSize maxSize);
void     CMWriteValueData(CMValue value, CMPtr buffer,
            CMCount offset, CMSize size);
void     CMInsertValueData(CMValue value, CMPtr buffer,
            CMCount offset, CMSize size);
void     CMDeleteValueData(CMValue value, CMCount offset,
            CMSize size);
void     CMGetValueInfo(CMValue value, CMContainer *container,
            CMObject *object, CMProperty *property,
            CMType *type, CMGeneration *generation);
void     CMSetValueType(CMValue value, CMType type);
void     CMSetValueGeneration(CMValue value,
            CMGeneration generation);
void     CMReleaseValue(CMValue);
```

---

As an aside, the present description often uses C-language notation as a shorthand way of describing the steps performed by, or other characteristics of, a Container Manager routine. In this notation, all module names and external data that can possibly be visible to an application programmer begin with the letters "CM" or "cm". The upper case "CM" prefixes all API visible routines and macros. The prefix "kCM" is used for constants. The lower case "cm" is used for all inter-module references within the Container Manager. All other data and modules have no other naming conventions and should not be visible outside of the file in which they occur. Macros used within the Container Manager do not follow these conventions since they are never visible in the generated object modules. Thus names beginning with "cm" or (upper or lower case) are reserved by the API and should not be used by the applications using the API.

Also as an aside, routines or code portions which are not described herein are considered self-documenting either due to commenting or due to the use of self-documenting symbol names. For example, it will be apparent to the reader without further explanations that the CMGetValueSize() operation mentioned above returns the size of the specified value.

Returning again to the above Container Manager value routines, none can be called for a particular value until one of the following preparatory routines are called for that value: CMNewValue() or CMUseValue(). As described below, if the desired value is a dynamic value, these routines set up the chains of dynamic value handlers needed to support the above routines.

When a dynamic value is spawned by CMNewValue() or CMUseValue(), the pointer to the top-most dynamic value header is returned as the refNum. Then, whenever the user passes a refnum to an API value routine, it checks to see if the refNum is a dynamic value. If it is, it initiates the call to the corresponding value handler. That may cause a search up the base value chain to look for an "inherited" value routine. In the limit, we end up using the original API value routine if no handler is supplied and we reach the "real" value in the chain. Thus the handler must be semantically identical to the corresponding API call.

These dynamic values only exist from creation during the CMUseValue() until they are released by CMReleaseValue (). A dynamic value can have its own data, but this data is stored in the value's refCon rather than in the value data itself. Dynamic values do not have associated data in the normal sense.

A dynamic value is created when a value is created by CMNewValue() or used by CMUseValue(), and the following two conditions occur:

1. The type of the value, or any of its base types, have metahandlers which have been registered by the Container Manager CMSetMetaHandler() routine in a session-wide metahandler symbol table (CMSetMetaHandler() is usually called when a container is first opened); and 2. The metahandlers support a Use Value Handler, and in addition for CMNewValue(), a New Value Handler.

The New Value Handlers are used to save initialization data for the Use Value Handlers. The Use Value Handlers are called to set up and return a refCon. Another metahandler address is also returned. This is used to get the address of the value operation handlers corresponding to the standard API CM . . . value routines mentioned above.

When a CMNewValue() or CMUseValue() is almost done, a check is made on the value's type, and all of its base types (if any) to see if it has an associated registered metahandler. If it does it is called with a Use value operation type to see if a Use Value Handler exists for the type. If it does, we spawn the dynamic value.

The spawning is done by calling the Use Value Handler. The Use Value Handler is expected to set up a refCon to pass among the value handlers and a pointer to another metahandler. These are returned to CMNewValue() or CMUseValue() which does the actual creation of the dynamic value. The extensions are initialized, the metahandler pointer and refCon are saved. The pointer to the created dynamic value header is what CMNewValue() or CMUseValue() returns to the user as the refNum.

Now, when the user attempts to do a value operation using this refNum, we will use the corresponding handler routine in its place. The vector entries are set on first use of a value operation. If a handler for a particular operation is not defined for a value, its "base value" is used to get the "inherited" handler. This continues up the chain of base values, up to the original "real" value that spawned the base values from the CMNewValue() or CMUseValue(). Once found, we save the handler in the top layer vector (associated with the refNum) so we don't have to do the search again. Thus, as in C++, dynamic values may be "subclassed" via their (base) types.

Note that if we indeed do have to search up the base value chain then we must save the dynamic value refNum (pointer) along with the handler address. This is very much like C++ classes, where inherited methods are called and the appropriate "this" must also be passed.

The Container Manager supports layering of dynamic values. The best way to describe layering is in terms of C++. Say we have the following class types (using a somewhat abbreviated notation):

© 1992 Apple Computer, Inc.

```
class Layer {              // a base class
    <layer1 data>          // possible data (fields)
    Layer1(<layer1 args>); // constructor to init the data
    other methods...       // value operations in our case
};
class Layer2 {             // another base class
    layer2 data>           // possible data (fields)
    Layer2(<layer2 args>); // constructor to init the data
    other methods...       // value operations in our case
class T: Layer1, Layer2 {  // the class of interest!
    <T data>               // possible data (fields)
    T(<T args>, <layer1 args>, <layer2 args>);
                           // constructor to init the data and bases
    other methods...       // value operations in our case
};
```

In Container Manager terminology, T is to be a registered type with other registered types as base types (classes). All type objects are created using the standard API call CMRegisterType(). Base types can be added to a type by using CMAddBaseType(). This defines a form of inheritance like the C++ classes.

Type T would be registered with its base types as follows:

© 1992 Apple Computer, Inc.

```
layer1 = CMRegisterType(container, "Layer1");
layer2 = CMRegisterType(container, "Layer2");
t = CMRegisterType(container, "T");
CMAddBaseType(t, layer1);
CMAddBaseType(t, layer2);
```

For the t object, the global name property and value are created as usual by CMRegisterType (container, "T"). The CMAddBaseType () calls add the base types. These are recorded as the object ID's for each base type in the order created as separate value segments for a special "base type" property belonging to the type object.

As mentioned above, CMNewValue() or CMUseValue() spawn dynamic values if the original type or any of its base types have an associated Use Value Handler. Assume that was done for "T" in the above example. What happens is that CMNewValue() or CMUseValue() will look at its type object (t here) to see if the base type property is present. If it is, it will follow each type "down" to leaf types using a depth-first search.

In the example, "layer1" will be visited, then "layer2", and finally the original type "T" itself. If the "layer1" type object had base types of its own, they would be visited before using "layer1" itself. Hence the depth-first search down to the leaf types.

For each type processed, if it has a Use Value Handler of its own, it will be called to get a refCon and value handler metahandler.

Note that this scheme allows total freedom for the user to mix types. For example, type T1 could have base types T2 and T3. Alternatively, T1 could just have base type T2 and T2 have T3 as its base type In the C++ class types shown above, note that each class could have its own data along with its own constructor. The T class has a constructor that calls the constructors of all of its base classes. We can carry this analogy with the Container Manager just so far. Here is where it starts to break down.

The problem here is that C++ class types are declared statically. A C++ compiler can see all the base classes and can tell what data gets inherited and who goes with what class. In the Container Manager, all "classes" (i.e., our type objects) are created dynamically. So the problem is we need some way to tell what data "belongs" to what type.

The solution is yet another special handler, which returns a format specification called metadata. The handler is the Metadata Handler whose address is determined by the Container Manager from the same metahandler that returns the New Value and Use Value Handler addresses.

Metadata is very similar to C-language printf() format descriptions, and is used for similar purposes. The next section will describe the metadata in detail. For now, it is sufficient to know that it tells CMNewValue() how to interpret its "..." parameters. The rest of this section will discuss how this is done to dynamically create data.

As with C++ classes, the data is created when a new value is created, i.e., with a CMNewValue() call. The data will be saved in the container, so CMUseValue() uses the type format descriptions to extract the data for each dynamic value layer.

CMNewValue() is defined with the following prototype:

CMValue CMNewValue(CMObject object, CMProperty property, CMType type, ...);

The "..." is an arbitrary number of parameters used to create the data. Metadata, accessed from the Metadata Handler, tells CMNewValue() how to interpret the parameters just like a printf() format tells printf() how to use its arguments.

The order of the parameters is important. Because base types are done with a depth-first search through the types down to their leaves, the CMNewValue() "..." parameters must be ordered with the parameters for the first type in the chain occurring first in the parameter list. Note what's happening here is that the user is supplying all the constructor data just like T constructor class example above.

The way the data gets written is with a special handler, called the New Value Handler. After CMNewValue() calls the Metadata Handler, it uses the metadata to extract the next set of CMNewValue() "..." parameters. CMNewValue() then passes the parameters along in the form of a data packet to the New Value Handler. The New Value Handler is then expected to use this data, which it can extract with the Container Manager CMScanDataPacket() routine. Once it has the data, it can compute initialization values to write to its base value. It is the data written by the New Value Handler that the Use Value Handler will read to create its refCon.

Only CMNewValue() does this. The New Value Handler is only for new values, but the Use Value Handler is used by both CMNewValue() and CMUseValue().

In the simplest case, with only one dynamic value, it can be seen that the data is written to the "real" value. Now if you layer another dynamic value on to this, the next chunk of data is written using that layer's base value and hence its handlers. The second layer will thus use the first layer's handlers. That may or may not end up writing to the "real" value depending on the kind of layer it is. If it's some sort of I/O redirection handler (i.e., it reads and writes somewhere else), the second layer data will probably not go to the "real" value.

The Use Value Handler is called both for CMNewValue() and CMUseValue(). The Use Value Handler reads the data from its base value to create its refCon. If the user comes back the next day and does a CMUseValue(), only the Use Value Handler is called. Again it reads the data from its base value to construct the refCon and we're back as we were before in the CMNewValue() case.

It should be pointed out here that the Metadata and New Value Handlers will always be executed with a Container Manager running on some particular hardware (obviously). The data packet built from the CMNewValue() ". . . " parameters is stored as a function of the hardware implementation on which it is run (i.e., whatever the sizes are for bytes, words, longs, etc.). How it is stored is a function of the metadata returned from the Metadata Handler. In other terms, the New Value Handler has a contract with both the Container Manager and the Metadata Handler on the meaning of the parameter data.

Note, however, it is not required that you be on the same hardware when you come back the next day and to the CMUseValue() that leads to the Use Value Handler call. The handler writer must keep this in mind. Specifically, the Use Value Handler must know the attributes (bytes size, big/little endian, etc.) of the data written out by the New Value Handler so it knows how to use that info. In other words, the Use Value Handler has a (separate) "contract" with its own New Value Handler on the meaning of the data written to the base value.

There is another, relatively minor, thing to keep in mind. That is that the value handlers for any one layer must take into account the size of its own data when manipulating additional data created by the handlers for CMReadValueData(), CMWriteValueData(), etc. This simply offsets the write and read value data operations by the proper amount. Remember all operations are on their base values. So if a New Value Handler writes data, this basically prefixes the "real" stuff being written by the handler operations.

The Metadata Handler is only needed for CMNewValue() so that the proper number of CMNewValue() ". . . " parameters can be placed into a data packet for the New Value Handler. The Metadata Handler must follow the prototype, CMMetaData metaData_Handler(CMType type);

where "type" is the (base) type layer whose metadata is to be defined.

The Metadata Handler simply returns a C string containing the metadata using the format descriptions described above.

The type is passed as a convenience. It may or may not be needed. It is possible for a type object to contain other data for other properties. Types, after all, are ordinary objects. There is nothing prohibiting the creation of additional properties and their values. This fact could be used to add additional (static and private) information to a type to be used elsewhere. For example, the type could contain a compression dictionary.

The New Value Handler must follow the prototype,

CMBoolean newValue_Handler(CMValue baseValue,
    CMType type,
    CMDataPacket dataPacket);

where
baseValue=the base value which is to be used to write the refCon data for the Use Value Handler
type=the type corresponding to this New Value Handler
dataPacket=the pointer to the data packet, created from the CMNewValue() ". . . " parameters according the types metadata format description.

The type is passed again as a convenience just as in the Metadata Handler. It can also be used here to pass to CMScanDataPacket() to extract the dataPacket back into variables that exactly correspond to that portion of the CMNewValue() ". . . " parameters that correspond to the type. It is not required, however that CMScanDataPacket() be used.

The Use Value Handler is called for both the CMUseValue() and CMNewValue() cases. If its companion New Value Handler wrote data to its base value, the Use Value Handler will probably read the data to create its refCon. The refCon will be passed to all value handlers. The Use Value Handler returns its refCon along with another metahandler address that is used to get the value handler addresses. These are used to create the dynamic value.

The Use Value Handler should follow the prototype,

CMBoolean useValue_Handler(CMValue baseValue,
    CMType type,
    CMMetaHandler *metahandler,
    CMRefCon *refCon);

where
baseValue=the base value which is to be used to write the refCon data for the Use Value Handler
type=the type corresponding to this New Value Handler
metahandler=a pointer to the value operations metahandler which is returned by the Use Value Handler to its caller
refCon=a reference constant built by the Use Value Handler and returned to its caller.

The baseValue and type are identical to the ones passed to the New Value Handler. The type may or may not be needed in the Use Value Handler. Like the Use Value Handler, it could be used to supply additional information from other properties.

It is expected that the Use Value Handler will read data from its base value to construct its refCon. The refCon is then returned along with a pointer to another metahandler that is used by the Container Manager to get the addresses of the value operations.

Note, both the New Value and Use Value Handlers return a CMBoolean to indicate success or failure. Failure means (or it is assumed) that the handlers reported some kind of error condition or failure. As documented, error reporters are not supposed to return. But in case they do, we use the CMBoolean to know what happened. It should return 0 to indicate failure and non-zero for success.

Value Operation Handlers. The value operation handler routines can do a Container Manager CMGetValueRefCon() call on the value which was passed, in order to get at the refCon set up by the Use Value Handler. This provides a communication path among the value handlers. Further, the value handler should usually do its operations in terms of their base value, which can be accessed using the Container Manager CMGetBaseValue() call.

The release handler is an exception to this rule. A set of one or more dynamic value layers are spawned as a result of a single CMUseValue() or CMNewValue(). The layers result from the specified type having base types. From the caller's point of view s/he is doing one CMUseValue() or CMNewValue() with no consideration of the base types. That implies that the returned dynamic value should have a single CMReleaseValue() done on it. The handlers have no business doing CMReleaseValue() on their base value. This is detected and treated as an error.

A count is kept by the Container Manager of every CMUseValue() and CMNewValue(). Calling CMReleaseValue() reduces this count by one. When the last release is done on the dynamic value (its count goes to 0), the release handler will be called. It is the Container Manager who calls the release handler for all the layers, not the handler. The Container Manager created them as a result of the original type; it is therefore responsible for releasing them.

The reason the Container Manager is so insistent on forcing a release for every use of a dynamic value is mainly to enforce cleanup. Most value operation handlers will, at a minimum, use a refCon that was memory allocated by the Use Value Handler. Release handlers are responsible for freeing that memory. In another example, if any files were open by the Use Value Handler, the releases would close those files.

A trivial value handler might merely get its base value and use it to recursively call the Container Manager value procedure which initially invoked the handler to do its operation (again except for the release handler). In this case what it is basically doing is invoking the "inherited" value operation. In this case, the value operation could be omitted entirely by having the metahandler for the value's type return NULL when asked for that value operation. The Container Manager uses that as the signal to search up the dynamic value inheritance chain to find the first metahandler that does define the operation. In the limit, it will end up using the original "real" value.

Possible Limitations On Value Operations. Value I/O operations are basically stream operations. That is, you read or write information linearly from a specified offset. In addition, the Container Manager provides insert and delete value data API calls CMInsertValueData() and CMDeleteValueData().

Insert and delete can cause problems because base types may want to do certain transformations on their data that depend on what has occurred previously in that stream of data. For example, encryption using a cyclic key, or compression generally cannot be done simply by looking at a chunk of data starting at some random offset. A cyclic key encryption can be deterministic if you can always determine where to start in the key as a function of offset. But you can see that inserts and deletes will change the offsets of following data. You would not know where to start in the key.

What all this means is that certain data transformations only make sense if you are willing to refuse to support the insert/delete operations. Basically only data transformations that are position independent can be supported with the full set of value operations.

Even simple I/O to a file may create problems, since most file systems do not support inserts and deletes in the middle of a file. If you do want to support inserts and deletes, then you should consider the potential for data intensive and/or computationally intensive operations.

C. Format Overview

A conceptual description of the Container Manager data format is now presented. As an overview, certain caveats and tricks are omitted at this level which are covered in more detailed parts of this description.

Five key ideas underlie the Container Manager format:
1) everything in a container is an object,
2) objects have persistent IDs,
3) all the metadata lives in the TOC (Table of Contents),
4) objects consist entirely of values, and
5) each value knows its own property, type, and data location.

The five ideas will each be discussed in turn.

Everything is an object. In a Container Manager container, every accessible byte is part of a value of some object. Even the metadata that defines the structure of the container, and the label of the container, are values of an object. Type descriptions are objects, property descriptions are objects, etc. We will exploit this fact in various ways below.

Objects have persistent IDs. Every Container Manager object is designated by a persistent ID which is unique within the scope of its container. Objects may have additional IDs and/or names that are unique in larger scopes, but this is not required.

Object IDs provide a compact, convenient way to refer to an object. An efficient mechanism is provided to get from any object ID to information about that object.

All the metadata lives in the TOC. This is a difference between the Container Manager and most other container formats, such as ASN.1, formats derived from IFF (such as Microsoft/IBM's RIFF), etc. In these other formats, the metadata is associated with the chunks of data that it describes, a design approach that we call internally tagged. There are three reasons for this difference from other formats:

a) The Container Manager embodiment described herein is designed to support very flexible layouts, such as multi-media interleaving, and internal tags would be inconvenient and even harmful for this.

b) Applications inspecting an object can make decisions about it more efficiently if all of its metadata is concentrated in one place, rather than being spread out over the container with its values.

c) We want to be able to assimilate existing formats that contain collections of objects without forcing them to change. This implies that we must be able to designate regions within the existing structure as values, without forcing them to somehow retrofit internal tags.

This approach to metadata does impose one significant design constraint. A Container Manager container can only be read by starting with the TOC. This raises two questions: (1) how do we find the TOC, and (2) how do we access the TOC when we need information?

1) In standard Container Manager containers the container label points to the TOC. Possibly some non-standard containers will exist that require other mechanisms. However, these will be exotic cases.

2) Since we need to access the information in the TOC whenever we want to read a value, we have to have it available at all times. This normally means that the container needs to be on a random access device.

If a container needs to be read on a device that does not support efficient random access (such as a CD-ROM) the TOC can be split up into sub-TOCs that sit in front of the groups of objects they describe, and then the container can be accessed largely in stream order.

Objects consist entirely of values. In the Container Manager, an object has no value as such. Each object has properties, and each property has values. The Container Manager format provides no information about an object except its ID.

Of course, an object can have a single value; in that case the value of the property "is" the value of the object. Thus the Container Manager format can easily accommodate this "normal" case.

Each value knows its own property, type, and data location. Each value consists of a property ID (or role), a type (or format), and data. For example, a graphic object might have a value that describes its "clip mask"; the property ID would specify what role the value plays, but not what format it is stored in. The type would define how the mask is represented: rectangle, bit mask, path, Mac region, PostScript path, etc. The data would be the representation of the mask itself.

At the level of the container standard itself, there are no restrictions on what values an object can have, how many values it can have, etc. However, individual object formats may dictate rules in this area. In general, applications should be prepared to encounter additional values that they do not understand; these can be ignored. This allows other applications to annotate objects with additional values that may not be generally understood. Typically, these values will be associated with properties that are unknown to the application.

The data of a value is an uninterrupted sequence of bytes which may be from 0 to $2^{64}$ bytes long, although these limits may vary in a different embodiment. This sequence of bytes has no format requirements or restrictions. Furthermore, the byte sequences representing the data for various values of various objects can be placed anywhere in the container. Thus there are no strong data format requirements for the container as a whole, although it must contain the metadata to define its structure somewhere.

Special Cases. All of the mechanisms above are consistent across all the uses of objects. However, there are two special cases that need to be considered.

First, The Container Manager format allows a single object to have multiple values with the same property ID. All the values must have different types. Such multiple values are intended to be used as alternative representations of the same information.

Second, the table of contents can contain multiple entries for a single value. These entries mean that the value represented by the entry is actually stored in multiple segments. This permits values to be broken up into chunks and interleaved, without creating problems for applications that view them as single values. In addition, it allows an application to build TOC entries that "synthesize" a value out of separate parts, as is required in retrofitting some file formats.

Note that these two special cases can be mixed freely. A property can have multiple values, and one or more of the values can be composed of multiple segments.

Other Issues—Globally Unique Names. To fulfill the requirement for locally generated unique names for types and properties, the Container Manager embodiment described herein supports identifiers defined in ISO 9070. These are names that begin with a naming authority (assigned to a system vendor or an application vendor), and then continue with a series of more and more specific segments, until they end in a specific type or property name.

While another embodiment can use a different naming convention, names generated according to ISO 9070 are both unique and self-documenting. Individual users can generate unique names using this approach. For example, a user developing educational stackware might want to create properties, or even types, to use in scripts. The stackware development environment could automatically generate a unique prefix for the user, based on the serial number of the development tool, and then append the user generated property or type name.

This ensures that if that user's scripts and data are combined in a container with other information generated by other users, no naming conflicts can occur.

Note that globally unique names are not limited to property and type descriptions. Any object can be given a unique name using exactly the same mechanism, and such object names may be useful in some applications.

Note also that objects can be given short names that are only locally unique, as in the RIFF TOC. These would be a different type than Globally Unique Names.

Recall that type and property descriptions are objects as well. Since types and properties need to have globally unique names, so that applications can recognize them, type and property descriptions will typically have a globally unique name value. In many cases, this may be the only contents of a type or property description object.

In some situations, however, we may wish to put more information into a description. Here are some examples of useful information that can be attached to types or properties:

Base types. As previously mentioned, base types allow inheritance of semantics from other existing types for composition into more complex types. Such base type information is intended to include uses such as encryption, compression, I/O redirection, etc.

Encoding information. A type definition may indicate the default encoding of its values. Typically, all of the values with the same basic format in a container will have the same encoding, so this new subtype can be shared by all these values. In this case the encoding can be indicated directly in the type description for the format.

If values with the same basic format but multiple encodings exist in the same container, a more complex solution is required. In this case, a subtype may be created just to record the encoding. Such a subtype will typically not need a globally unique name.

Compression information. In addition to the compression technique, typically recorded via a base type, the type can record compression parameters, the codebook used (if applicable), etc. As with encoding information, a type that exists just to record compression information typically will not need a globally unique name. It will refer to the underlying format type and the compression technique, both of which will have globally unique names.

A template or grammar for a type. This allows applications that have never seen this type before to parse values of that type and potentially get some useful information out of them. Examples of description mechanisms that could be used in this way are ASN.1 and SGML. The more general type will be indicated as the super-type. For example, a given SGML DTD as a type will have a specific SGML definition of the DTD. The super-type of this type would be SGML itself, which defines the basic encoding conventions.

Method descriptions for a type. A type could have properties that provide method definitions. Providing methods in the container would allow fully encapsulated use of values.

D. Format Definition

The concrete format of the table of contents (TOC) of a Container Manager container will now be described. The TOC consists of a sequence of entries. Each entry corresponds to a single segment of a value of some object.

TOC entries are sorted by object ID, and within a single object they are sorted by property ID. Thus all the entries for a given object are contiguous in the TOC, and all the entries for a given property are contiguous within the object. Also, an object can be found within the TOC, or a property can be found within an object, by binary search. If an object ID or a property is not defined, we can quickly determine that it is not defined.

Thus, each object in the container is represented in the TOC by a sequence of entries, one for each segment of a value of the object. The Container Manager has no way to represent an object without at least one value.

Since each TOC entry defines a value, we know immediately that it must indicate the object ID, property, type, and data of the value. In addition, it indicates the generation number of the value in order to allow applications to check consistency between different properties. The TOC entry may also contain bookkeeping information for the value.

The object ID field in a TOC entry identifies the object that this value is part of. The property field identifies the value's property by the object ID of a property description. The type field indicates the value's type by the object ID of a type description.

The entry indicates the value's data by the offset and length of the sequence of bytes representing the value. The offset is a 0 origin byte offset from the beginning of the container. The length is a byte count, and may be 0, indicating a 0 length value. If the data is four bytes long or less, it may be included directly in the TOC as an immediate value, rather than being referenced by offset and length.

A TOC entry could simply be defined by putting all the information above in a record. This record would be relatively large, however, and would be very likely to contain redundant and/or unused information. The presently described Container Manager embodiment therefore uses an approach in which each TOC entry contains only the information that is new or different compared with the previous TOC entry. This results in a TOC that is organized as a stream rather than a table, and is parsed as it is read in. The actual format of the TOC is not important for an understanding of the invention.

Note that every TOC contains a standard object that is used to describe the TOC itself. In particular, it is object ID 1, so the TOC entries for the TOC itself always come at the beginning of the TOC. (Object ID 0 is never used). Additional TOC properties can be useful. For example, an index to speed access to the entries by ID could be attached to the TOC through another property. Potentially several such indexes, using different formats, could be attached.

Object IDs other than IDs of standard objects are generated by sequentially incrementing a counter from 0x00010000. Object IDs are never reused in later generations of a container if an object is deleted. The last ID number generated is kept as a property of object #1 to allow generating further IDs without reuse.

II. IMPLEMENTATION

A. Hardware

The Container Manager of the present embodiment is implemented entirely as software instructions and data, to be executed on general purpose computer hardware. No specific hardware platform is required. For completeness, however, FIG. 3 illustrates a typical hardware computer system platform on which the Container Manager might run.

Figure 3:
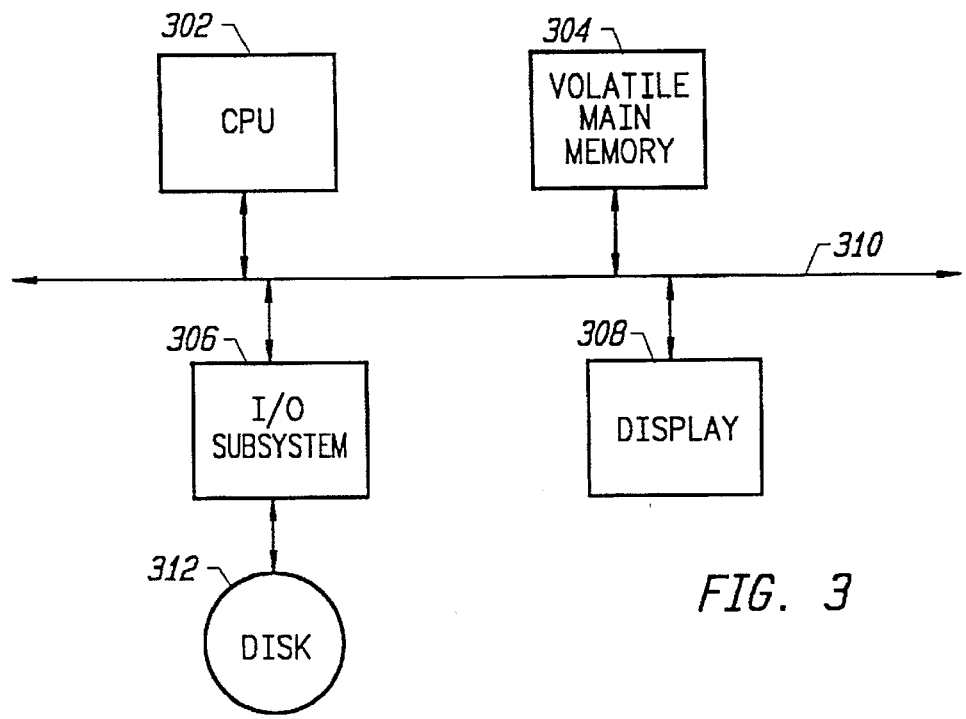
FIG. 3 is a block diagram of a hardware computer system platform which the invention might be used.

The computer system of FIG. 3 comprises a CPU 302, main memory 304, which may be volatile, an I/O subsystem 306, and a display 308, all coupled to a CPU bus 310. The I/O subsystem 306 communicates with peripheral devices including persistent storage devices, such as a disk 312. In typical operation, an application program, together with at least those Container Manager routines which are used by the application program, are retrieved from the disk 312 into main memory 304 for execution by the CPU 302. All of the data structures described below are also created in the main memory 304, in the sense that memory space is allocated for the information to be contained in the data structures, and all of the software routines which read or write to such memory locations do so according to some known definition of fields. In addition, pointers are written to certain of the allocated main memory storage areas, which pointers refer to other structures in memory in a known manner which is defined by the data structure. Thus a data structure, as used herein, is an abstract description of the organization of data in main memory 304; when the data structure is "created" in main memory 304, this description is imposed on regions of main memory 304 so that specific items of information can be found and/or interpreted according to the data structure. The term "pointer", as used herein, is a well-known shorthand for physical signals which are stored as charge, current or voltage levels in the memory cells which implement the main memory 304. These signals "identify" an item of information memory 304 in the sense that, when applied to the memory 304 as an address (either directly or via an address translation mechanism), they cause the memory 304 to read out data from the item pointed to or identified by such signals.

Also, it will be understood that even though different types of computer systems implement schemes such as caching and virtual memory, in which some of the data may not actually be located in main memory 304 itself at various times, these mechanisms are transparent to the Container Manager embodiment described herein. Thus, the data is referred to herein as being located "in" main memory 304, even if it is actually, transparently, located elsewhere.

B. In-Memory Data Structures

Figure 4:
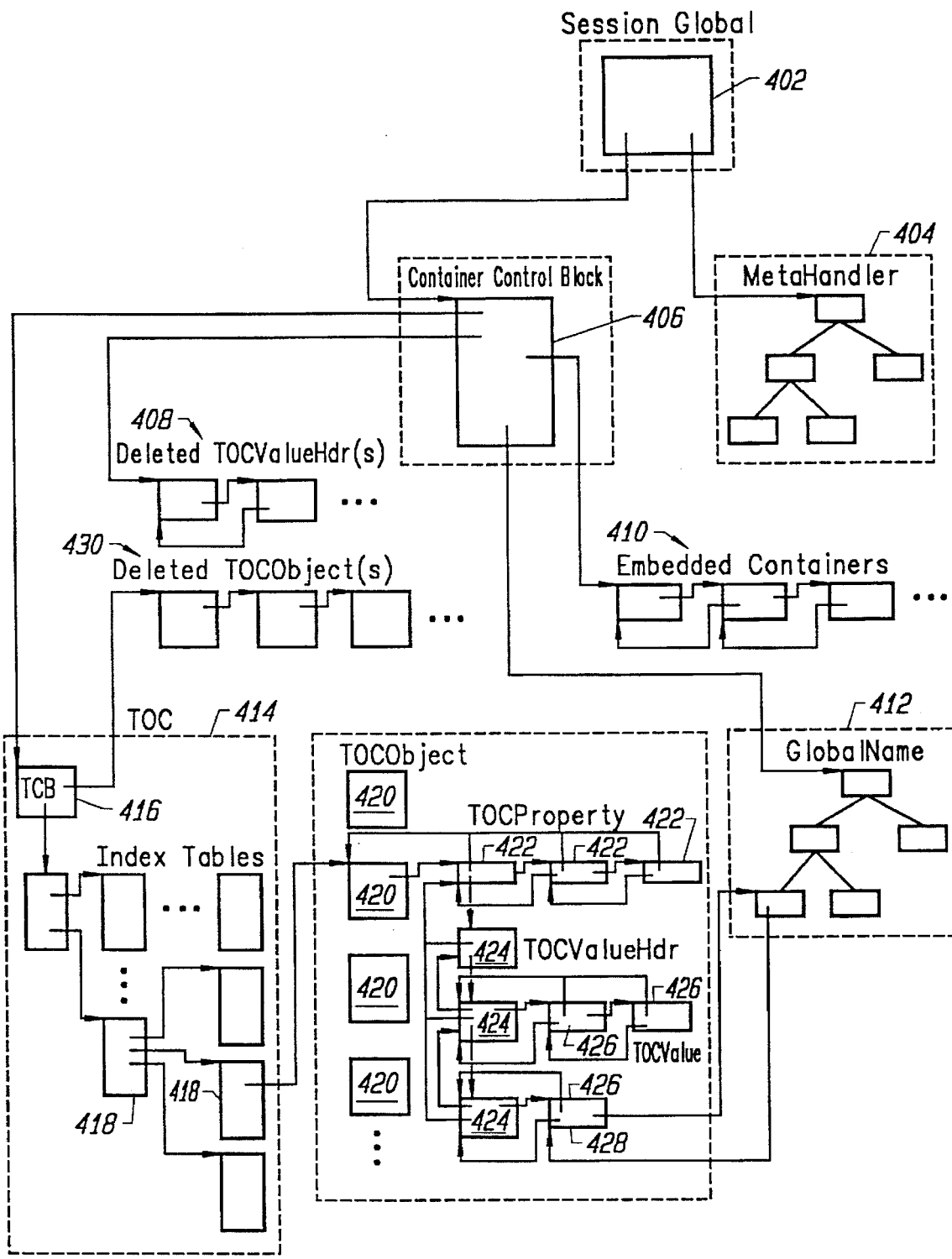
FIG. 4 is an overall block diagram of major data structures which are created in main memory of the computer system of FIG. 3 during the pendency of a session.

FIG. 4 is an overall block diagram of the major data structures which are created in main memory 304 during the pendency of a "session". Data block 402 is a "session global data" block containing all of the session-wide data for a given Container Manager session. There is no static global data in the code. All open containers are tied to the session on a doubly linked list whose head and tail pointers are contained in the session global data. The root of a metahandler table 404 (described below) is kept here as well along with the session handler pointers for malloc, free, and error reporting.

Containers are identified in the session global data block 402 by a pointer to the container's Container Control Block (CCB). Each time a container is opened with CMOpenContainer() or CMOpenNewContainer(), a new container control block 406 is created. The pointer to the container control block 406 is what is returned to the user as a container "refNum" (reference number).

There are five primary data structures tied to the container. Four are shown in the diagram and are discussed later. The fifth is the "touched chain", used for recording updates. The "touched chain" is not important for an understanding of the invention and is not described herein.

The four shown main data structures pointed to from the container control block 406 are the list 408 of deleted values (TOCValueHdr(s)), a list 410 of embedded container pointers, the global name symbol table 412, and a pointer to a TOC 414 control block 416.

The table of contents (TOC) 414 is the set of related data structures that organize objects by object IDs. The requirement that objects be kept in sorted order (sorted by object ID) puts certain constraints on its organization. Further, the fact that the IDs are generated sequentially in new containers also must taken into account (for example, binary trees would not be a good choice in such a situation).

The method used in the Container Manager of the embodiment described herein is an index table algorithm. It is somewhat memory intensive but allows objects to be accessed linearly in time and keeps the objects in the required sorted order. The index tables correspond to "powers" of a chosen index table size. For example, if the table size is 256 and the maximum ID is 0xFFFFFFFF (32-bits unsigned on MC68XXX machines) the access depth will be 4 for any ID.

To illustrate this, if we had ID 0x00123456 we would have 4 indices: 0x00, 0x12, 0x34, and 0x56. Four index tables would exist each corresponding to the indices 00 to 0xFF, i.e., mod the size of an index table. Each index is used to index into its corresponding index table. Thus, in this example, the first table would have its 0x00'th entry pointing to the next table. That next table would have its 0x12 entry pointing to the third table. The third table would have its 0x34 entry pointing to the last table. The 0x56 entry in the last table would point to the actual object with ID 0x00123456.

Continuing with this example, if every ID possible were represented, then there would still be only one top level table. But there would be 256 second level tables corresponding to the 256 level-one indices. Each of those 256 level-two tables would have pointers to 256 level three tables and so on down to level 4.

Fortunately, new containers are generated with sequential IDs so that only the minimum number of tables is required. But if a new nonsequential number is needed the requisite new tables are generated as needed to go from the top level table to the lowest level table.

The routines that maintain this data structure are generalized to support any size table (within limits). There are trade-offs between table size and access time, which are apparent to a person of ordinary skill.

Because of this generalization, a TOC has associated with it all the variables that are needed to manipulate the index tables. This is kept in TOC control block 416, pointed to from the container control block. The TOC control block 416 is to TOC object access, what the container control block 406 is to the entire container.

The TOC control block points to another data structure not shown here to keep the drawings simple. It is a set of three head/tail list pointers to doubly linked lists of the TOCObject(s). The three lists are for all the objects, property objects, and type objects in the container. Thus the type and property lists are subsets of the object list. These lists are only just for the CMGetNextxxx() routines. These lists are kept as part of the TOC since, there can be only one TOC and one of these list sets. Note that for updating, there can be multiple containers using the same TOC, so putting these data structures here is the most convenient way to deal with them during updating.

Note, that since there can be multiple users of a TOC, a TOC requires a "use count" to prevent premature release of the TOC.

The lowest level of the TOC index tables 418 contain pointers to the container objects themselves instead of to other index tables. These objects are TOCObjects 420. The TOC entries for an object are linked off of their TOCObject. TOCObjects are returned to the user as object refNums (CMObject, CMType, and CMProperty).

The properties, TOCProperties 422, for an TOCObject are contained on a doubly linked list off the TOCObject. The values for each property are on a doubly linked list of value headers, TOCValueHdrs 424, off of each TOCProperty. Finally, a specific real (as opposed to dynamic) value, such as one of the TOCValues 426, is linked to its TOCValueHdr.

The reason the values are linked to a value header is because of continued (multi-segment) values. A multi-segment value can have more than one value entry. Hence the chain. Also, it is pointers to value headers that are returned to the user as value refNums (CMValue).

As used herein, a "header" for an item or items of information is a logical collection of information which applies generally to the item or items. The header need not be physically located in a contiguous region of memory, nor must it be contiguous with any of the items themselves.

Each TOCValue 426 can be either immediate, non-immediate, or a global name. Immediate values contain 1, 2, or 4-byte value data encoded directly in the entry. Non-immediates contain a container offset to the value data and its length. Non-immediates can also represent dynamic values (discussed below). Global name values, such as 428, are pointers to global name symbol table entries (discussed shortly) and once the value data has been written to the container, the container offset.

Note the diagram shows, in addition to the doubly linked list structures, a pointer for each TOCValue back to its value header. Similarly, each TOCValueHdr has a pointer back to its TOCProperty. Finally, each TOCProperty has a pointer back to its TOCObject. Not shown is a pointer from each TOCObject and each TOCValueHdr back to its container control block. The result is that anything can be accessed from almost anywhere and in any direction.

When a CMRegisterType() or CMRegisterProperty() is done, a check must be made to see if the specified global name already exists. For this, a simple binary tree symbol table 412 is used. Since a global name is itself a type or property object value, there is also a pointer from a TOCValue to the name in the global name symbol table. Each global name symbol table is unique to its container. Hence the container control block has the root to its tree of global names.

Whenever a container is opened a set of predefined global names is generated. Basically the equivalent of CMRegisterType() and CMRegisterProperty() is done but the object IDs are standard rather than user IDs.

Note, global names are not written to the container at the time they are created. Instead they are kept in the global name symbol table. When a container that was open for writing is closed, the global name symbol table is "walked" and all user defined names written to the container. At that point the TOCValues associated with global names are set with the container offsets for those names. This is done using the back pointer from each global name entry to its TOCValue. The TOC is then written followed by the label. Since the TOC is written after the global names, all the global name offsets will be set by that time. Thus everything is correct when the container is to be read.

The Container Manager of the presently described embodiment supports embedded containers. Embedded containers are treated just about like any other. The main difference is that they require a special handler that writes or reads (CMWriteValueData() and CMReadValueData()) to a value that belongs to the parent container. The handlers keeps track of offsets with the value that it is treating as a container.

The effect is to write or read a parent value as if it was a container. All the data for the parent value is created as a container, complete with its own TOC and label. The offsets in the TOC are relative to the start of the value, offset 0, just as in the non-embedded case. This means that a parent value could be read to copy the container as is.

Aside from the special handlers, most of the other stuff needed to open and close a container is independent of whether it is embedded or not. There are a few wrinkles, however. First, a container can have any number of embedded containers open at the same time. Each of those could also, and so on. The result is essentially a tree of open embedded containers. Since the data for a parent value is its embedded container, then if there are any more deeply embedded containers, they would also be part of the parent's value. This gets very confusing if you try to think of it more than two levels deep.

In all cases, when a parent is closed, we want to close all of its descendants.

The embedded container list 410 pointed to from the container control block is used so that a parent container can keep track of all of its immediate descendants. Each entry in the list is simply a pointer to a descendent container control block. At open time an entry for the embedded container is created in its parent embedded container list. At close time CMCloseContainer() will go through its list of embedded containers (i.e., the list of its immediate descendants) and recursively call CMCloseContainer() to close those. The net result is the desired one of closing all the descendants of the parent in the tree of embedded containers. An embedded container being closed is responsible from removing itself from its parent's embedded container list so that it won't be "seen" again if a parent further up the tree is closed.

Note, the functionality of embedded containers can also be done using dynamic values. However, the Container Manager, not being aware of this use of dynamic values, will not maintain the embedded containers list for it. Thus each dynamic value corresponding to an embedded container must be explicitly "closed" using CMReleaseValue().

The solution adopted is to put all deleted objects and values on a list of deleted items associated with the container. There are two lists: list 430 for objects pointed to from the TOC control block, and list 408 for deleted values pointed to from the container control block itself.

Note, since object refNums are TOCObjects, and value refNums are TOCValueHdrs, the only thing needed on these lists are those data structures. TOCProperties and TOCValues can be freed. The TOCObjects and TOCValues are flagged as "deleted". Whenever any object or value is passed to the API it is checked for the flag. It is an error to use a deleted item.

CMSetMetaHandler() is called by the user to record metahandler/type name associations. These are maintained in binary tree symbol table 404. The root of this tree is a "global" in the session data. It is not tied to any one container. When a container is opened, a type name is passed. This is used to look it up in the metahandler symbol table. This yields a metahandler function address which in turn is used to get actual handler routine addresses.

The following C-language struct defines the layout of all in-memory TOCObjects. The objects are accessed by their object ID.

© 1992 Apple Computer, Inc.

```
struct TOCObject {                              /* Layout of a TOC object: */
    CMObjectID    objectID;                     /* the object's ID (keep first for debugging) */
    ListHdr propertyList;                       /* list of object property entries */
    struct Container *container;                /* ptr to "owning" container control block */
    struct TOCObject *nextObject;               /* chain to next object by increasing ID  */
    struct TOCObject *prevObject;               /* chain to previous object by decreasing ID */
    struct TOCObject *nextTypeProperty;         /* chain of next type/property by increasing ID */
    struct TOCObject *prevTypeProperty;         /* chain of previous type/property by decr. ID */
    unsigned short objectFlags;                 /* info flags about the object */
    CMRefCon      objectRefCon;                 /* user's object refCon */
    unsigned long useCount;                     /* count of nbr of times "used" */
    struct TOCObject *nextTouchedObject;        /* link to next touched object */
    ListHdr touchedList;                        /* values/properties touched IN this object * 
};
typedef struct TOCObject TOCObject, *TOCObjectPtr;
```

The following object flags are defined:

© 1992 Apple Computer, Inc.,

```
#define UndefinedObject       0x0001U  /* 1   ==> object created but undefined*/
#define ObjectObject          0x0002U  /*     ==> object is a base object */
#define PropertyObject        0x0004U  /*     ==> object is a property descriptor*/
#define TypeObject            0x0008U  /*     ==> object is a type descriptor*/
#define DeletedObject         0x0010U  /*     ==> object has been deleted */
#define DynamicValuesObject   0x0800U  /*     ==> object "owns" dynamic values*/
#define TouchedObject         0x1000U  /*     ==> object has been "touched" */
#define ProtectedObject       0x2000U  /*     ==> object is locked/protected */
#define LinkedObject          0x4000U  /*     ==> object linked to master lsts*/
#define UndefObjectCounted    0x8000U  /*     ==> object counted as undefined */
```

When CMDeleteObject() is called, an object is to be deleted. When CMDeleteValue() is called, a value for a property of an object is to be deleted. As mentioned above, the refNums for objects (CMObject, CMProperty, and CMValue) are pointers to TOCObjects. Values (CMValue) are pointers to TOCValueHdrs. Thus we cannot truly delete the items (i.e., free their memory) these point to because there is no reliable way to verify that the pointers are valid.

Figure 5:
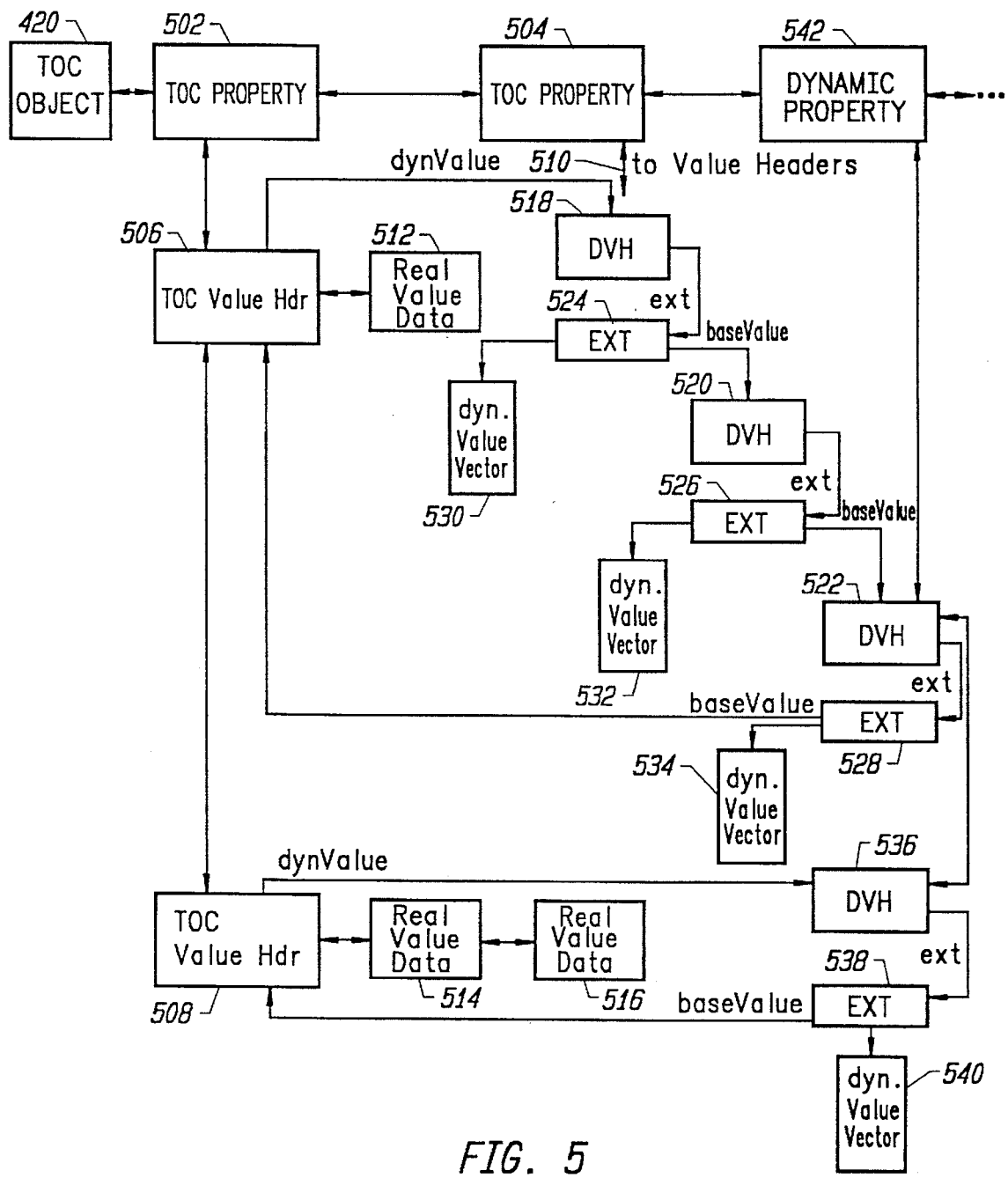
FIG. 5 illustrates the structure of in-memory objects which are created by dynamic value mechanism according to an embodiment of the invention.

Note that the properties 502 and 504 in the object of FIG. 5 are described by property descriptors which are themselves objects which follow the above layout. The layout of each of the properties 502, 504 and 542 is defined as follows:

© 1992 Apple Computer, Inc.

```
struct TOCProperty {                    /* Layout of a TOC object property: */
    ListLinks   propertyLinks;          /* links to next/prev property (must be first) */
    TOCObjectPtr theObject;             /* ptr to "owning" object */
    CMObjectID  propertyID;             /* the property's ID */
    ListHdr     valueHdrList;           /* list of the property's values */
};
typedef struct TOCProperty TOCProperty, *TOCPropertyPtr;
```

Types, too, are described using objects of the TOCObject form set out above. The structures of TOCValueHdrs 424 and TOCValues are set forth hereinafter.

As previously mentioned, the Container Manager routines CMNewValue () and CMUseValue () create a dynamic value chain for each type that has a "UseValue" and a "NewValue" handler. FIG. 5 illustrates the structure of in-memory objects which are created by the dynamic value mechanism.

Referring to FIG. 5, it is assumed that one of the TOCObjects 420 (FIG. 4) has a series of properties 502, 504, and so on (corresponding to 422 in FIG. 4). It is assumed further that property 502 has two values associated with it, indicated by value headers 506 and 508 (424 in FIG. 4). These values are of different types, as will be seen from the fact that different dynamic value chains are created for these values. Property 504 also has values associated with it, but these are shown only in the abbreviated form of an arrow 510.

Associated with real value header 506 is a segment 512 of real value data, and associated with value header 508 are two segments 514 and 516 of real value data. If the values for the property 502 were not of types which require creation of dynamic values, then the actual data of the values would be stored in segments 512, 514 and 516. Since the type of these values call for dynamic value creation, however, the data stored in real value data segments 512, 514 and 516 may instead be transformed versions of the actual data and/or may contain only indirection information.

The value header structure includes a pointer to the top dynamic value header 518 in a chain of dynamic value headers 518, 520 and 522. Each of the dynamic value headers 518, 520 and 522 have a format which is identical to the value header (also called a "real value header") 506, except that the field in real value header 506 which pointed to dynamic value header 518, is redefined in dynamic value header 518 to point to a set of dynamic value header extensions 524. The extensions 524 include an entry which points to the base value of the dynamic value header 518, which in the case of this chain, merely points to the second dynamic value header 520 on the chain. Dynamic value header 520 in turn points to its own dynamic value header extensions 526, which in turn points, in the base value field, to dynamic value header 522. Dynamic value header 522 also points to its dynamic value header extensions 528. But since dynamic value header 522 is at the bottom of the chain, its base value is the real value data stored in segment 512. Thus, the "base value" field of extensions 528 points back to the real value header 506.

Recall that the purpose for creating a chain of dynamic value headers 518, 520 and 522 is to implement a complex value type which transparently handles data transformations and redirections. Each of the dynamic value headers 518, 520 and 522 corresponds to a respective one of the types on the tree defining the complex type of the value headed by real value header 506. Thus, each of the dynamic value headers 518, 520 and 522 maintains its own vector of value handlers to be used when a higher level caller desires to invoke a value operation. These dynamic value vectors are illustrated in FIG. 5 as 530, 532 and 534, pointed to respectively by extensions 524, 526 and 528. The dynamic value vectors 530, 532 and 534 contain a series of pointers to the respective value handlers to be called. The pointers are in predefined locations in the vector; for example, the third entry in each vector contains the pointer to the WriteValueData handler to be called for a value data write operation.

The value header 508 in FIG. 5 is for a value whose type spawned only a single dynamic value header 536. Thus, the value header 508 points to dynamic value header 536, which in turn points to its extensions 538, which in turn points both to a dynamic value vector 540 and, for the base value, back to the value header 508.

When a real value spawns dynamic values, a special dynamic value property 542 is created only to contain the dynamic value headers. Only the bottom most layer of each dynamic value chain (the layer whose base value is the "real" value) is on the dynamic property chain. All higher layers are not part of the dynamic property chain. The dynamic value property chain is used to simplify deletion of dynamic values, for example when the container is to be closed.

Dynamic value headers never have value segment lists. No data is ever written to a dynamic value because these headers are removed when the value is released using a CMReleaseValue(). If there is any data, it must be associated with a "real" value—the real value associated with a dynamic value or some place else.

In each value header there is a pointer (a union called "dynValueData" with alternative fields called "dynValue" and "extensions") that contains three possible values:

1. dynValueData is NULL for "real" value headers that don't have a corresponding dynamic value.
2. dynValueData.dynValue is a pointer to the top-most layer if it is a "real" value that does have a corresponding dynamic value header.
3. dynValueData.extensions is a pointer to the extensions if it is itself a dynamic value header.

The value header's flags determine how to interpret the pointer.

When a dynamic value is spawned by CMNewValue() or CMUseValue(), the pointer to the top-most dynamic value header is returned as the refNum. That means whenever the user passes it to an API value routine, it will check to see if the refNum is a dynamic value. If it is, it initiates the call to the corresponding value handler using the vector in the extensions. That may cause a search up the base value chain to look for the inherited value routine. In the limit, the original API value routine is used if no handler is supplied and the "real" value in the chain is reached. That's how data could get in there.

Figure 6:
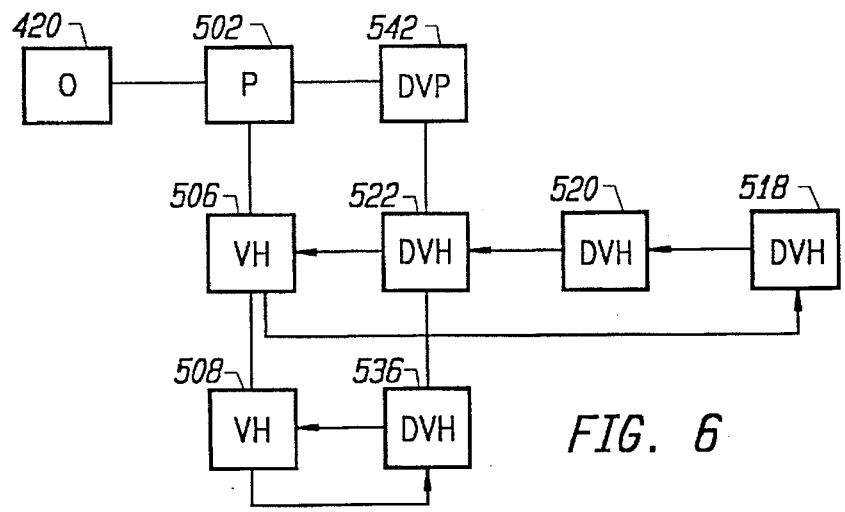
FIG. 6 illustrates the same structure as FIG. 5 using a simplified notation.

FIG. 6 illustrates the same structure as FIG. 5 using a simplified notation. This notation will make it easier to describe how dynamic values are spawned and layers created. Here "O" is object, "P" is property, "VH" real value header, "DVP" the dynamic value property, and "DVH" a dynamic value. The value segments are omitted.

As previously mentioned, when a CMNewValue() or CMUseValue() is almost done, a check is made on the value's type, and all of its base types (if any) to see if it has an associated registered metahandler. If it does, it is called with a "use value" operation type to see if a "use value" handler exists for the type. If it does, the dynamic value is spawned. Thus if CMNewValue() or CMUseValue() sees any (base) type that has an associated "use value" handler, it will spawn a dynamic value.

The spawning is done essentially by calling the "use value" handler. It is expected to set up a refCon to pass among the value handlers and a pointer to another metahandler. These are returned to CMNewValue() or CMUseValue() which uses newDynamicValue() to do the actual creation of the dynamic value. The extensions are initialized, the metahandler pointer saved, and the refCon is also saved. The pointer to the created dynamic value header is what CMNewValue() or CMUseValue() returns to the user as the refNum.

When the user attempts to do a value operation using this refNum, a check is made that the refNum is for a dynamic value. If it is, the corresponding handler routine will be called. The vector entries are set on first use of a value operation. It may mean searching up the base value chain, but once found, the handler address is saved in the top layer vector (associated with the refNum) so the search doesn't have to be done again.

Note that if the search must be done up the base value chain, then the dynamic value refNum (pointer), in addition to the handler address, must be saved. This is very much like C++ classes, where inherited methods are called and the appropriate "this" must also be passed. The "this" in this case is the refNum.

Previously there was described a layered type T which was registered in the Container Manager with its two base types Layer1 and Layer2 as follows:

```
layer1  = CMRegisterType(container, "Layer1");
layer2  = CMRegisterType(container, "Layer2");
t       = CMRegisterType(container, "T");
CMAddBaseType(t, layer1);
CMAddBaseType(t, layer2);
```

Figure 7:
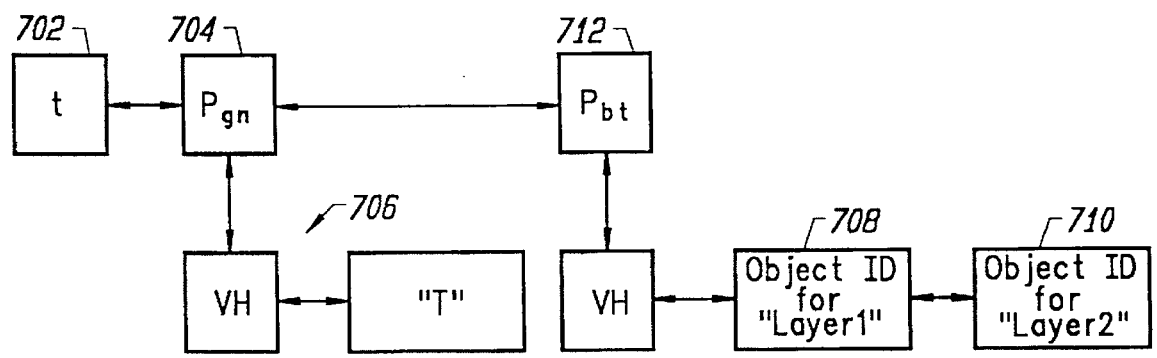
FIG. 7 illustrates a type object using the notation of FIG. 6.

Internally, the t object can be represented as shown in FIG. 7 (using the notation of FIG. 6). The value data segments are shown here with the data the segment will point to in the container.

For the t object 702, the global name property 704 and value 706 are created, as usual, by calling CMRegisterType(). The CMAddBaseType() calls add the base types. These are recorded as the object IDs for each base type in the order created as separate value segments 708, 710 for a special "base type" property 712 belonging to the type object 702. The value segments 708, 710 store only the Object IDs of the base types; the global name of the base types are stored as values such as 706 in respective type objects similar to 702.

As mentioned above, CMNewValue() or CMUseValue() spawn dynamic values if the original type or any of its base types have an associated "use value" handler. Assume that was done for T in the above example. What happens is that CMUseVALUE0 or CM'seValue() will look at its type object (t here) to see if the base type property is present. If it is, it will follow each type "down" to leaf types using a depth-first search.

In the example, layer1 will be visited, then layer2, and finally the original type T itself. If the layer1 type object had base types of its own, they would be visited before using layer1 itself. Hence the depth-first search down to the leaf types.

For each type processed, if it has a "use value" handler of its own, it will be called to get a refCon and value handler metahandler. These are passed to newDynamicValue() to create a dynamic value for the original "real" value. newDynamicValue() always returns its refNum that will be the dynamic value it created. The first layer will create the dynamic value property and put the dynamic value header on its value header list. All further calls to newDynamicValue() will pass the most recent refNum returned from it. newDynamicValue() then chains these off the first dynamic value header. This produces the desired layering result.

The following C-language code defines TOCValue, the format of one of the TOCValue data segments 426 (FIG. 4) or 512, 514, 516 (FIG. 5):

```
© 1992 Apple Computer, Inc.

union TOCValueBytes {                                      /* Layout of value/Length fields; */
    struct {                                               /* value if not immediate(not explicitly here): */
        CM_ULONG value;                                    /* offset to value if not immediate */
        CM_ULONG valueLen;                                 /* value length if not immediate */
    } not Imm;
    struct {                                               /* value for a global name */
        CM_ULONG offset;                                   /* offset to value in container */
        struct GlobalName *globalNameSymbol;               /* ptr value for a global name (in memory) */
    } globalName;
    union {                                                /* actual value if immediate placed here: */
        CM_UCHAR ucharsValue[2*sizeof(CM_ULONG)];          /* value if immediate unsigned char(s) */
        CM_ULONG ulongValue;                               /* value if immediate unsigned long */
        CM_USHORT ushortValue;                             /* value if immediate unsigned short */
        CM_UCHAR ubyteValue;                               /* value if immediate unsigned byte */
        void *ptrValue;                                    /* value if immediate pointer */
    } imm;
};
typedef union TOCValueBytes TOCValueBytes, *TOCValueBytesPtr;
struct TOCValue {                                          /* Layout of a TOC type's value: */
    ListLinks valueLinks;                                  /* links to next/prev value (must be first) */
    struct TOCValueHdr *theValueHdr;                       /* ptr back to ValueHdr "owning" this value */
    ContainerPtr container;                                /* ptr to "owning" container control block */
    CMValueFlags flags;                                    /* flags */
    TOCValueBytes value;                                   /* value and length or immediate value */
    unsigned long LogicalOffset;                           /* original (unedited) logical offset */
```

© 1992 Apple Computer, Inc.

```
};
typedef struct TOCValue TOCValue, *TOCValuePtr;
enum ConstValueType {                       /* Data types used to copy data into TOCVal-
                                               ue's: */
    Value_NotImm,                           /* not immediate ==> value and valueLen */
    Value_GlobalName,                       /* global name ptr ==> in-memory str ptr */
    Value_Imm_Chars,                        /* immediate, chars ==> ucharsValue */
    Value_Imm_Long,                         /* immediate, long ==> ulongValue */
    Value_Imm_Short,                        /* immediate, short ==> ushortValue */
    Value_Imm_Byte                          /* immediate, byte ==> ushortValue */
};
typedef enum ConstValueType ConstValueType;
```

The following C-language code defines the format of a Value Header (both real value headers and dynamic value headers).

© 1992 Apple Computer, Inc.

```
struct TOCValueHdr {                                /* Layout of a TOC property type: */
    ListLinks     valueHdrLinks;                    /* Links to next/prev value hdr (must be first) */
    struct TOCProperty *theProperty;                /* ptr to "owning" property */
    ListHdr       valueList;                        /* list of actual values */
    CMObjectID    typeID;                           /* the value's type ID */
    ContainerPtr  container;                        /* ptr to "owning" container control block */
    unsigned long size;                             /* total current size of the value data */
    unsigned long logicalSize;                      /* original (unupdated) size of the value data */
    unsigned short valueFlags;                      /* flags indicating stuff about the value */
    CMGeneration  generation;                       /* generation number */
    unsigned long useCount;                         /* count of nbr of times "used" */
    CMRefCon      valueRefCon;                      /* user's value refCon */
    TouchedListEntryPtr touch;                      /* ptr to updating touched list entry */
    union {                                         /* this field depends on kind of value hdr: */
        struct TOCValueHdr *dynValue;               /* ptr to dynamic value hdr or NULL */
        struct DynValueHdrExt *extensions;          /* ptr to dynamic value hdr extensions */
    } dynValueData;                                 /* [extensions onty when it's a dynamic value] */
    union {                                         /* references recorded by this value */
        TOCObjectPtr refDataObject;                 /* associated ref object; NULL if no refs */
        ListHdrPtr refShadowList;                   /* or shadow list of the actual data */
    } references;                                   /* (refShadowList only in recording value) */
};
typedef struct TOCValueHdr TOCValueHdr, *TOCValueHdrPtr;
struct DynValueHdrExt {                             /* Extensions to TOCValueHdr for a dynamic value: */
    TOCValueHdrPtr baseValue;                       /* ptr to base value of this dynamic value */
    DynamicValueVector dynValueVector;              /* dynamic value handler vector */
    CMMetaHandler metaHandler;                      /* metahandler to get handler addresses*/
};
typedef struct DynValueHdrExt DynValueHdrExt, *DynValueHdrExtPtr;
/* Some of following valueFlags echo the flags field a TOCValue entry. That is because a
CMValue "refNum" that an API user is given and in turn given back to us is a pointer to a
TOCValueHdr. It is sometimes more convenient therefore to check the kind of value we have
by looking at the header then "going out" to the value. In all but continued values there
is only one TOCValue entry on the valueList anyway. So echoing is more efficient then
always going after the tail or head (they're the of a valueList just to see the flags and
the kind of value. */
#define ValueDeleted        0x0001U    /* valueFlags: 1 ==> deleted value */
#define ValueContinued      0x0002U    /* ==> continued */
#define ValueGlobal         0x0004U    /* ==> global name */
#define ValueImmediate      0x0008U    /* ==> immediate value */
#define ValueOffPropChain   0x0800U    /* ==> dynamic value off prop chain */
#define ValueDynamic        0x1000U    /* ==> dynamic value */
#define ValueUndeletable    0x2000U    /* ==> can't be deleted */
#define ValueProtected      0x4000U    /* ==> locked/protected value */
#define ValueDefined        0x8000U    /* ==> fully defined (in read only) */
/* ValueUndeleteable and ValueProtected are levels of protection bits. */
/* In order to make dealing with dynamic values easier, the following macros are provided.
IsDynamicValue(v) is a more self-documented test to see if a TOCValueHdr is indeed a
dynamic value, while DYNEXTENSIONS(v) allows simpler notational access to a dynamic value
header's extension fields.
#define IsDynamicValue(v) ((((TOCValueHdrPtr)(v))->valueFlags & ValueDynamic) != 0)
#define DYNEXTENSIONS(V)         /* to make access to extensions a "little" easier*\
    (((TOCValueHdrPtr)(v))->dynValueData.extensions)
/* The dynamic value vectors are defined as follows */
```

© 1992 Apple Computer, Inc.

```
struct DynamicValueVectorEntries {        /* Layout of a dynamic value vector entry: */
    CMHandlerAddr handler;                /* the handler address */
    CMValue thisValue;                    /* the handler's value (C++ "this") */
    Boolean active;                       /* true ==> handler is in calling chain */
};
typedef struct DynamicValueVectorEntries DynamicValueVectorEntries,
            *DynamicValueVectorEntriesPtr;
struct DynamicValueVector {
    DynamicValueVectorEntries  cmGetValueSize;
    DynamicValueVectorEntries  cmReadValueData;
    DynamicValueVectorEntries  cmWriteValueData;
    DynamicValueVectorEntries  cmInsertValueData;
    DynamicValueVectorEntries  cmDeteteValueData;
    DynamicValueVectorEntries  cmGetValueInfo;
    DynamicValueVectorEntries  cmSetValueType;
    DynamicValueVectorEntries  cmSetValueGen;
    DynamicValueVectorEntries  cmReleaseValue;
};
typedef struct DynamicValueVector DynamicValueVector;
```

When a handler is called, it is expected to do its operations on the "base value" of the value passed to it. It gets its base value using CMGetBaseValue (). However, we don't want to allow recursive use of the API for the same value. That would call the handler again and we would be in an infinite loop. Thus the active switch is provided to check for this so we can report an error.

The dynamic value vector is initialized with each handler address thisValue set to NULL. On first use we use the metahandler which was returned from the "use value" handler (the metahandler address is saved in the value header extensions) to get the proper value handler address. It is saved in the handler field of the vector entry. Remember we may have to search up through a dynamic value chain to find an "inherited" value handler operation. Thus the handler used may correspond to a different dynamic value. We must therefore save the dynamic value refNum along with the handler address (in the thisValue). It is similar to the C++ "this" pointer for the value handler operation).

Of course, in the simplest case, where the handler is provided for the original value, the thisValue will point to its own dynamic value header. At the other extreme no handlers are supplied for the operation and we end up using the "real" value that spawned the dynamic value(s). In that case the handler pointer in the vector entry remains NULL and the thisValue will be the "real" value refNum. With no handler we use the actual API routine to process the real value.

As with standard handlers, to simplify this description, some macros are defined for calling the dynamic value handlers. These macros will require the following typedefs as casts to convert the generic handler typedef, HandlerAddr (the type used to store the addresses in the vector), to the actual function type:

© 1992 Apple Computer, Inc.

```
CMSize (*TcmGetValueSize)(CMValue value);
typedef CMSize (*TcmReadValueData)(CMValue value, CMPtr buffer, CMCount offset, CMSize
            maxSize);
typedef void (*TcmWriteValueData)(CMValue value, CMPtr buffer, CMCount offset, CMSize
            size);
typedef void (*TcmInsertValueData)(CMValue value, CMPtr buffer, CMCount offset, CMSize
            size);
typedef void (*TcmDeleteValueData)(CMValue value, CMCount offset, CMSize size);
typedef void (*TcmGetValueInfo)(CMValue value, CMContainer *container, CMObject *object,
            CMProperty *property, CMType *type, CMGeneration *generation);
typedef void (*TcmSetValueType)(CMValue value, CMType type);
typedef void (*TcmSetValueGen)(CMValue value, CMGeneration generation);
typedef void (*TcmReleaseValue)(CMValue);
```

Here now are the macros used to do the calls using the vector.

© 1992 Apple Computer, Inc.

```
#define CMDynGetValueSize(v)
    (*(TcmGetValueSize)DYNEXTENSIONS(v)->dynValueVector.cmGetValueSize.handler)((CMValue)(v))
#define CMDynReadValueData(v, b, x, m)
    (*(TcmReadValueData)DYNEXTENSIONS(v)->dynValueVector.cmReadValueData.handler)((CMValue)(v),
    (CMPtr)(b), (CMCount)(x), (CMSize)(m))
#define CMDynWriteValueData(v, b, x, n)
```

© 1992 Apple Computer, Inc.

```
(*(TcmWriteValueData)DYNEXTENSIONS(v)->dynValueVector.cmWriteValueData.handler)((CMValue)(v
), (CMPtr)(b), (CMCount)(x), (CMSize)(n))
#define CMDynInsertValueData(v, b, x, n)
(*(TcmInsertValueData)DYNEXTENSIONS(v)->dynValueVector.cmInsertValueData.handler)((CMValue)
(v), (CMPtr)(b), (CMCount)(x), (CMSize)(n))
#define CMDynDeleteValueData(v, x, n)
(*(TcmDeleteValueData)DYNEXTENSIONS(v)->dynValueVector.cmDeleteValueData.handler)((CMValue)
(v), (CMCount)(x), (CMSize)(n))
#define CMDynGetValueInfo(v,c,obj,p,t, g)
(*(TcmGetValueInfo)DYNEXTENSIONS(v)->dynValueVector.cmGetValueInfo.handler)((CMValue)(v),
(CMContainer*)(c), (CMObject*)(obj), (CMProperty*)(p), (CMType*)(t), (CMGeneration*)(g))
#define CMDynSetValueType(v, t)
(*(TcmSetValueType)DYNEXTENSIONS(v)->dynValueVector.cmSetValueType.handler)((CMValue)(v),
(CMType)(t))
#define CMDynSetValueGen(v, g)
(*(TcmSetValueGen)DYNEXTENSIONS(v)->dynValueVector.cmSetValueGen.handler)((CMValue)(v),
(CMGeneration)(g))
#define CMDynReleaseValue(v)
(*(TcmReleaseValue)DYNEXTENSIONS(v)->dynValueVector.cmReleaseValue.handler)((CMValue)(v))
```

As mentioned earlier, each corresponding API value operation must check to see if it has a dynamic value and call the corresponding handler which does the operation. It must get the proper address on first use. It must set switches to mark the handler as active. It must also set a switch to allow CMGetBaseValue () calls which are only allowed from dynamic value handlers. Thus the algorithm for calling a value handler looks something like this (ignoring all errors for the moment):

© 1992 Apple Computer, Inc.

```
if (IsDynamicValue(v)) {
    v = GetDynHandlerAddress(v, h, g);
    if (IsDynamicValue(v)) {
        SignalDynHandlerInUse(v, h);
        AllowCMGetBaseValue(container);
            Call the proper dynamic value handler with one of the
            above macros definitions. The macro will pass the
            appropriate value corresponding to a possibly inherited
            handler. If the handler returns a value save it to be
            returned as the result.
        DisAllowCMGetBasevalue(container);
        SignalDynHandlerAvailable(v, h);
        return [result];
    }
}
```

In the above algorithm, v is a dynamic CMValue (note that GetDynHandlerAddress may CHANGE it); h is a pointer to a vector entry in the extensions; and g is the metahandlers operation type string.

The GetDynHandlerAddress() routine takes a vector entry and sets the handler address as a function of the "g" metahandler operation code. On first call it will search for inherited method if necessary. The vector is updated with the found handler address and the associated "this" value saved. This is the value returned and whose we set. We do the call and reset the switches, all using the same "this" value.

Note, in the limit, the search for the inherited handler may end up finding the original "real" value that spawned the dynamic values. Thus what is returned from GetDynHandlerAddress() in this case is a "real" value to be operated upon using the standard API routine itself. That is why a second IsDynamicValue() must be done to bypass the handler call and switch setting/resetting. Since there is no guarantee the value coming back from the GetDynHandlerAddress() call is the one that went in, the code must reload any copies of the value sometime following the GetDynHandlerAddress() calls.

The following macros are defined. They basically mimic the above algorithm, but here take errors into account.

© 1992 Apple Computer, Inc.

```
#define GetDynHandlerAddress(v, h, g, s, x) if ((v = cmGetDynHandlerAddress((CMValue)(v),
        &DYNEXTENSIONS(v)->dynValueVector.h, (CMGlobalName)(g), s)) == NULL) \ return x
#define SignalDynHandlerInUse(v, h) DYNEXTENSIONS(v)->dynValueVector.h.active = true
#define SignalDynHandlerAvailable(v, h) DYNEXTENSIONS(v)->dynValueVector.h.active = false
#define AllowCMGetBaseValue(container) ++((ContainerPtr)(container))->getBaseValueOk
#define DisAllowCMGetBaseValue(container) if (—((ContainerPtr)(container))->getBaseValueOk
        < 0) ((ContainerPtr)(container))->getBaseValueOk = 0;
```

The IsDynamicValue() call is defined above. The "h" in all these macros is the vector entry name, and the "x" parameter in GetDynHandlerAddress is used for error reporting. Also for GetDynHandlerAddress, the "s" is the name of the API routine doing the call. This is used by cmGetDynHandlerAddress() simply as an insert if it should report an error prior to returning NULL.

Note the AllowCMGetBaseValue and DisAllowCMGetBaseValue macros. As mentioned earlier, a CMGetBaseValue() is only allowed from value operation handlers. The two macros control a single switch, getBaseValueOk, which the CMGetBaseValue() routine checks. The switch is actually a counter which, just to be safe, is never allowed to stay negative. 0 means CMGetBaseValue() is illegal. Greater than 0, it's legal. The reason the switch is a counter is because dynamic values use CMGetBaseValue() to do their operations in terms of their base values. If a dynamic value's base is also dynamic (i.e., we have layered dynamic values), then we have a nesting condition. Hence the counter.

C. Routines

The Application Program Interface includes a number of calls to Container Manager routines to perform session operations, container operations, type and property operations, object operations, value operations and reference operations. Only certain of the calls which are important for an understanding of the invention will be described herein.

1. Session Operations

CMHandlerAddr  CMSetMetaHandler(const CMSession sessionData,
    const CMGlobalName typename, CMMetaHandler metaHandler)

This routine records the association of Global Names with their metahandlers in metahandler table 404 (FIG. 4). The designated metahandler will be associated with the typeName. The previous metahandler for this type name, if any, is returned. If there was no previous metahandler defined, NULL is returned. The association between handlers and type names is global within a session, rather than specific to a given container.

A metahandler will be called whenever the Container Manager or the application needs to find out how to perform a given operation on a container or value of this type. The metahandler can define specific handlers for any number of different operations, potentially with completely different interfaces. Metahandlers for values are required to support certain value operations, listed previously.

When called, a metahandler returns a procedure pointer to specific handlers that can carry out the desired operation. Typically, these procedure pointers will be cached and then used in the normal manner. Each metahandler may provide handlers for any number of operations, though it itself implements only the operation of obtaining and returning a requested handler pointer. A metahandler has the following prototype:

CMProcPtr CMMetaHandler(CMType targetType,
    const CMGlobalName operationType);

This is the required prototype of any metahandler registered by the application using CMSetHandler(). When a specific operation is required, the metahandler is called, and it must return a CMProcPtr for the operation, or return NULL to indicate that the operation is not available. Once retrieved, the CMProcPtrs may be cached indefinitely.

targetType is the refnum of the type to which the operation will be applied, and operationType is the name of the desired operation. targetType is required because in some cases the operation may be applied to values whose type has no global unique name.

This approach provides more flexibility than simply passing a vector of procPtrs, and allows each operation to have its own prototype for static type checking, which would be impossible if operations were indicated by passing a selector.

There are three varieties of metahandlers: session, container, and value, though this is not a fundamental distinction. Only value metahandlers are important to the present invention.

CMHandlerAddr  CMGetMetaHandler(const CmSession sessionData,
    const CMGlobalName typeName)

This function searches the metaHandler symbol table 404 for the specified typeName and returns the associated metahandler address. If no metahandler is associated with that type name, it returns NULL.

CMHandlerAddr  CMGetOperation(CMType targetType, const
    CMGlobalName operationType);

This routine takes a targetType which has a globally unique name and uses that name to find a metahandler. It then calls the metahandler to get the handler routine address for the specified operationType. The function returns the resulting address.

Metahandler proc addresses are given to the Container Manager by calls to CMSetMetaHandler. The global name for the input targetType is treated as the typeName to find the metahandler.

2. Object Operations

CMObject CMNewObject(CMContainer targetContainer);

A refnum to a new object in the designated container is returned. At this point the object has nothing but an identity.

CMObject  CMGetNextObject(CMContainer targetContainer,
    CMObject currObject);

A refnum for the next object defined in the same container is returned. currObject is generally a refNum previously returned from this routine. Successive calls to this routine will thus yield all the objects in the container.

Objects are returned in order of increasing ID. If there are no larger object IDs defined, NULL is returned. To begin the iteration, pass NULL as the object refnum.

Since type and property descriptions are objects, they will be returned in sequence as they are encountered. Only objects in the current container will be returned, not objects in any base containers.

CMProperty  CMGetNextObjectProperty(CMObject theObject,
    CMProperty currProperty);

A refnum for the next property defined for this object is returned. currProperty is generally a refNum previously returned from this routine. Successive calls to this routine will thus yield all the properties for the given object.

This routine returns the refNum for the next property defined for the given object. If there are no more properties defined for this object, NULL is returned. If currProperty is NULL, the refNum for the first property for the object is returned.

CMGlobalName CMGetGlobalName(CMObject theObject);

The name of the designated object is returned. This operation is typically used on types and properties, but it can be applied to any object with a Globally Unique Name property. NULL is returned if the object does not have a Globally Unique Name.

3. Type and Property Operations

All types and properties must be registered before they can be used. The operations behave the same on standard types and properties as on normal types and properties. However, standard types and properties will not actually be given TOC entries for their descriptions just because they are registered. If additional, non-standard properties are added to the description of a standard type or property, they will be stored.

The refnum returned from registration can be used in exactly the same manner as an object refnum in the object and value operations.

Types and properties may be registered more than once; the refnum returned from all the different registrations of the same type is the same. Identity of types is defined by string equality of their names.

```
CMType   CMRegisterType(CMContainer targetContainer,
           const CMGlobalName name);
```

The designated type is registered in the designated container, and a refnum for it is returned. If a type with that name already exists, the refNum for it is returned. Standard types may be registered, but this is not required.

```
CMProperty  CMRegisterProperty(CMContainer targetContainer,
             const CMGlobalName name);
```

The designated property is registered in the designated container, and a refnum for it is returned. If a property with that name already exists, the refNum for it is returned. Standard properties may be registered, but this is not required.

```
CMBoolean CMIsType(CMObject theObject);
CMBoolean CMIsProperty(CMObject theObject);
```

These operations test the designated object and return non-zero if it is a type description or a property description, respectively, otherwise 0.

```
CMType   CMGetNextType(CMContainer targetContainer,
           CMType currType);
```

A refnum for the next type registered in the same container is returned. currType is generally a refNum previously returned from this routine. Successive calls to this routine will thus yield all the type descriptions in the container.

Types are returned in order of increasing ID. If there are no larger type IDs registered, NULL is returned. To begin the iteration, pass NULL as the type refnum.

```
CMProperty CMGetNextProperty(CMContainer targetContainer,
            CMProperty currProperty);
```

A refnum for the next property registered in the same container is returned. currProperty is generally a refNum previously returned from this routine. Successive calls to this routine will thus yield all the property descriptions in the container.

Properties are returned in order of increasing ID. If there are no larger property IDs registered, NULL is returned. To begin the iteration, pass NULL as the property refnum.

```
CMCount   CMAddBaseType(CMType type, CMType baseType);
```

This routine defines base types for a given type so that layered dynamic values can be created. Base types essentially provide type inheritance. As previously described, the type trees created by CMAddBaseType() are stored in "type objects".

A base type is added to the specified type. For each call to CMAddBaseType() for the type a new base type is recorded. They are recorded in the order of the calls. The total number of base types recorded for the type is returned. In the embodiment described herein, it is an error to attempt to add the same base type more than once to the type.

```
CMCount   CMRemoveBaseType(CMType type, CMType baseType);
```

The specified base type previously added to the specified type by CMAddBaseType() is removed. If NULL is specified as the baseType, all base types are removed. The number of base types remaining for the type is returned.

4. Value Operations

All the I/O calls in the present embodiment do I/O to or from a buffer provided by the application.

```
CMValue CMUseValue(CMObject object, CMProperty property,
         CMType type);
```

This routine is used to get the refNum for the value of an object's property of the given type. NULL is returned if the value does not exist, or if or the object does not contain the property. If the type of the value corresponds to a global type name that has an associated "use value" handler, or if its base types (if any) have associated "use value" handlers, a dynamic value will be created and the refnum returned will refer to a dynamic value rather than the base value. (Normally, an application will never be aware of this difference.)

Note, if the value is used as an embedded container, then that embedded container must be opened and read using CMOpenContainer(). The data, i.e, the embedded container for such a value can only be defined by using CMOpenNewContainer(). The container type name must be associated with a special set of handlers that define a "return parent value" handler. This handler returns the parent value refNum whose data contains the embedded container.

There is no restriction on reading the data for an embedded container like any other value data using CMReadValueData(). However, the data for an embedded container value includes a TOC. Unless a "blind" copy is being done, the TOC read this way is of not very much use.

The following C-language code implements the CMUseValue() routine.

© 1992 Apple Computer, Inc.

```
CMValue CM_FIXEDARGS CMUseValue(CMObject object, CMProperty property, CMType type)
{
    TOCPropertyPtr          theProperty;
    TOCValueHdrPtr          theValueHdr, baseValueHdr;
    ContainerPtr            container;
    ExitIfBadObject(object, NULL);      /* validate object */
    ExitIfBadProperty(property, NULL);  /* validate property */
    ExitIfBadType(type, NULL);          /* validate type */
    container = ((TOCObjectPtr)object)->container;
    if (container->targetContainer != =
        ((TOCObjectPtr)property)->container->targetContainer ||
        container->targetContainer != =
        ((TOCObjectPtr)type)->container->targetContainer) {
        ERROR3(CM_err_3Containers, CONTAINERNAMEx(container),
            CONTAINERNAMEx(((TOCObjectPtr)property)->container),
            CONTAINERNAMEx(((TOCObjectPtr)type)->container));
        return (NULL);
    }
    /* Find the TOCProperty belonging to the object with the property ID of the
    specified property object */
    theProperty = cmGetObjectProperty((TOCObjectPtr)object,
        ((TOCObjectPtr)property)->objectID);
    if (theProperty == NULL)            /* if property not in object... */
        return (NULL);                  /* ..tell user about it */
    /* If the resulting value is a dynamic value, just return it. If it isn't, this
    might be the first use of the value. In that case we must check to see if a
    dynamic value must be created. This is done by calling cmFollowBaseTypes() to do
    a depth-first search starting from the given type on all of that type's base
    types. Dynamic values are created for each type that has a "use value" handler
    ("new value" handlers are only required for CMNewValue()). The resulting dynamic
    value is returned or the "real" value if there are no dynamic values. */
    theValueHdr = (TOCValueHdrPtr)cmGetPropertyType(theProperty,
        ((TOCObjectPtr)type)->objectID);
    if (theValueHdr) {                  /* if we have a value header... */
        if (theValueHdr->dynValueData.dynValue != NULL){ /* ...if dynamic value
                                                            exists... */
            theValueHdr = theValueHdr->dynValueData.dynValue; /* ... just use it,
                but... */
            ++theValueHdr->useCount; /* ...count dynamic value uses*/
        } else {        /* ...if no dynamic value yet... */
            baseValueHdr = theValueHdr;
            theValueHdr = cmFollowTypes(theValueHdr, (TOCObjectPtr)type, false,
                    NULL);
            ++baseValueHdr->useCount; /* incr use count on base value */
        }
    }
    return ((CMValue)theValueHdr);      /* return real or dynamic value */
}
```

The cmFollowTypes () routine referred to in the above code creates dynamic value layers for the passed type and all of its base types, if any of these types have a "use value" handler. This routine is only called by CMNewValue () or CMUseValue (). For CMNewValue (), "metadata" handler and "new value" handlers are also required. The top-most dynamic value header pointer is returned, and is in turn returned from CMUseValue () or CMNewValue (). NULL is returned if an error is reported. The original "real" value is returned if no dynamic values are created. For CMUseValue (), the isNewValue parameter should be set to false. It should only be set to true for CMNewValue (). Also for CMNewValue (), the constructorData must point at the CMNewValue() ". . . " parameters. These are consumed as the base type metadata (returned from the "metadata" handler) describes how to create data packets from the ". . . " parameters. The packets, in turn, are passed to the "new value" handlers. A "new value" handler uses its data packet to write (possibly different) data to its base value. This written data will then be read and used by the "use value" handler.

The "use value" handler is called for both the CMUseValue() and CMNewValue() cases'. If it's companion "new value" handler wrote data to its base value, the "use value" handler will probably read the data to create its refCon. The refCon will be passed to all value handlers. The "use value" handler returns its refCon along with another metahandler address that is used to get the value handler addresses. These are then used to create the dynamic value.

To produce all the required dynamic values, cmFollowTypes() recursively follows the types, looking for base types as defined by CMAddBaseType(). Each type can have any number of base types. The recursion effectively produces a depth-first search of all the base types.

As each type is completed (i.e., no more base types for it), a dynamic value is created as described above. That is, for CMNewValue(), a type's "metadata" handler instructs us on how many CMNewValue() ". . . " parameters to consume and how to construct their packet. That is passed to the "new value" handler so it can write some appropriate data to the base value. The "use value" is called in all cases which reads the data written by "new value" to construct its refCon. The refCon is returned here along with the metahandler address that will yield the value handler routine addresses.

The refCon and metahandler address are passed to newDynamicValue() to construct one dynamic value (layer).

The resulting dynamic value is used as the base value for the next layer. This produces the desired data structures.

Note, because this routine searches through the types down to their leaves, and then generates the dynamic values on the way back "up", the CMNewValue () "..." parameters must be ordered for the "deepest" type first. For example, given a type tree in which T1 has base types T2 and T3, and T3 has base types T4 and T5 (read as T1 inherits from T2 and T3, and T3 inherits from T4 and T5, the depth-first search, starting at T1, yields the sequence: T2 T4 T5 T3 T1. Then this is the order the CMNewValue() "..." parameters must be in.

The following C-language code implements cmFollowTypes():

---

© 1992 Apple Computer, Inc.

```
TOCValueHdrPtr cmFollowTypes(TOCValueHdrPtr baseValueHdr, TOCObjectPtr type,
        Boolean isNewValue, va_list *constructorData)
{
        ContainerPtr        container = baseValueHdr->container;
        TOCObjectPtr        baseType;
        TOCPropertyPtr      baseTypeProperty;
        TOCValueHdrPtr      theValueHdr, baseValueHdr0;
        TOCValuePtr         theValue;
        CMHandlerAddr       useValueHandler, newValueHandler, metaDataHandler;
        unsigned char       *dataPacket;
        char                *newOrUseValueName, *metaData, *typeName;
        CHRefCon            refCon;
        CMMetaHandler       metaHandler;
        CHBoolean           success;
        /* If any errors are reported, and the error handler returns, we NULL out the base       */
        /* value. That essentialy "puts the breaks" on the dynamic value generation. The         */
        /* NULL result will work ist way back to CMNewValue() or CMUseValue() which it will      */
        /* return.                                                                               */
        /* Note, as soon as we detect an error in here, we free all the dynamic values we        */
        /* created for the "real" value. That should put things back the way they were           */
        /* originally. Of course, error reporters are not suppose to return. We're being         */
        /* "kind" here just in case they do.                                                     */
        if (baseValueHdr == NULL) return (NULL);
        baseValueHdr0 = baseValueHdr;       /* save current baseValueHdr for errors              */
        /* If the current type has any base types, call cmFollowTypes() recursively for each     */
        /* of those base types. That brings us back to here where we will check each of          */
        /* those base types for base types of their own. This process continues down to the      */
        /* "bottom", i.e., leaf types, where we bypass this piece of code. The types are then    */
        /* processed as the recursion unwinds. It is this code, then the effects the depth-      */
        /* first processing of the base types.                                                   */
        baseTypeProperty = cmGetObjectProperty(type, CM_StdObjID_BaseTypes);
        if (baseTypeProperty != NULL) { /* process this type's base types                        */
            theValueHdr = (TOCValueHdrPtr)cmGetListHead(&baseTypeProperty->valueHdrList);
            if (theValueHdr != NULL) {      /* double check for value hdr                        */
                theValue = (TOCValuePtr)cmGetListHead(&theValueHdr->valueList); /* 1st base ID   */
                while (theValue != NULL) {
                    baseType = cmFindObject(container->toc, theValue->value.imm.ulongValue);
                    if (basetype) {
                        baseValueHdr = cmFollowTypes(baseValueHdr, basetype, isNewValue,
                                constructorData);
                        if (baseValueHdr == NULL) return (NULL);
                    }
                    theValue = (TOCValuePtr)cmGetNextListCell(theValue); /* look at next base type */
                } /* while */
            } /* theValueHdr */
        } /* baseTypeProperty */
        /* We are now at a type which has either has no base types or that had all of its base   */
        /* types processed (again through here). This is where we determine whether the type     */
        /* will spawn a dynamic value. We call hasUseValueHandler() that checks for the          */
        /* the "use value" handler for the type. It also checks for the "metadata" and "new      */
        /* value" handlers if we were originatly called from CMNewValue(). If it doesn't pass    */
        /* the tests we return the original base value unchanged. If it does pass the tests,     */
        /* we create a new dynamic value (layer).                                                */
        /* As descibed in the documentation at front of this file, we call the "metadata" and    */
        /* "new value" handlers first only for CMNewValue(). For CMNewValue() or CMUseValue()    */
        /* we then call the "use value handler. For the "new value" call we must first build     */
        /* the data packet from the CMNewValue() "..." parameters using the metadata returned    */
        /* from the "metadata" handler. The packet is sent to the "new value" handler. There     */
        /* it can use CMScanDataPacket() to extract the packet back into variables.              */
        /* Note, as the packets for the layers are created, the constructorData parameter        */
        /* pointer marches across the CMNewValue() "..." parameters. Since we are building       */
        /* the layers as we move up the inheritance hierarchy, from bottom to top, that is       */
        /* what determines the parameter specifications discussed above. Further, it is also     */
        /* why the constructorData is a va_list*. The higher layers must know what the           */
        /* current parameter pointer is. If we had built the hierarchy from top to bottom we     */
        /* wouldn't have needed the "*".                                                         */
        /* And speaking of layers – the newDynamicValue() call is the one responsible for        */
        /* creating a layer. It builds upon the current baseValueHdr and returns a new one.      */
```

-continued

© 1992 Apple Computer, Inc.

```
        /* they are passed up the recursive calls as the function result to build the layer     */
        /* chain. The final, top-most layer, is the one eventually returned to CMNewValue()     */
        /* or CMUseValue(), who then returns it to the user.                                    */
        useValueHandler = hasUseValueHandler(baseValueHdr, type, isNewValue ?
                                &newValueHandler : NULL, &metaDataHandler);
        if (!SessionSuccess) return (NULL);
        if (useValueHandler) {      /* if dynamic value layer is to be created*/
            if (isNewValue) {       /* extra stuff for CMNewValue()...    */
                /* Here we're doing a CMNewValue() -- call the "metadata" handler to get this   */
                /* type's metadata. We can then use that to build a data packet.                */
                metadata = (*(char *(*)(CMType))metaDataHandler)((CMType)type);
                dataPacket = createDataPacket(type,metaData,constructorData);  /*create data pkt... */
                if (!SessionSuccess) {                              /* ...if it failed...       */
                    cmDeleteAllDynamicValueLayers(baseValueHdr0,isNewValue);/* ...delete all layers */
                    return (NULL);                                  /* ...abort creation        */
                }
                /* Call the "new value" handler. It should use the data packet to write data to */
                /* its base value. */
                success = (*(CMBoolean (*)(CMValue, CMType, CMDataPacket))newValueHandler)
                            ((CMValue)baseValueHdr, (CMType)type, (CMDataPacket)dataPacket);
                if (dataPacket != NULL) CMfree(dataPacket);     /* free the packet          */
                newOrUseValueName = "CMNewValue";
            } else {
                newOrUseValueName = "CMUseValue";
                success = true;
            }
            /* In all cases we call the "use value" handler. It should read the data written by */
            /* the "new value" handler to create its refCon. It returns the refCon and a        */
            /* methandler pointer that we will use to get the value operation handler addresses.*/
            /* This is then passed to newDynamicValue() to build the new dynamic value (layer). */
            if (success) {
                metaHandler = NULL;     /* "use value" must set this or error    */
                success = (*(CMBoolean (*)(CMValue, CMType, CMMetaHandler*,
                            CMRefCon*))useValueHandler)((CMValue)baseValueHdr, (CMType)type,
                                &metaHandler, &refCon);
                if (success) {
                    if (metaHandler == NULL) {     /* we must get a methandler back!    */
                        typeName = cmIsGlobalNameObject(type, CM_StdObjID_GlobalTypeName);
                        ERROR2(CM_err_NoDynMetahandler, typeName, CONTAINERNAME);
                        success = false;
                    } else
                        baseValueHdr = newDynamicValue(baseValueHdr, type, metaHandler,
                            refCon, newOrUseValueName);
                }
            }
            if (!success || baseValueHdr == NULL) { /* if something went wrong... */
                cmDeleteAllDynamicValueLayers(baseValueHdr(), isNewValue); /* ...free the layers */
                baseValueHdr = NULL;    /* this will abort the recursion */
            }
        }
        return (baseValueHdr); /* return dynamic value layer      */
}
```

The newDynamicValue routine referred to above is called only by cmFollowTypes() to do the actual construction of the dynamic value for the specified base value. The type is the type that is causing this dynamic value to be created. If the base value is a "real" value, then the dynamic value is added to a "dynamic values" property for the object who owns the value. The "dynamic value"s property is created for the first dynamic value for that object. All further dynamic values with "real" value bases are simply added as values (headers) to that property. If the base value is itself a dynamic value, then the newly created dynamic value is chained to the base (dynamic) value. It is only a backward link from the new dynamic value.

The pointer to the new dynamic value is returned. NULL is returned if any errors are reported. Note, the newOrUseValueName parameter is the string "CMNewValue" or "CMUseValue" and only used for some of the error inserts.

By passing the returned dynamic value pointer as the base value to succeeding newDynamicValue() calls, layers of dynamic values are constructed.

The following C-language code implements newDynamicValue().

© 1992 Apple Computer, Inc.

```
static TOCValueHdrPtr CM_NEAR newDynamicValue(TOCValueHdrPtr baseValueHdr,
        TOCObjectPtr type, CMMetaHandler metaHandler, CMRefCon refCon,
        char *newOrUseValueName)
{
```

-continued

© 1992 Apple Computer, Inc.

```
ContainerPtr         container = baseValueHdr->container;
TOCObjectPtr         theObject;
TOCValueHdrPtr       theDynamicValueHdr, theRealValueHdr;
DynValueHdrExtPtr    extensions;
Boolean              firstDynamicValue;
char                 *typeName;
if (metaHandler == NULL) {          /* we must have a metahandler!                    */
    typeName = cmIsGlobalNameObject(type, CM_StdObjID_GlobalTypeName);
    ERROR2(CM_err_NoMetahandler, typeName, CONTAINERNAME);
    return (NULL);
}
/* It is an error for layered dynamic values to pass as the base value any other      */
/* value header other than the most recent. The code near the end of this routine     */
/* chains layered dynamic values together with each value pointing back to its base.  */
/* The original "real" value gets a pointer to the last one (in the dynValue union    */
/* field of the value header). So by searching back up the chain to the "real" value  */
/* we can get at this pointer to see if the base value passed is equal to it and      */
/* report an error if it is not. Of course, the first time the "real" value is passed */
/* and the dynValue will be NULL. So we will know this case too.                      */
theRealValueHdr = baseValueHdr;     /* start with the current base                    */
while (IsDynamicValue(theRealValueHdr))    /* loop back till we find 1st value        */
    theRealValueHdr = DYNEXTENSIONS(theRealValueHdr)->baseValue;/*that not dynamic value */
firstDynamicValue = (Boolean)(theRealValueHdr->dynValueData.dynValue == NULL);
if (! firstDynamicValue &&          /* do the base check...                           */
        theRealValueHdr->dynValueData.dynValue != baseValueHdr) {
    ERROR2(CM_err_BadRealValue, newOrUseValueName, CONTAINERNAME);  /* ...oops!       */
    return (NULL);
}
/* Create the dynamic value, i.e., a value (header) that is belongs to a special      */
/* property of the caller's object that owns the base value. The object "owning" the  */
/* dynamic value is flagged to indicate there are dynamic values present in that      */
/* object. This protects it from premature deletion. The flag is cleared when the     */
/* last dynamic value for for the object is released. We don't use the "protected"    */
/* flag, which is used for similar purposes, just to be general. Maybe we could       */
/* someday have a protected object with dynamic values!                               */
/* Note, the type we give the dynamic value is that of the type that caused this      */
/* dynamic value to be generated. We never use that fact. But we got to give it       */
/* something and it could aid in debugging this turkey! Do you really think I am      */
/* going to get all this right the first time? Want to buy a bridge?                  */
theObject = cmDefineObject(container, baseValueHdr->theProperty->theObject->objectID,
                CM_StdObjID_DynamicValues,
                0, /* 0 stops dup checks, was "type->objectID"                        */
                NULL, container->generation, kCMDynValue,
                ObjectObject, &theDynamicValueHdr);
if (theObject == NULL) return (NULL);
theDynamicValueHdr->typeID = type->objectID;    /* give the type ID something valid   */
theObject->objectFlags |= DynamicValuesObject;  /* make sure object is flagged        */
/* The dynValueData field in the value header is a union with two alternatives. The   */
/* "dynValue" alternative is a pointer from the base value header to its dynamic      */
/* value. The "extensions" alternative is for the dynamic value header itself and     */
/* points to the additional information, i.e., extensions, needed to accompany a      */
/* dynamic value header. A cmDefineObject() call always initializes the union field   */
/* to NULL on the assumption a "normal" value header is being created. Only in here   */
/* do we create dynamic value headers. Thus only in here do we fill in these fields.  */
/* We just got done creating the dynamic value header. So the first thing to do is    */
/* to allocate its extensions data. So here goes...                                   */
if ((extensions = (DynValueHdrExtPtr)CMmalloc(sizeof(DynValueHdrExt))) == NULL) {
    typeName = cmIsGlobalNameObject(type, CM_StdObjID_GlobalTypeName);
    ERROR2(CM_err_NoDynExtensions, typeName, CONTAINERNAME);
    return (NULL);
}
/* Point the extensions union alternative at the extensions space we just alloacted.  */
/* Also, while we're screwing around in the dynamic value save the refCon passed in.  */
/* The valueRefCon field is convenient so that CMGetValueRefCon() will be able to be  */
/* used by the dynamic value handlers just as it would with normal values.            */
DYNEXTENSIONS(theDynamicValueHdr)  = extensions;    /* point at the extensions data   */
theDynamicValueHdr->valueRefCon    = refCon;        /* remember the refCon            */
theDynamicValueHdr->useCount       = 1;             /* set use count to 1st use       */
/* We now must init the extensions fields. Among the fields are the dynamic value     */
/* handler pointer vector (our "v-table"). It consists of the pointers to the         */
/* corresponding value operation handler, a "protect-from-recursive-use" flag, and    */
/* the value "this" pointer. We init all this stuff to NULL and "not called". The     */
/* metahandler passed to this routine will be used to fill in the handler pointers on */
/* first use (see cmGetDynHandlerAddress()). It will set the "this" pointer too.      */
/* To make it easier to init in the vector, the following macro is used:              */
#define InitDynVector(h)  extensions->dynValueVector.h.handler = NULL;       \
                          extensions->dynValueVector.h.thisValue = NULL;     \
                          extensions->dynValueVector.h.active = false;
```

-continued

© 1992 Apple Computer, Inc.

```
        InitDynVector(cmGetValueSize);              /* prepare handler vector...          */
        InitDynVector(cmReadValueData);
        InitDynVector(cmWriteValueData);
        InitDynVector(cmInsertValueData);
        InitDynVector(cmDeleteValueData);
        InitDynVector(cmGetValueInfo);
        InitDynVector(cmSetValueType);
        InitDynVector(cmSetValueGen);
        InitDynVector(cmReLeaseValue);
    extensions->metaHandler = metaHandler;          /* remember metahandler address       */
    extensions->baseValue = baseValueHdr;           /* point dyn value hdr to its base    */
    /* For layering dynamic values, a backward chain of dynamic value headers is formed   */
    /* from the new dynamic value header back to the original "real" value header. The    */
    /* link is the baseValue extensions field set above. It always points to its base     */
    /* value (it is also used by CMGetBaseValue()). As mentioned above, the dynValue      */
    /* union alternative in a "real" value header always points to the last dynamic       */
    /* value of the chain. A CMUseValue() or CMNewValue() will always return the pointer  */
    /* to the dynamic value at the end of the chain. So, we always want to set the        */
    /* dynValue pointer to the new dynamic value header we created above. Note also we    */
    /* use this pointer to make sure the value passed as a base to us here is indeed the  */
    /* pointer to the end of the chain. We did this check near the start of this routine. */
    /* From that check we get the pointer to the original "real" value. So now we can     */
    /* set that pointer to the new end of chain.                                          */
    theRealValueHdr->dynValueData.dynValue = theDynamicValueHdr;
    /* Layered dynamic values, i.e., dynamic values that have a dynamic value base are    */
    /* NOT treated as distinct values for special property whose chain we put them on when*/
    /* we did the cmDefineObject() above. This means we must take such a value OFF the    */
    /* special property chain. It's not getting lost though. Remember we just got done    */
    /* pointing the "real" value dynValue at it. Note, we flag this value header as       */
    /* being off the chain. This makes it a simple test later when we want to delete      */
    /* these puppies off the layering chain (done by CMReleaseValue()).                   */
    if (! firstDynamicValue)                                /* do only if not the first time    */
        cmDeleteListCell(&theDynamicValueHdr->theProperty->valueHdrList, theDynamicValueHdr);
        cmNutlLinks(theDynamicValueHdr);
        theDynamicValueHdr->valueFlags |= ValueOffPropChain; /* mark as off the prop. chain     */
    } else                                                  /* if we have a NEW dynamic value...*/
        ++container->targetContainer->nbrOfDynValues;       /* ...keep count in targetContainer */
    return (theDynamicValueHdr);                            /* give caller the dynamic value    */
}
```

Returning to the API calls, CMGetNextValue () is defined next:

```
CMValue  CMGetNextValue(CMObject object, CMProperty property,
         CMValue currValue);
```

This routine returns the refNum for the next value (according to the current value order) in the objects property following currValue. If currValue is NULL, the refNum for the first value for that object's property is returned. If currValue is not NULL, the next value for that object's property is returned. NULL is returned if there are no more type values following currValue or the object does not contain the property.

currValue is generally a refNum previously returned from this routine. Successive calls to this routine will thus yield all the values for the specified property of the specified object as long as no other operations change the value order.

```
CMValue  CMNewvalue(CMObject object, CMProperty property,
         CMType type, ...);
```

A new entry is created for the designated object, with the designated property and type and a refnum to the entry is returned. The generation number of the value defaults to the generation number of the container, but it may be set with CMSetValueGeneration.

An object's properties can have more than one value. However, the all the types for the values belonging to a given object property must be unique. It is an error to attempt to create a value for a property when there is already a value of the same type for that property.

If the specified type corresponds to a global type name that has an associated "use value" handler, or if its base types (if any) have associated "use value" handlers, a dynamic value will be created and returned. The value will be initialized using the dataInitParams arguments, which must correspond to the initialization arguments for a value of that type.

Note that the value refnum at this point has no associated data. The value data is set with CMWriteValueData or CMOpenNewContainer (to write an embedded container). If the value will be used as an embedded container it must have the embedded container type. Using CMWriteValueData on a value of this type is an error.

The value is created at an unspecified location in the sequence of values for the specified property. Creating a new value may cause the order of the values for that property to change.

The CMNewValue() routine is implemented merely as a wrap around the CMVNewValue() routine, described below. The CMNewValue() routine merely does what a user would do to use CMVNewValue():

```
CMValue CM_VARARGS CMNewValue(CMObject object, CMProperty property, CMType type, ...)
{
        CMValue value;
        va_list dataInitParams;
        va_start(dataInitParams, type);    /* get ptr to the "..." parameters */
        value = CMVNewValue(object, property, type, dataInitParams);
        va_end(dataInitParams);
        return (value);
}
```

CMVNewValue() does the same as CMNewValue() above, except that the dynamic value data initialization (i.e., "...") parameters are given as a variable argument list as defined by the "stdarg" facility. It assumes that the caller has set up and terminated the variable arg list in the manner shown above for CMNewValue(). CMVNewValue() is implemented as follows:

either a new object (id) or a preexisting one for which a new property and value are to be defined. All the fields for a TOC entry are passed. The objectFlags indicate the type of the object.

Note, the value associated with the property is appended to the end of the property's value list. The caller has the © 1992 Apple Computer, Inc.

```
CMValue CM_FIXEDARGS CMVNewValue(CMObject object, CMProperty property, CMType type,
                                  va_list dataInitParams)
{
        TOCObjectPtr theObject;
        TOCValueHdrPtr theValueHdr, baseValueHdr;
        ContainerPtr   container;
        ExitIfBadObject(object, NULL);      /* validate object */
        ExitIfBadProperty(property, NULL);  /* validate property */
        ExitIfBadType(type, NULL);          /* validate type */
        container = ((TOCObjectptr)object)->container;
        if (container->targetContainer !=
             ((TOCObjectPtr)property)->container->targetContainer ||
             container->targetContainer !=
             ((TOCObjectPtr)type)->container->targetContainer) {
            ERROR3(CM_err_3Containers, CONTAINERNAMEx(container),
                CONTAINERNAMEx(((TOCObjectPtr)property)->container),
                CONTAINERNAMEx(((TOCObjectPtr)type)->container));
            return (NULL);
        }
        container = container->updatingContainer; /* use updating container from here on
                */
        /* This will create a value header for an existing object or a new object with a
        value header but no value. Other "CM..." calls will create the actual value(s).
        */
        theObject = cmDefineObject(container, ((TOCObjectPtr) object)->objectID,
            ((TOCObjectPtr)property)->objectID, ((TOCObjectPtr)type)->objectID, NULL,
            container->generation, 0, ObjectObject, &theValueHdr);
        if (theObject == NULL) return (NULL);
        /* Check to see if a dynamic value must be created. This is done by calling
        cmFollowBaseTypes() to do a depth-first search starting from the given type on
        all of that type's base types. Dynamic values are created for each type that has
        a "use value" and "new value" handler. The resulting dynamic value is returned
        or the "real" value we created above if there are no dynamic values.
        */
        baseValueHdr = theValueHdr;
        theValueHdr = cmFollowTypes(theValueHdr, (TOCObjectPtr)type, true,
              &dataInitParams);
        baseValueHdr->useCount = 1; /* set use count of "real" value */
        return ((CMValue)theValueHdr);       /* return real or dynamic value*/
}
```

The cmDefineObject() routine, used in the above code, is called to define a new TOC entry for an object. We may have option of getting the pointer to the value header (theValueHdr) when theValueHdr is not passed as NULL.

The format of the cmDefineObject() function call is:

```
TOCObjectPtr cmDefineObject(ContainerPtr container, unsigned long objectID,
        const unsigned long propertyID, const unsigned long typeID,
        TOCValueBytesPtr value, const unsigned long generation,
        const unsigned short flags, const unsigned short objectFlags,
        TOCValueHdrPtr *theValueHdr);
```

The function returns a pointer to the object if it was successfully created and NULL if it wasn't. An error is reported if NULL is returned.

The objectFlags determine how the function treats the object and all the object fields (the other parameters). There are four possible objectFlags:

(1). UndefinedObject. Set if the object is to be created, but we don't yet know what its TOC entries are. Basically a null object (or placeholder) is created. It is an incomplete object in that there are no properties or types chained to the object (yet). This flag may be used in combination with the others if we know that the object ID corresponds to a property, type, or neither.

(2). ObjectObject. This flags is used when we don't know the type of the object but we know a property and type for it. If the object already exists and it's undefined (UndefinedObject) it is now considered as defined. If it was an undefined property or type, it now becomes a defined property or type. Of course, duplicate definitions are an error.

(3). PropertyObject. This is similar to ObjectObject, but here we know the object is for a property. It has to either not exist previously, or was previously flagged as UndefinedObject and PropertyObject.

(4). TypeObject. Same as PropertyObject, but for type objects.

Returning again to the Value Operations, value data can be read using the following API call:

---

CMSize CMReadValueData(CMValue value, CMPtr buffer,
    CMCount offset, CMSize maxSize);

---

The data, starting at the offset, for the value is read into the buffer. The size of the data read is returned. Up to maxSize characters will be read (can be 0).

The data is read starting at the offset, up to the end of the data, or maxSize characters, whichever comes first. Offsets are relative to 0. If the starting offset is greater than or equal to the current data size, no data is read and 0 returned.

It is an error to attempt to read a value which has no data, i.e., a value where only a CMNewValue has been done.

Figure 8:
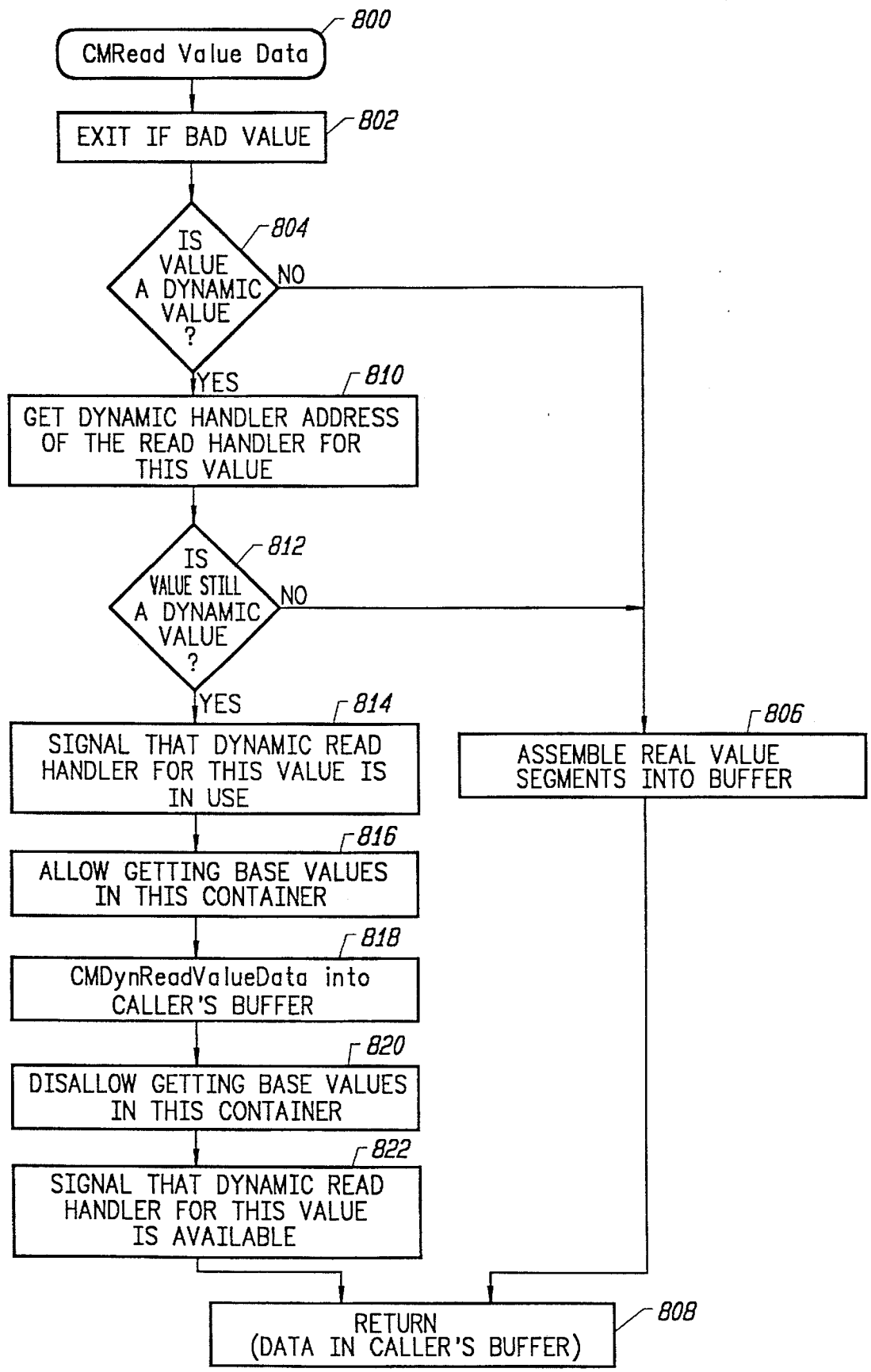
FIG. 8 is a flowchart of a CMReadValueData() routine used in an embodiment of the invention.

FIG. 8 is a flowchart of a CMReadValueData() routine 800. In a step 802, the routine first determines whether the value designation which was passed to it is a valid value, and if not, it exits. In a step 804, the routine determines whether the value is a dynamic value or not. If it is not a dynamic value, then the routine merely obtains the real value from the real value segments (e.g. 426) and assembles them into the caller's buffer (step 806). It then returns to the caller (step 808).

If the value is a dynamic value, then in a step 810, the routine obtains the dynamic handler address of the read handler associated with this value. To obtain the dynamic handler address, the routine calls a cmGetDynHandlerAddress() function (described below), passing the value, a pointer to the dynamic handler vector entry for the desired read handler, and an indication that it is a read handler which is being sought. If this was not the first use of the handler, the cmGetDynHandlerAddress() function returns the desired handler address from the vector entry specified in the calling parameters. If it is the first use, then the function finds the inherited handler address and returns it.

In either case, the value may have changed, so in a step 812, the CMReadValueData() routine 800 checks again whether the value is still a dynamic value. If not, then the real value is assembled (step 806) as previously described, and returned in the caller's buffer (step 808).

If the value is still a dynamic value, then the routine signals that the dynamic read handler for this value is in use (step 814). This step sets a flag specific to the value and the read handler of that value, which is used to detect an error by recursion.

In step 816, another flag is set which allows getting base values in the present container. Only dynamic value handlers are permitted to get base values, since base values are not defined for real values.

In step 818, the actual read handler routine is called as a procedure. The address of that routine was placed in the value's dynamic value extensions vector previously in step 810.

In step 820, the routine disallows getting of base values in this container, and in step 822, it signals that the dynamic read handler for this value is once again available. The routine than returns with the requested data in the caller's buffer (step 808), as placed there by step 818.

The following C-language code implements CMReadValueData():

---

© 1992 Apple Computer, Inc.

---

```
CMSize CM_FIXEDARGS CMReadValueData(CMValue value, CMPtr buffer, CMCount offset, CMSize
       maxSize)
{
       TOCValueHdrPtr  theValueHdr;
       TOCValuePtr     theValue;
       ContainerPtr            container;
       unsigned char           *p;
       unsigned long           len, remaining, totatRead, amountRead;
       ExitIfBadValue(value, 0);       /* validate value */
       container = ((TOCValueHdrPtr)
       value)->container; /* NEVER use
       updatingContainer
            here */
       if (IsDynamicValue(value)) {    /* process dynamic value... */
            GetDynHandlerAddress(value, cmReadValueData, CMReadValueDataOpType,
                 "CMReadValueData", 0);
            if (IsDynamicValue(value)) {
                 SignalDynHandlerInUse(value, cmReadValueData);
                 AllowCMGetBaseValue(container);
                 totalRead = (unsigned long)CMDynReadValueData(value, buffer,
                      offset, maxsize);
```

© 1992 Apple Computer, Inc.

```
            DisAllowCMGetBaseValue(container);
            SignalDynHandlerAvailable(value, cmReadValueData);
            return (totalRead);
        }
    }
    theValueHdr = (TOCValueHdrPtr)value;      /* ("this") value may have changed */
    if (maxsize == 0 !! buffer == NULL) return (0);
    /* Scan across the value list for the value header and concat data into buffer.
    A value list will exist for continued values. The user views the data as one
    contiguous chunk of stuff. But a continued value is actually a set of
    non-contiguous smaller chunks that we concat into the user's buffer. The user
    specifies a starting offset with respect to his or her view of the contiguous
    data. We must map that offset into an offset within the proper starting
    continued value segment. The mapping is done by cmGetStartingValue(). */
    if (cmIsEmptyList(&theValueHdr->valueList)) { /* must have a value */
            ERROR1(CM_err_HasNoValue, CONTAINERNAME);
            return (0);
    }
    theValue = cmGetStartingValue(theValueHdr, offset, &offset); /* get start
            seg/offset */
    if (theValue == NULL) return (0);     /* offset out of range */
    P   = (unsigned char *)buffer;        /* p points to next byte to read to */
    remaining = (unsigned long)maxSize;   /* remaining bytes to read */
    totalRead = 0;                        /* how much we actually do read */
    while (theValue && remaining) {       /* read value (segments)... */
        Len = cmGet1ValueSize(theValue) - offset; /* (note, immediates work here)
            */
        if (len > remaining) len = remaining; /* (note, so do global names) */
        if (len) {                        /* if more is wanted... */
            amountRead = cmRead1ValueData(theValue, p, offset, len); /* read 1
                    value segment */
            totalRead += amountRead;      /* keep track of how much we read */
            if (amountRead < len) break;  /* if end of total value, we're done
                    */
            p += len;                     /* point at next free byte in buffer */
        }
        offset = 0;                       /* full segments from now on */
        remaining -= len;                 /* adjust what's remaining to read */
        theValue = (TOCValuePtr)cmGetNextListCell(theValue); /* point to next
                    value seg */
    }
    return (totalRead);                   return total amount concatenated */
}
```

The IsDynamicValue() call made by the above CMReadValueData() routine is the macro defined previously which merely checks the appropriate flags for the value. The GetDynHandlerAddress() call is also a macro defined previously, which calls a cmGetDynHandlerAddress() routine.

The call to cmGetDynHandlerAddress() is of the form:

```
CMValue cmGetDynHandlerAddress(CMValue value,
    DynamicValueVectorEntriesPtr vectorEntry,
    CMconst_CMGlobalName operationType,
    char *routineName);
```

A dynamic value handler is callable if it exists (of course) and it is not being used recursively. The vectorEntry points to the dynamic value entry in its vector belonging to the extensions of the passed dynamic value. If this is not the first use of the handler, the vector entry contains the handler address and its associated ("this") value (discussed below). If it is first use, cmGetDynHandlerAddress() must find the ("inherited") handler address and its associated "this" value. In either case, the "this" value is returned as the function result. NULL is returned if an error is reported.

The returned value, and the one saved in the vector entry may not be the same. They are the same if the passed value already has a handler. If it doesn't, an "inherited" handler, from one of the dynamic value's base values is used. The value associated for whoever has the handler is the "owning" value. In C++ terms, it is the "this" pointer. In the limit, we could end up using the original "real" value that spawned the dynamic value(s). If that is indeed the case, we end up using the calling routine which will always be an API value operation.

The found handler address and "this" pointer are saved in the passed dynamic value's vector entry so we don't have to do the search on successive uses. The "this" pointer and handler address are also saved in the vector entry corresponding to "this" (unless, of course, it is the "real" value).

In the vector entry there is also a boolean flag that tells us whether the handler is currently active, i.e., in the call chain. If it is we have a recursion attempt. This causes an error report and NULL to be returned. Since we will always find the handler or use the "real" value, we can never get an error from that. The recursion is the only error condition.

cmGetDynHandlerAddress() can be implemented as follows:

© 1992 Apple Computer, Inc.

```
CMValue cmGetDynHandlerAddress(CMValue value, DynamicValueVectorEntriesPtr vectorEntry,
                CMconst_CMGlobalName operationType, char *routineName)
{
    Long            entryOffset;
    CMValue         origValue;
    ContainerPtr    container;
    CMHandlerAddr   handler;
    /* It's an error to attempt a recursive call...                                    */
        if (vectorEntry->active) { /* error if recursing...    */
            container = ((TOCValueHdrPtr)value)->container;
            ERROR2(CM_err_HandlerRecursed, routineName, CONTAINERNAME);
            return (NULL);
        }
    /* We are not recursing and this is not the first time we're using this handler, just */
    /* return the "this" pointer associated with the handler we found on an earlier call. */
    /* They were initialized to NULL when the vector was allocated. We cannot test the    */
    /* handler pointer because it will not be set if the "this" pointer is for a base     */
    /* "real" value.                                                                      */
    if (vectorEntry->thisValue != NULL) return (vectorEntry->thisValue);
    /* This is the first call to the handler. We now must search up the dynamic value    */
    /* chain, starting with the passed dynamic value, Looking for the first dynamic value */
    /* that supplies the handler. The handler is accessed in the usual way via its dynamic */
    /* value metahandler.                                                                 */
    origValue = value;                  /* remember starting dynamic value               */
    for (;;) {                          /* loop till we find the handler...              */
        handler = (CMHandlerAddr)(*DYNEXTENSIONS(value)->metaHandler)(NULL,
            operationtype);
        if (handler != NULL) break;     /* break when we find the handler                */
        /* If not found, we must get the current value's base value. We can do this until */
        /* we reach the original "real" value. If we do reach it, then that stops the search */
        /* and it is the "real" value we return. In that case, there is no handler because */
        /* the calling API value routine will directly operate on the value. Thus we leave */
        /* the handler address in the original value alone. Of course we set the "this"   */
        /* pointer. The next time the dynamic value is used, we will return the "real"    */
        /* value. As discussed in DynamicValues.h, the caller tests the returned value    */
        /* to see if it is still a dynamic value. If it isn't, the handler use is bypassed. */
        value = (CMValue)(DYNEXTENSIONS(value)->baseValue);/* basically a                */
        CMGetBaseValue()
        if (!IsDynamicValue(value)) {   /* if we reached the "real? value...              */
            vectorEntry->thisValue = value;/* save "this" value for next time             */
            return (value);             /* return the "real" value as "this"              */
        }
    } /* for */
    /* Set the "this" pointer and handler address in the original vector entry for the   */
    /* next time we use it. Note that we can only exit the above "for" loop if we find   */
    /* the handler. If we loop up to the "real" value without finding it, we exit the    */
    /* routine from inside the Loop after saving the "this" pointer as we do here.       */
    vectorEntry->thisValue = value;     /* remember "this"                                */
    vectorEntry->handler   = handler;   /* remember its handler address                   */
    /* Just to be safe, we want to copy the "this" pointer and handler address in the    */
    /* vector entry corresponding to "this". Of course we only need to do this if we     */
    /* "inherited" a handler (i.e., we looped up to a base dynamic (but not real) value. */
    /* Note, this is where we do the struct offset relocation warned about earlier.      */
    if (value != origValue) {           /* if "inherited"...                              */
        entryOffset = (char *)vectorEntry - (char *)DYNEXTENSIONS(origValue); /* relo-   */
        cate...
        vectorEntry = (DynamicValueVectorEntriesPtr)((char *)DYNEXTENSIONS(value) +
        entryOffset);
        vectorEntry->thisValue = value; /* set "this"'s vector entry                      */
        vectorEntry->handler = handler;
    }
    return (value);                     /* return "this"                                  */
}
```

Returning again to the Value Operations, the complement of CMReadValueData() is CMWriteValueData(). In CMWriteValueData(), the buffer specified by the caller is written to the container and defined as the data for the value. If the value already has data associated with it, the buffer overwrites the "old" data starting at the offset character position. Size bytes are written. Size can be 0.

If the current size of the value data is S (it will be 0 for a new value created by CMNewValue()), then the offset passed by the caller may be any value from 0 to S. That is, existing data may be overwritten or the value extended with new data. The value of S can be obtained using CMGetValueSize(). Note, no "holes" can be created. An offset cannot be greater than S.

Once data has been written to the container, it may be read using CMReadValueData(). Note that CMReadValueData() is also used for containers opened for input using CMOpenContainer(). It thus can be used for all kinds of opens. The converse is not true. CMWriteValueData() may only be used for a container opened for writing (or converting) using CMOpenNewContainer().

CMWriteValueData() calls for a particular value do not have to be contiguous. Writes for other values can be done. The API, specifically, this routine here, takes care of generating "continued" value data (segments) for a value. The data is physically not contiguous in the container with such a case. CMWriteValueData() hides this by allowing the user to view the data as contiguous. The input offset is mapped into the proper starting segment and offset within that.

The following routine implements CMWriteValueData():

© 1992 Apple Computer, Inc.

```
void CM_FIXEDARGS CMWriteValueData(CMValue value, CMPtr buffer, CMCount offset,
        CMSize size)
{
        TOCValueHdrPtr theValueHdr;
        TOCValuePtr theValue, theNextValue;
        ContainerPtr container;
        unsigned char *p;
        char offsetStr[15];
        unsigned long len, remaining, amountWritten, nextfree, valueSize;
        TOCValueBytes valueBytes;
        ExitIfBadValue(value, CM_NOVALUE);   /* validate value */
        if (buffer == NULL) return;
        theValueHdr    = (TOCValueHdrPtr)value;
        container      = theValueHdr->container->updatingContainer;
        if ((container->useFlags & kCMWriting) == 0) {  /* make sure opened for writing */
                ERROR1(CM_err_WriteIllegal1, CONTAINERNAME);
                return;
        }
        if ((theValueHdr->valueFlags & ValueProtected) != 0) {  /* can't write if
                protected! */
                ERROR1(CM_err_WriteIllegal2, CONTAINERNAME);
                return;
        }
        if ((theValueHdr->valueFlags & ValueGlobal) != 0) {  /* can't write to global
                names */
                ERROR1(CM_err_CantWriteGlbl, CONTAINERNAME);
                return;
        }
        if (IsDynamicValue(value)) {            /* process dynamic value... */
                GetDynHandlerAddress(value, cmWriteValueData, CMWriteValueDataOpType,
                        "CMWriteValueData", CM_NOVALUE);
                if (IsDynamicValue(value)) {
                        SignalDynHandlerInUse(value, cmWriteValueData);
                        AllowCMGetBaseValue(container);
                        CMDynWriteValueData(value, buffer, offset, size);
                        DisAllowCMGetBaseValue(container);
                        SignalDynHardlerAvailable(value, cmWriteValueData);
                        return;
                }
                theValueHdr = (TOCValueHdrPtr)value; /* ("this") value may have changed!
                        */
        }
        /* If the value list is empty, create the first or only value for this value
        header. An immediate value is created if the value size is less than or equal to
        the sizeof(CM_ULONG). Otherwise we write the data to the container and set the
        TOC info with the offset to it. */
        if (cmIsEmptyList(&theValueHdr->valueList)) {  /* if we have a empty value list...
                */
                if (offset > 0) {           ...create initial value */
                        ERROR2(CM_err_offset2Big, cmltostr(offset, 1, false, offsetStr),
                                CONTAINERNAME);
                        return;
                }
                if (size <= sizeof(CM_ULONG)) {       /* we can make value immediate... */
                        (void)cmSetValueBytes(container, &valueBytes, Value_Imm_Chars,
                                (unsigned long)buffer, size);
                        cmAppendValue(theValueHdr, &valuebytes, kCMImmediate);
                } else if (size != 0) {       /* value must be written... */
                        #if 0
                        nextFree = CMgetContainerSize(container);
                        CMfseek(container, 0, kCMSeekEnd); /* position to current eof */
                        if (CMfwrite(container, buffer, sizeof(unsigned char), size) !=
                                size) {
                                ERROR1(CM_err_BadWrite, CONTAINERNAME);
                                return;
                        }
                        (void)cmSetValueBytes(container, &valueBytes, Value_NotImm,
                                nextFree, size);
                        cmAppendValue(theValueHdr, &valueBytes, 0);
                        container->physicalEOF = nextFree + size;  /* update next free
                                container byte */
                        SetLogicalEOF(container->physicalEOF); /* Logical EOF == physical
                                EOF */
```

© 1992 Apple Computer, Inc.

```
                    #endif
                    if ((CMSize)cmWriteData(theValueHdr, (unsigned char *)buffer,
                            (unsigned long)size) != size)
                        ERROR1(CM_err_BadWrite, CONTAINERNAME);
            }
            return; /* exit */
    } /* end of 1st value */
    /* At this point we have EXISTING data (possibly already continued). If the
    offset says that we are NOT writing to the end of the data, then we MUST be
    overwriting some of the existing data. In other words, the offset must be less
    than the total size or we have an error. We can only overwrite or append (i.e.,
    concat). We cannot create a "hole". In the code that follows we consume enough
    of the input buffer to do the overwriting staring at the offset. If we consume
    it all, we're done. If not, we have reached the end of the existing value and we
    degenerate into the concat case. */
    valueSize = CMGetValueSize((CMValue)theValueHdr); /* get current size of value */
    if (valueSize != offset) { /* here we must be overwriting... */
            if (TouchIt(container, theValueHdr->container)){/* if recording updates...
                    */
                    CMDeleteValueData(value, offset, size); /* ...do overwrites this
                            way! */
                    CMInsertValueData(value, buffer, offset, size);
                    return; /* we're through */
            }
            theValue =        cmGetStartingValue(theValueHdr, offset, &offset);
            if (theValue == NULL) { /* offset MUST be IN the value */
                    ERROR2(CM_err_Offset2Big, cmltostr(offset, 1, false, offsetStr),
                            CONTAINERNAME);
                    return;
            }
            p                 = (unsigned char *)buffer; /* p points to next byte to write
                            */
            remaining         = (unsigned long)size; /* remaining bytes to write */
            while (theValue && remaining) { /* overwrite existing value data */
                    theNextValue = (TOCValuePtr)cmGetNextListCell(theValue); /* get
                            next value seg */
                    Len = cmGet1ValueSize(theValue) - offset; /* (note, immediates work
                            here!) */
                    if (len > remaining) len = remaining;
                    amountWritten = cmOverwrite1ValueData(theValue, p, offset, len); /*
                            write 1 seg. */
                    if (amountwritten == 0) return;
                    p += amountWritten;
                    offset = 0; /* full segments from now on */
                    remaining -= amountWritten; /* adjust what's remaining to write */
                    theValue = theNextValue; /* point to next value seg */
            }
            if (remaining == 0) return; /* yikes! all of it was written! */
            size = (CMSize)remaining; /* prepare to write rest at end */
            buffer = (CMPtr)p; /* simply fall through to next case */
    } /* end of overwriting existing value data */
    /* At this point we want to concat the new data on to the end of the existing
    data. We are doing this because the input offset was equal to the data size or we
    fell through from above because there are still more bytes to write in an
    overwrite and these bytes "stick" off the end of the current data. Again this is
    a concat case. Neat isn't it?
    Well, actually no! Unlike the code above here we must handle immediate data
    explicitly. It's sort of a hassle. That's because the amount of new data to
    concat to an immediate might mean that it can't be immediate any more. Immediate
    data is Limited in size to less than or equal to sizeof(CM_ULONG). If we can
    cram the new data we do it. If we can't, then we must convert the immediate to a
    non-immediate by writing the data to the container and changing its TOC info to
    be and offset. We then have a non-immediate which falls through to the standard
    concat code for non-immediates. The way all these cases "fall" into one another
    is the "neat" thing here. */
    theValue = (TOCValuePtr)cmGetListTail(&theValueHdr->valueList); /* use tail of
            list */
    if (theValue->flags & kCMImmediate) { /* if current value immediate... */
            if (valueSize + size <= sizeof(CM_ULONG)) { /*cram new data if we can..*/
                    if (size > 0) { /* there must be some data to write */
                            memcpy(theValue->value.imm.ucharsValue + valueSize,
                                    (char *)buffer, (size_t)size);
                            theValue->value.notImm.valueLen = valueSize + size;
                            theValueHdr->size += size;
                            cmTouchImmediateValue(theValueHdr); /* touch for
                                    updating if necessary */
                    }
                    return; /* that's all we need to do! */
```

-continued

© 1992 Apple Computer, Inc.

```
        }
        if (!cmConvertImmediate(theValue)) /* convert the immediate... */
            return;
    } /* end of immediate */
    /* We are now ready to concat the new data on to the end of the existing data.
    Here too life is not simple. A "concat" means here means a physical concat if
    the old data was the last thing written to the SAME container. If it wasn't we
    must create a new value entry on the valueHdr's value list to represent a
    continued value. Note the emphasis on "SAME" container. We could be writing
    updates for an "old"container to be recorded in a new updating container. */
    nextFree = CMgetContainerSize(container);
    if (theValue->value.notImm.value + theValue->value.notImm.valueLen == nextFree &&
        theValue->container == container) { /* must be SAME container!
    */
        if (size > 0) { /* there must be some data to write */
            CMfseek(container, 0, kCMSeekEnd); /* make sure of container
                position */
            if (CMfwrite(container, buffer, sizeof(unsigned char), size) !=
                size) {
                ERROR1(CM_err_BadWrite, CONTAINERNAME);
                return;
            }
            container->physicalEOF = nextFree + size; /* update next free
                container byte */
            SetLogica(EOF(container->physicalEOF); /* logical EOF == physical
                EOF */
            theValue->value.notImm.valueLen += size; /* update total size */
            theVaLueHdr->size += size; /* keep size in valueHdr in sync */
            cmTouchEditedValue(theValueNdr);/*touch for updating if necessary*/
        }
        return;
    }
    /* Too bad! We couldn't realty do a concat. We must create a continued value..*/
    #if 0
    theValue->flags |= kCMContinued; /* flag the current value as cont'd */
    theValueHdr->valueFlags |=ValueContinued; /* also set a more convenient flag */
    CMfseek(container, 0, kCMSeekEnd);
    if (CMfwrite(container, buffer, sizeof(unsigned char), size) != size) {
        ERROR1(CM_err_BadWrite, CONTAINERNAME);
        return;
    }
    container->physicalEOF = nextFree + size; /* update next free container byte */
    SetLogicalEOF(container->physica(EOF); /* logical EOF == physical EOF */
    (void)cmSetValueBytes(container, &valueBytes, Value_NotImm, nextFree, size);
    cmAppendValue(theValueHdr, &valuebytes, 0);
    #endif
    if ((CMSize)cmWriteData(theValueHdr, (unsigned char *)buffer, (unsigned
        long)size) != size)
        ERROR1(CM_err_BadWrite, CONTAINERNAME);
    /* If we're recording updates, then define touched list entry for the write... */
    if (size > 0) cmTouchEditedValue(theValueHdr);/*touch for updating if necessary*/
}
```

In addition to the above, it will be useful to point out certain other API calls supported by the Container Manager. More detailed descriptions of the implementation of these calls are unnecessary, however, since the descriptions above, together with the additional information set forth herein about the Container Manager, are sufficient for a person of ordinary skill to understand the invention.

| VOID | CMInsertValueData(CMValue value, CMPtr buffer, CMCount offset, CMSize size) |
|---|---|

The buffer is inserted into the value's data at the specified offset size bytes are inserted. If the current size of the value data is S (it will be 0 for a new value created by CMNewValue()), then the offset may be any value from 0 to S. That is, the insertion may be anywhere within the data value or the value extended with new data. The value of S can be obtained using CMGetValueSize(). Note, no "holes" can be created. An offset cannot be greater than S. Also, an insertion at offset of S is identical to a CMWriteValueData() to the same place.

Once data has been written to the container, it may be read using CMReadValueData().

From an implementation point of view, continued (i.e., segmented) values are handled by splitting them into one or two new segments. The insertion is always a new segment. The original segment to be inserted to will split into two segments if the insertion is in to its middle. It will remain intact and unsplit if we are inserting into its beginning. The new segment is simply inserted in front of it. For the split case the new segment must be inserted between the split pieces.

| VOID | CMDeleteValueData(CMValue value, CMCount offset, CMSize size) |
|---|---|

Let S be the length of the value data. The bytes from offset to offset+size are deleted from the value, and the value is "closed up". After this operation, the size of the value data is S-size (assuming offset+size is 2 S). If offset is greater than S, no data is deleted. If offset+size is greater than S, all the data from offset to S is deleted. Neither case produces an error.

VOID  CMDefineValueData(cmValue value, CMSize offset, CMSize size);

Existing data in the container, which must have been in the container when it was opened, is defined as the data for the value. No data is written to the container.

The designated value is set to reference the indicated data. The offset given is the offset from the beginning of the container. It is an error to give an offset or a size that would result in the value containing bytes outside of the data that was in the container when it was opened. The offset therefore, must be in the range of 0 to N–1, where N is the size of preexisting data at the time the container was opened.

Additional calls to CMDefineValueData() for the same value will define additional, i.e. continued, segments when the offset produces noncontiguous data definition. If the size of the last (most recent) value segment is S, and the offset for that segment is such that offset+S equals the offset for the additional segment, then the last segment is simply extended. This follows the same rules as void  CMMoveValue(CMValue value, CMObject object, CMProperty property);

Moves the specified value from its original object property to the specified object property. The value is physically deleted from its original object/property as if a CMDeleteValue() were done on it. If the value deleted is the only one for the property, the property itself is deleted as in CMDeleteObjectProperty().

The value is added to the "to"s object property in the same manner as a CMNewValue(). The order of the values for both the value's original object property and for the value's new object property may be changed.

Note, that although the effect of a move is logically a combination CMDeleteValue() and CMNewValue(), the refnum of the value remains valid. Its association is now with the new object property.

This operation may be done at any time. No data need be associated with the value at the time of the move. Only moves within the same container are allowed.

VOID  CMGetValueInfo(CMValue value, CMContainer *container, CMObject *object, CMProperty *property, CMGeneration *generation);

The container, object, property, and generation of the designated entry are returned. NULL may be passed for any argument except the first. void CMSetValueType(CMValue value, CMType type);
The type of the value is set as specified.

void  CMSetValueGeneration(CMValue value, CMGeneration generation)

The generation for the specified value is set. The generation number must be greater than or equal to 1. Normally this routine does not need to be used since the value inherits its generation from its container.

void  CMDeleteValue(CMValue value);

The designated value is deleted from its object property. A deleted value will be treated by all Container Manager operations as though it does not exist. For example, it will not be found by CMUseValue, counted by CMCountValues, etc.

If the value deleted is the only one for the property, the property itself is deleted as in CMDeleteObjectProperty. If that property is the only one for the object, the object is also deleted as in CMDeleteObject. Some values are protected from deletion. Protected values include the predefined TOC object values (seed and offset) and any currently open embedded container values.

void  CMReleaseValue(CMValue value);

The association between the Value refnum and the entry is destroyed. After this call the refnum is invalid, and may be returned from a subsequent CMUseValue or CMNewValue call to designate another value.

III. DYNAMIC VALUE HANDLERS

A. Sample Session Flow

Before describing some sample dynamic value handlers, it will be useful to have an overview of the session flow which might take place for an application program which uses the Container Manager.

First, the application program would start the session by calling the Container Manager APIs for starting a session. These APIs, among other things, create the session global data block 402 (FIG. 4).

The application program then calls the Container Manager API(s) either to create a new container or to open an existing container. These APIs create the container control block 406 in memory 304 and initialize the TOC 414.

If the application program then desires to define a type which incorporates data transformation and/or redirection, it would then invoke the Container Manager CMSetMetaHandler() routine to associate a desired metahandler with the global name of the type. If the desired type is to be built as a tree of subtypes, then the application program would call CMSetMetaHandler() for each of the subtypes on the tree which requires a metahandler. These calls set up the metahandler symbol table 404 (FIG. 4) in the memory 304.

Once all required metahandlers have been associated with their respective type names, the application program registers the desired type with the Container Manager using CMRegisterType(). This call creates a type object such as that shown in FIG. 7, which merely associates the name of the desired type with a type ID number (the object ID of the type object). Again, if this desired type is to be created using a tree of sub-types, the application program would then call CMAddBaseType() to add the base types in the sequence desired. These calls construct the remainder of the type object as shown in FIG. 7, as well as the separate type objects for each of the base types. Note that if a given type is at a leaf of a type tree, its type object would contain only the type's global name (in value 706 of global name property 704 of the type). Only if the given type has one or more base types do value segments such as 708, 710 exist for a base type property 712 of the type object.

Once the desired type tree is set up for a desired type, the application program may create a value in one of its objects for the desired type. This is accomplished by calling CMNewValue() and specifying the object, and the property within the object, as well as the desired type. CMNewValue() creates a value header such as 506 (FIG. 5) for the new value and places the type ID into that value header. Assuming the type or any of its subtypes has a "new value" handler and a "use value" handler associated with it by one of the metahandlers identified in the metahandler symbol table 404 (FIG. 4), the routine then sets up the entire dynamic value chain (e.g. 518, 520, 522 in FIG. 5) for the new value. Note that if the application programmerely wants to use a value which is already defined with the desired type, it would call CMUseValue() instead of CMNewValue() to set up the dynamic value chain. Neither CMNewValue() nor CMUseValue() actually fills any of the dynamic value vectors (e.g. 530, 532, 534 in FIG. 5) at this time.

Once the dynamic value chain is set up, the application program can call any of the value operations of the API as desired. For example, it can call CMWriteValueData() to write data to the value, or it can call CMReadValueData() to read data from the value.

In order to understand what happens when the application program invokes one of these API calls, let us assume that the value has the type shown in FIG. 1 (compressed file type 102). The dynamic value chain which is set up for this value would therefore look like the three-level chain 518, 520, 522 (FIG. 5), with the top layer 518 having the compressed file type 102, the middle layer 520 having the compression type 106, and the bottom layer 522 having the file access type 104. Since the bottom layer type is a data redirection type, the information in real value data segment 512 indicates how to reach the literal value, rather than the literal value data itself. For example, real value data segment 512 may contain a file name or a file handle.

When the application program calls CMUseValue(), that routine returns a pointer (called v for the purposes of the description below) to the top layer dynamic value header 518. If the value were not a dynamic value, then CMUseValue() would have returned a pointer to the real value header 506 instead.

After obtaining v, the application program can call CMReadValueData(v, destination buffer, offset, size) to perform a read operation on the value data. Note here that the application program need not know that the value is a dynamic value.

CMReadValueData() first determines that v is a dynamic value. Therefore, instead of merely returning data (for example, from real value data segment 512), it performs a series of steps to obtain the data dynamically. First, it calls cmGetDynHandlerAddress() with v, with a pointer to the dynamic value vector 530 entry which should contain the pointer to the read handler for the "compressed file" type, and with a flag indicating that it is a read handler which is being sought. If cmGetDynHandlerAddress() finds a non-NULL pointer in the specified entry of dynamic value vector 530, it merely returns since the read handler address was previously obtained. Otherwise, it invokes the metahandler for the type (the pointer for which metahandler was previously placed in the dynamic value extensions 524 when the dynamic value chain was created), requesting the type's read handler. The metahandler returns a pointer to the same, which cmGetDynHandlerAddress() places in the previously specified entry of dynamic value vector 530. After calling cmGetDynHandlerAddress(), CMReadValueData() then invokes the handler now pointed to by the read handler entry of dynamic value vector 530.

The read handler for the "compressed file" type will be very simple since it does no transformations or redirection. All that work is performed by the base types "compression" and "file access". The read handler for "compressed file" therefore might simply be:

```
bv          = CMGetBaseValue(v);
returnedSize = CMReadValueData(bv, destination buffer,
                                offset, size);
```

The CMGetBaseValue() routine merely checks for errors and then returns the pointer to the supplied value's base value, which was previously stored in the extensions 524. In this case, it will return a pointer to dynamic value header 520. CMGetBaseValue() is implemented in the Container Manager as follows:

```
© 1992 Apple Computer, Inc.
CMValue CM_FIXEDARGS CMGetBaseValue(CMValue value)
{
        TOCValueHdrPtr    theValueHdr;
        ContainerPtr      container;
        ExitIfBadValue(value, NULL);  /* validate value */
        theValueHdr  = (TOCValueHdrPtr)value;
        container    = theValueHdr->container;
        if (container->getBaseValueOk <= 0) { /* only callable from a handler */
            ERROR1(CM_err_CantGetBase, CONTAINERNAME);
            return (NULL);
        }
        if (!IsDynamicValue(value)) /* if not dynamic value... */
            return (NULL); /* ...there is no base */
        return ((CMValue)DYNETXTENSIONS(value->baseValue);/* return the base value */
}
```

Accordingly, the read handler for the "compressed file" type calls CMReadValueData() recursively, this time for dynamic value header 520. CMReadValueData() again determines that the value header 520 is a dynamic value header, and therefore again calls cmGetDynHandlerAddress() to have a pointer to the read handler for the "compressed file" type placed in the read handler slot of dynamic value vector 532. cmGetDynHandlerAddress() invokes the metahandler for the type of value header 520 (which is "compression" in this example), to obtain that pointer and place it in that slot in dynamic value vector 532. CMReadValueData() then invokes the handler.

The read handler for the "compression" type will be more complicated than the read handler for "compressed file", since a transformation must be performed. The basic format for the handler would be as follows, using a combination of C-language code and pseudocode:

```
bv = CMGetBaseValue(v);
returnedSize = CMReadValueData(bv, temporary buffer, offset,
    size);
decompress data from temporary buffer into caller's
    destination buffer;
return
```

Once again, CMReadValueData() has been called recursively, this time with the value pointing to dynamic value header 522 (the base value for dynamic value header 520). In the same manner as previously described, CMReadValueData() finds and then invokes the read handler for the "file access" type, which is the type of dynamic value 522. Since the "file access" type is a data redirection type, its read handler might have the following format:

```
bv = CMGetBaseValue(v);
returnedSize = CMReadValueData(bv, filename, 0, some size
    number);
obtain data from file designated by file name in filename
    buffer, using caller's offset and size;
write the data into caller's destination buffer;
return
```

As with the previous read handlers, this read handler begins by obtaining its base value by. In the present example, the base value points to real value header 506, although it would make no difference to the read handler if the base value pointed to yet another dynamic value header. The read handler then calls CMReadValueData() using the base value, in order to obtain it in a buffer "filename", information which the read handler will interpret as a file name. The read handler then opens the file identified by filename, obtains the data from the file, and places the result in the caller's destination buffer.

It can be seen that CMReadValueData has now been called recursively yet a fourth time, but this time the value passed to it is a real value rather than a dynamic value. CMReadValueData() determines this and merely returns the data from the real value data segment 512. This is the information which the read handler for the "file access" type interprets as a file name for use in obtaining the actual data. Note that although the data in real value data segment 512 is not the literal data ultimately sought, as used herein, the bottom level read handler is still considered to "operate on" the data in real value data segment 512.

Certain optimizations can be implemented in the latter read handler due to the fact a static storage area (refCon) for the value is available to it. For example, the read handler might be written to follow the above procedure only if this is the first time the read handler has been called with respect to the particular value, and can save the file handle returned by the file open routine in the value's refCon. In all subsequent times that the read handler is called the read handler can simply use the file handle from the value's refCon to read the requested data.

Yet another optimization can be implemented if the read handler knows that it is always the bottom handler on the chain. In this case the value's "use value" or "new value" handler can open the file using the file name in the value's real value segments, and can store the file handle in the value's refCon. Then the read handler could be written to always obtain the file handle from the value's refCon and never call CMReadValueData() to obtain a file name.

After placing the result in the caller's destination buffer, the read handler for the bottom level dynamic value header 536 then returns to the CMReadValueData() routine which called it, which in turn returns to the read handler for the second level dynamic value header 522. That read handler processes the results as previously described and returns to the CMReadValueData() routine which called it. That routine then returns to the read handler for the top dynamic value header 518, which, as previously mentioned, needs to do no further work before returning to the CMReadValueData() routine which called it. That routine then returns to the caller, which is the application program. Thus the application program has obtained the data it requested, without ever having to know that the data was obtained from a file rather than from the real value data segment 512, and without ever having to know that the data underwent decompression before being returned.

When the application program finishes its work, it calls the CMCloseContainer() API routine to close the container. The routine writes only real value data out to persistent storage; dynamic values, including the entire dynamic value chain, are deleted.

B. Sample Value Handlers

Appendix A is a header file for a sample set of value handlers for a data encryption/decryption type. The handlers themselves are in Appendix B. Similarly, Appendix C is a header file for a sample set of value handlers for an indirect file access type. The handlers themselves are in Appendix D.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

- 140 -

APPENDIX A

```
/*--------------------------------------------------------------------*
 |                   <<< ExampleCryptHandlers.h >>>                   |
 |                                                                    |
 |     Example Encryption/Decryption Value Handler Package Interfaces |
 |                                                                    |
 |                           Ira L. Ruben                             |
 |                            5/11/92                                 |
 |                                                                    |
 |                  Copyright 1992 Apple Computer, Inc.               |
 |                         All rights reserved.                       |
 |                                                                    |
 *--------------------------------------------------------------------*
```

This file contains the interfaces for Encryption/Decryption value example of dynamic
value use. See ExampleCryptHandlers.c for complete documentation on the implementation.
What is provided here is all that you would need to use values that encrypt or decrypt
data to and from a base value. See newCryptValue() for further details.

Note, this encryption/decryption example offers no new information on how to create
dynamic values. The examples for subvalues and indirect file pointers do that. The
main purpose of this example is to provide a dynamic value type that operates on its
base value. The interesting part is that we can then use this type AND the file type to
illustrate multiple base types! Specifically, a value that does encrypted file I/O.

Assuming you are familiar with dynamic values by the time you are reading this (if not
see the subvalue and file value examples), then in order to make a crypt/file type we
want to produce the following type inheritance heirarchy:

```
                    File Type      Crypt type
                          *      *
                           *    *
                            *  *
                        Descriptor Type
```

In other words, a "descriptor type" that describes the meaning, and two base types; a
encryption/decryption type and a file type. A depth-first walk of the heirarchy produces
File Type at the bottom, then Crypt type, and finally, at the top, the Descriptor Type.

The following inheritance will equally work:

```
                        File Type        (bottom type)
                             *
                             *
                             *
                        Crypt Type       (middle type)
                             *
                             *
                             *
                        Descriptor Type  (top type)
```

With this, the file type is a base type of the crypt type.

So dynamic value types let you mix in ther types in different ways. Using a crypt by
itself is uninteresting, unless of course you want to have all your data values
encrypted! But the overall algorithm presented in the code is very much like the subvalue
and file value code.

Using this header, however, you can build the crypt/file type. Assuming you have
registered a descriptor type, descriptorType, then you can add the base values to it as
follows:

```
    CMAddBaseType(descriptorType, RegisterFileValueType(container));
    CMAddBaseType(descriptorType, RegisterCryptValueType(container));
```

- 141 -

```
    The best way to think of the ordering is that the base types for any one type are
    processed in order. Processing includes first checking if each of those types has base
    types, and so on. This effects the depth-first search.

The above two CMAddBaseType() calls add the file type first and crypt type second. This
    produces the first type inheritance heirarchy pictured above.

To produce the second pictured inheritance heirarchy:

cryptType = RegisterCryptValueType(container)
        CMAddBaseType(cryptType, RegisterFileValueType(container));
        CMAddBaseType(descriptorType, cryptType);

Here the file type is made a base value of the crypt type and the crypt type, now with
    its file base type, made a base type of the descriptor type.

This second method is not as general as the first. That's because using a crypt type
    will always imply using the file as a base type.

Leaving the types more-or-less "atomic" allows you to have mix-in classes (oops, sorry,
    types). So the first method is desired.

Finally, in all of this discussion, we have been using definitions provided in other
    headers. Specifically the ExampleIndFileHandlers.h and ExampleSubValueHandlers.h. The
    RegisterCryptValueType is a macro defined in this header. You would, therefore, have to
    include those headers if you wanted to do the above operations.
    */ ifndef __XCRYPTHANDLERS__
define __XCRYPTHANDLERS__ include "CM_API.h"

CM_CFUNCTIONS

CMValue CM_FIXEDARGS newCryptValue(CMObject object, CMProperty property, CMType type,
                                   char CM_PTR *cryptKey);
    /*
    This is a special case of CMNewValue() in that a new value entry of the specified type is
    created for the specified object with the specified property. A refNum for this value is
    returned. However, unlike CMNewValue(), the refNum is associated with a value that
    encrypts or decrypts its data. Whenever the returned refNum is used for a value
    operation, that operation will encrypt or decrypt of its value appropriately. The
    encryption/decryption algorithm used is a simple "exclusive-or" of a key with the data.
    The key is passed as a null-terminated string which is cyclicly used over the data.
    There is no limit on its length. A null string has the effect of no encryption or
    decryption.

There is one restriction on this encryption/decryption value implementation. Data inserts
    and deletes are NOT supported. This is because the "exclusive-or" algorithm depends on
    the data offset in order to know how to use the key. Inserts and deletes affect all
    data that follows. Hence there would be no way to know what part of the key was
    originally used.

Note, you would only use newCryptValue() to explicitly create a value with encrypted
    data. This routine is NOT used for layering of base types as discussed above.
    */ define CryptValueGlobalName  (CMGlobalName)"User:CryptValue"

define RegisterCryptValueType(container) \
    (CMSetMetaHandler(CMGetSession(container), CryptValueGlobalName, \
    cryptDynamicValueMetahandler), \
    CMRegisterType(container, CryptValueGlobalName))
    /*
```

Attorney Docket No.: APPL: P-1120 MCF/WSW
wsw/appl/1120.001                    141

- 142 -

```
     If crypt values are created in a container and then the executing session terminated, the
     indirect crypt values can be used in a future session opening just like normal values by
     calling CMUseValue(). The only requirement is that you must register the crypt base type
     prior to doing the CMUseValue(). To make this simpler, the above macro is defined. Just
     call RegisterCryptValueType() to do the registration. Note RegisterCryptValueType() is
     defined as an expression which can be assigned to a CMType if you so desire. This would
     be done to mix the crypt type into some other combination of base types. A new value with
     a crypt type requires a single value passed to CMNewValue(), i.e., cryptKey. That
     parameter is described in newCryptValue() above. This fact must be known when mixing
     crypt types with other types to set the proper CMNewValue() "..." parameters. */

CMHandlerAddr CM_FIXEDARGS cryptDynamicValueMetahandler(CMType targetType,
     CMconst_CMGlobalName operationType);
       /*
       This metahandler is called by the Container Manager for dynamic value creation to allow
       the Container Manager to get the addresses of the "metadata", "new value", and "use
       value" handlers. These handlers are used as part of the process of creating dynamic
       values. See code for further documentation.
       Note, the Container Manager uses the address of this metahandler when it sees a type
       which has this metahandler registered for it. Registering the metahandler and the type
       can be done with the RegisterCryptValueType macro defined above.
       */
                                CM_END_CFUNCTIONS endif
30
```

Attorney Docket No.: APPL: P-1120 MCF/WSW
wsw/appl/1120.001                        142

- 143 -

APPENDIX B

```
/*----------------------------------------------------------------------*
 |                                                                      |
 |                    <<< ExampleCryptHandlers.c >>>                    |
 |                                                                      |
 |          Example Encryption/Decryption Value Handler Package         |
 |                                                                      |
 |                              Ira L. Ruben                            |
 |                                5/11/92                               |
 |                                                                      |
 |                   Copyright 1992 Apple Computer, Inc.                |
 |                          All rights reserved.                        |
 |                                                                      |
 *----------------------------------------------------------------------*

This file illustrates how one might implement "special value data manipulations" using
   the "dynamic value" mechanisms provided by the Container Manager. Dynamic values are
   special values which "know" how to manipulate on their own value data. They do this
   through a set of value operation handlers which are expected to be semantically the same
   as the standard API value operations. This is described in more detail later.

The "special value data manipulations" dynamic value we want to support here is for
   simple encryption and decryption of value data. All value operations on the dynamic
   value will then be encrypted or decrypted appropriately. The encryption/decryption
   algorithm we use is a simple "exclusive-or" of a key with the data. The key is cyclicly
   used over the data.

The key is passed as a null-terminated string. There is no limit on its length. A null
   string has the effect of no encryption or decryption.

There is one restriction on this encryption/decryption value implementation. Data inserts
   and deletes are NOT supported. This is because the "exclusive-or" algorithm depends on
   the data offset in order to know how to use the key. Inserts and deletes affect all
   data that follows. Hence there would be no way to know what part of the key was
   originally used.

Basically, dynamic values are similar to C++ objects where the handlers are the object's
   methods. Dynamic values are a generalized mechanism that provides for type inheritance.
   They are similar to C++ objects where the handlers are the object's methods and an
   object's type represents its class. They are dynamic in the sense that they only exist
   from creation (discussed below) and last until until they are released (CMReleaseValue()).

The encryption/decryption example we will illustrate here illustrates the type inheritance
   where the type of the value has as its base type, a "crypt" type. As discussed in the
   companion header file for this code, the intent is to define a type which can be mixed in
   with other types. In its most basic use, the "crypt" type would be a base type on a
   descriptor type (i.e., a type which describes what we're kind of encryption this is, or
   whatever). In that case all I/O to a value's data would then be encrypted or decrypted
   appropriately.

By defining the "crypt" operations in terms of its base type, we can use it more generally
   with other types. The example illustrated in the header is for a "file" type that does
   I/O indirectly to a file. So by using both the "crypt" type and the "file" type, I/O
   could then be encrypted/decrypted to a separate file.

Follow the code in this file in the order presented. The comments document the steps
   required to support the "crypt" type. The newCryptValue() routine defines the interface
   that can be used to create a crypt dynamic value. It would be called just like any other
   Container Manager API routine.

Note, however, as just stated, you won't need newCryptValue() except perhaps for the
   basic case. For mix-ins, you would follow the procedures described in the header file.
*/
```

Attorney Docket No.: APPL: P-1120 MCF/WSW
wsw/appl/1120.001                143

- 144 -

```
/*----------------------------------------------------------------------------*
 | DOS (80x86) USERS -- USE THE "LARGE" MEMORY MODEL WHEN COMPILED FOR 80X86 MACHINES |
 *----------------------------------------------------------------------------*/
    The Container Manager is built with this same option and assumes all handler and
    metahandler interfaces are similarly built and can be accessed with "far" pointers.
 */ include <stddef.h>
include <stdlib.h>
#include <stdio.h>
#include <string.h>
include <stdarg.h> ifndef __CM_API__
include "CM_API.h"
#endif
#ifndef __XCRYPTHANDLERS__
#include "ExampleCryptHandlers.h"
#endif

CM_CFUNCTIONS

/* See comments in CM_API_Environment.h about CM_CFUNCTIONS/CM_END_CFUNCTIONS (used   */
/* only when compiling under C++).                                                    */

/* In order to make this code read from the top down, it is necessary in a few instances*/
/* to forward reference some metahandler functions.  Due to some "complaints" from      */
/* certain C compilers (who shall remain nameless), the forward declarations are placed */
/* here.  Basically, ignore this stuff.                                                 */ static CMHandlerAddr cryptValueMetahandler(CMType targetType, CMconst_CMGlobalName
operationType);

/* GENERAL NOTE...

In order to make the code as general as possible, the session handlers provided by the
    API are used.  This includes memory allocation, deallocation, error reporter, and
    access to the container identification.  These interfaces allow us to use the same
    memory and error handlers that the Container Manager uses as provided to
    CMStartSession() through the methandler passed there.  The container identification
    interface allows us to add that information to the error reports.  The wording of these
    messages follows the "flavor" of those done by the Container Manager itself.
 */

/*----------------------------------------------------------------------------*
 | newCryptValue - create refNum for a value that encrypts/decrypts its value data |
 *----------------------------------------------------------------------------*/

This is a special case of CMNewValue() in that a new value entry of the specified type is
    created for the specified object with the specified property.  A refNum for this value is
    returned.  However, unlike CMNewValue(), the refNum is associated with a value that
    encrypts or decrypts its data.  Whenever the returned refNum is used for a value
    operation, that operation will encrypt or decrypt of its value appropriately.  The
    encryption/decryption algorithm used is a simple "exclusive-or" of a key with the data.
    The key is passed as a null-terminated string which is cyclicly used over the data.
    There is no limit on its length.  A null string has the effect of no encryption or
    decryption.

The types are the key to generating dynamic values.  A dynamic value results when a value
    is created by to CMNewValue() or attempted to be used by CMUseValue(), and the following
    two conditions occur:

1. The type or any of its base types (if any, created by CMAddBaseType()), are for
           global names that have associated metahandlers registered by CMRegisterType().
```

- 145 -

2. The metahandlers support the operation type to return a "use value" handler, and in addition for CMNewValue(), "metadata" and "new value" handlers.

"Metadata" handlers are used to define metadata that is a format description that directs CMNewValue() on how to interpret it's "..." parameters to produce a data packet of those parameters. The data packet is sent to the "new value" handler. In this routine we will do a CMNewValue() to create the dynamic value with the newCryptValue() cryptKey as the "..." parameters.

"New value" handlers are used to define initialization data for the "use value" handlers based on the data packets. The "use value" handlers are called to set up and return refCons. Another metahandler address is also returned from the "use value" handler. This is used to get the address of the value operation handlers corresponding to the standard API value routines.

The goal is to create a dynamic value to return, which when used will produce the desired crypt. Thus we need two types:

1. A type that describes the meaning of this crypt value. That is the type passed to this routine.

2. A base type that represents a "crypt" type in general. The user's type is given the "crypt" type as its base type.

It is that general "crypt" base type that most of this file supports. Namely the various metahandlers and handlers for encrypt and decryption. Indeed, the only thing we do here is set up the types, register their methandlers, and do the CMNewValue().

Note, you would only use newCryptValue() to explicitly create a value with encrypted data. This routine is NOT used for layering of base types as discussed in the header.
*/

```
CMValue CM_FIXEDARGS newCryptValue(CMObject object, CMProperty property, CMType type,
                                   char CM_PTR *cryptKey)
{
    CMContainer  container;
    CMSession    sessionData;
    CMType       cryptType;
    CMValue      dynamicValue;

/* Get the container refNum and session data pointer. They are needed for registering */
    /* metahandlers and types and for reporting errors.  Note, if the container is passed */
    /* as NULL, the session pointer will end up being NULL. In that case, we can't report */
    /* the error and just return NULL.                                                    */ container   = CMGetObjectContainer(object);
    sessionData = CMGetSession(container);

if (sessionData == NULL)             /* if no session...                              */
      return (NULL);                     /* ...there is nothing much else we can do here  */

/* Do a safety check on the refNums...                                                */ if (object == NULL || property == NULL || type == NULL || cryptKey == NULL) {
       CMError(sessionData, "Null object, property, type refNum, or key refNum passed to
    newCryptValue()");
       return (NULL);
    }

/* If you wanted to really be paranoid, you could check that the property and type   */
    /* both belonged to the same container.  But lets be "trusting" for now!             */

/* Register the crypt type (or reregister it just to make sure its registered) and   */
    /* then define the metahandler for that type which will return the "metadata", "new  */
    /* value", and "use value" handlers (described later in this file).  Note, the crypt */
    /* global name, as well as the metahandler are published in the crypt header file to */
    /* allow other combinations of base types that might want crypt as one of their      */
```

```
        /* inherited types. Further, to use the value we're creating in the future sessions, */
        /* the caller simply does a CMUseValue(). But that requires the type and its          */
        /* metahandler be registered just as we do here. As a convenience we provide a macro */
        /* to do this in the header file. For clearity, we do it explicitly here.            */

CMSetMetaHandler(CMGetSession(container), CryptValueGlobalName,
     cryptDynamicValueMetahandler);
        cryptType = CMRegisterType(container, CryptValueGlobalName);
        if (cryptType == NULL) return (NULL);

/* The crypt type will be defined as a base type for the caller's type. The caller's */
        /* type is already defined. It is assumed to be a type that describes what kind of   */
        /* encryption this is. The type heirarchy we want looks something like this:         */

/*                          Crypt Type (bottom type)                                  */
        /*                                 *                                                  */
        /*                                 *                                                  */
        /*                                 *                                                  */
        /*                          Caller's Type (top type)                                  */

/* In other words, we want the crypt type as a base type of the description type.    */
        /* This is easily accomplished as follows:                                            */

CMAddBaseType(type, cryptType);

/* Base types are essentially values for a special "base type" property added to the */
        /* type object.  Above we're defining cryptType as a single base type for the type.  */

/* That's about all there is to it!  Now all that's left is to do the CMNewValue()   */
        /* to create the dynamic value.                                                      */ dynamicValue = CMNewValue(object, property, type, cryptKey);

/* The dynamicValue is now created! We can return it to the caller. Note that the   */
        /* cryptKey is passed to CMNewValue(). It has no idea what it is!  But it does know  */
        /* how to deal with it.  Specifically, it passes it to the "metadata" and "new value"*/
        /* handlers during the creation of the dynamic value. CMNewValue() knows there is one*/
        /* additional parameter because of the metadata we return from the "metadata" handler.*/
        /* You can see it works something like "printf()", although across two different     */
        /* places.  The metadata tells CMNewValue() to consume the additional parameter just */
        /* like the "printf()" format string tells "printf()".                               */

/* Getting back to the dynamic value -- to reiterate, the rules for dynamic value    */
        /* creation are that when a CMNewValue() or CMUseValue() are done, if the passed type,*/
        /* or any of its base types have (through associated metahandlers) a "use value"     */
        /* handler, and additionally for CMNewValue(), a "metadata" and "new value" handler, */
        /* a dynamic value is created.                                                       */ return (dynamicValue);
     }

/* That's all there is to it! From this point on we turn our attention to the definition*/
     /* of the metahandlers and handlers.                                                    */

/*============================================================================*/
     /*============================================================================*/

/*----------------------------------------------------------------------------*
      | cryptDynamicValueMetahandler - matahandler for crypt dynamic value creation |
      *----------------------------------------------------------------------------*

The first methandler to be defined is the metahandler called from CMNewValue() or
     CMUseValue() for dynamic value creation. It does this to see if a type, which had this
     metahandler registered for the type global name, has a "use value" handler, and
     additionally for CMNewValue(), "metadata" and "new value" handlers defined. That is the
     criteria on whether a dynamic value is to be created.
```

- 147 -

```
The "metadata", "new value", and "use value" handlers have the following prototypes:   */ static CMMetaData metaData_Handler(CMType type);
static CMBoolean newValue_Handler(CMValue dynamicBaseValue, CMType type,
                                  CMDataPacket dataPacket);
static CMBoolean useValue_Handler(CMValue dynamicBaseValue, CMType type,
                                  CMMetaHandler *metahandler, CMRefCon *refCon);
                                                                                   /*
The parameters are defined later in this file in the documentation for these routines.
*/

CMHandlerAddr CM_FIXEDARGS cryptDynamicValueMetahandler(CMType targetType,
CMconst_CMGlobalName operationType)
{
    CMType ignored = targetType;

if (strcmp((char *)operationType, CMDefineMetaDataOpType)==0) /* "metadata"   */
        return ((CMHandlerAddr)metaData_Handler);
    else if (strcmp((char *)operationType, CMNewValueOpType) == 0)/* "new value"  */
        return ((CMHandlerAddr)newValue_Handler);
    else if (strcmp((char *)operationType, CMUseValueOpType) == 0)/* "use value"  */
        return ((CMHandlerAddr)useValue_Handler);
    else                                               /* what's the question?    */
        return (NULL);
}

/*---------------------------------------------------------------*
 | metaData_Handler - return the matadata for the crypt type     |
 *---------------------------------------------------------------*

The "metadata" handler is called from CMNewValue() so that the proper number of its "..."
 parameters can be placed into a data packet to be passed to the "new value" handler. This
 handler takes the type for which we ant to return the corresponding metadata.

In the case of crypt values, we want to pass the newCryptValue() parameter that defines
 the encryption key, i.e., the cryptKey. The metadata "%p" will serve the purpose. It
 specifies a pointer to the key string.

Note, we can define any format we thing is appropriate for the "new value" handler so
 long as it uses CMScanDataPacket() to extract the parameters and uses this handler itself
 to get the metadata format string. That's what we will do when we get to the "new value"
 handler.
*/ static CMMetaData metaData_Handler(CMType type)
{
    CMType unused = type;

return ((CMMetaData)"%p");              /* for the cryptKey  pointer          */
}

/*---------------------------------------------------------------------------*
 | newValue_Handler - create permanent data to for the "use value" handler   |
 *---------------------------------------------------------------------------*

The "new value" handler is called from CMNewValue() for dynamic value creation just prior
 to calling the "use value" handler. It is not used by CMUseValue().

"New value" handlers are used to define initialization data for the "use value" handlers.
 It is assumed that such data will be some function of the original parameters passed to
 CMNewValue(). These are packed into the dataPacket according to the metadata defined for
 the type. If there are multiple base types, each type's metadata directs CMNewValue() on
 how many of its "..." parameters to consume in build a data packet.

Base types are processed in a depth-first manner, so CMNewValue() "..." parameters are
```

- 148 - consumed left-to-right, for the deepest base type to the highest. For example, given the
following type inheritance heirarchy (read these as T1 inherits from T2 and T3, and so
on):

The depth-first search, starting at T1, yields the sequence: T2 T4 T5 T3 T1. Then this
is the order the CMNewValue() "..." parameters must be in. It is also the order the
dynamic value layers are generated. T1 is the top layer, and T2 the bottom. T1 would be
the dynamic value returned from CMNewValue().

In this example we only have a single base type, the "crypt" type, which has metadata
defined to pass a pointer to the encryption key string.

From this data we want to write permanent information so that the "use value" handler,
which is always called for CMNewValue() and CMUseValue(), can create an appropriate refCon
to pass among the value operation handlers. The data layout chosen is as follows:       */

```
struct CryptData {                  /* Encrypt/decrypt data layout:                   */
  unsigned long keySize;            /*   size of the encryption/decryption key        */
  unsigned char theKey[1];          /*   encryption/decryption key starts here        */
};
typedef struct CryptData CryptData, *CryptDataPtr;
```

/*
In the above data, we only have to remember the encryption key and its size (the reason
for the size will be explained shortly). This is the data we will write to the dynamic
value's base value. It is thus permanently remembered. Now, if the container is opened
for reading, if a CMUseValue() is done on the value, the "use value" handler will read
the data just as in the CMNewValue() case. Remember that newCryptValue() is done only to
initially create the crypt value. Future uses don't call it. So nothing should be
written that can't be used by only calling "use value" handler without its "new value"
handler.

In this particular example, whe have a "security leak"! We are writing the key to the
base value. If that base value is a real container value, then we are writing the key
into the container. As an example, we're not going to get to picky here. We're not
trying to stop the CIA! So we will leave it at that.

For what it's worth, if the base value is NOT a real value, but a dynamic value that
is at a lower level in the base type inheritance chain, then we're writing the key to
the dynamic value. It may choose to dispose of it any way it sees fit.

Take, for example, the "file" base type that writes to a file instead of the container
(done in ExampleIndFileHandlers.[hc] and discussed in the header for this file). Then
we will be writing the key to the file and not the container. The file base type
highlights why we save the key size as part of the data. The key is variable length.
But you would think that the "use value" handler could do a CMGetValueSize() on the
dynamic base value. In this file case you would end up getting the size of the file!
The key is in there at the beginning of the file. But we would not know its length.
Hence the safest (only) thing to do is explicitly write the size. This will mean that
the "use value" handler will have to do two reads; first for the size and then for the
key. But that's life!

We don't know our context here. Nor should we! We only know we're writing special data
to the base value. Since we also do all our value handler operations to the base value
we must take into account the data we have written. In particular, the user of the
value we return from here doesn't know we wrote this data. So a user will always think
of the data s/he reads or writes starts at offset 0. In reality it will be offset by the
size of the data we write. Our handlers must take this into account.

This will generally be true of all generic type dynamic values that do all their

- 149 - operations on only their base values. The subvalue example did its operations on an
existing value. The file example does its operations to an external file. Here we have
a "true" atomic base type that uses only its base value. Its the main distinction of
this example.

On final point, if any errors are reported, we abort the execution of the program in this
example. As documented, error reporters are not supposed to return. But in case they
do, the Container Manager wants to know about it! The CMBoolean function result is used
for that purpose. Nonzero should be returned for success, and if this should happen to
return for a failure, 0 should be returned as the function result.
*/

```
static CMBoolean newValue_Handler(CMValue dynamicBaseValue, CMType type,
        CMDataPacket dataPacket)
{
    CMContainer   container    = CMGetObjectContainer(type);
    CMSession     sessionData  = CMGetSession(container);
    unsigned char *cryptKey;
    CMCount       i;
    unsigned long keySize;

/* Scan the dataPacket to put its data back into variables. The API provides   */
    /* CMScanDataPacket() to do that. We reverse what CMNewValue() did by using our own */
    /* "metadata" handler to get the metadata to direct the extraction of dataPacket   */
    /* fields back to variables (sort of like a "scanf()").                         */ i = CMScanDataPacket(type, metaData_Handler(type), dataPacket, &cryptKey);

if (i != 1) {
        CMError(sessionData, "Unable to get all of CMNewValue()'s \"...\" cryptKey parameter in
container \"^0\"", CMReturnContainerName(CMGetObjectContainer(type)));
        return (0);
    }

/* Write the encryption key that the "use value" handler will to build its refCon. As */
    /* discissed above, we write the size of the key and then the key itself. We're going*/
    /* to cheat a little here and write the two values separately just like the "use    */
    /* value" handler will read them. We never really use the CryptData struct above.   */ keySize = strlen((char *)cryptKey);

CMWriteValueData(dynamicBaseValue, (CMPtr)&keySize, 0, sizeof(unsigned long));
    CMWriteValueData(dynamicBaseValue, (CMPtr)cryptKey, sizeof(unsigned long),
    (CMSize)keySize);

return (1);                             /* that's all there is to do here!    */
}

/*----------------------------------------------------------------------*
 | useValue_Handler - create a dynamic value and its associated metahandler |
 *----------------------------------------------------------------------*
```

The "use value" handler is called for both CMNewValue() and CMUseValue(). For
CMNewValue(), it is called after the "new value" handler. Either way, the "use value"
handler is expected to build a refCon to pass among its value operation handlers, and
to return a pointer to the metahandler that will yield the addresses of those handlers.

Generally, the refCon is built from the data written to a dynamic values base value by
the "new value" handler. That data is permanent, and thus a CMUseValue() on the value
of the dynamic value type will cause the creation of the dynamic value even when the
"new value" handler is not called (as is the case for CMUseValue()).

As with the "new value" handler, the type is passed as a convenience. It may or may not
be needed. For the "new value" handler it is passed to CMScanDataPacket() to convert
the data packet back into variables. Here, it may not be needed. It is possible for a
type object to contain OTHER data for other properties. Types, after all, are ordinary

- 150 -

```
        objects. There is nothing prohibiting the creation of additional properties and their
        values. This fact could be used to pass additional (static?) information to the "new
        value" or "use value" handlers which would read the data values.

       In this example, the "new value" handler data written to the base value is as defined by
        the CryptValueDataPtr typedef defined in the "new value" handler. It is just the
        original encryption key and its size.

The refCon we build from this data has the following layout:                         */
        struct CryptRefCon {                        /* Crypt value handler's refCon:          */
          CMSession      sessionData;               /*    ptr to the current container session */
          unsigned long  dataOffset;                /*    amount to offset user's offsets     */
          unsigned long  keySize;                   /*    size of the encryption/decryption key */
          unsigned char  theKey[1];                 /*    encryption/decryption key starts here*/
        };
        typedef struct CryptRefCon CryptRefCon, *CryptRefConPtr;                              /*

The current session data pointer, which we need to allocate the refCon is kept just as a
        convenience in case we need it again. At the very least it will be needed to free the
        refCon.

As discussed in the "use value" handler all operations are to the base value. Hence, the
        data that the "new value" handler wrote is in there. So we must offset the user's offsets
        to the value operations by the amount of the data we wrote and s/he has no knowledge of.
        Hence the dataOffset field in the refCon.

The refCon is accessable to all the handler routines via a CMGetValueRefCon() call. The
        keySize is the size of the encryption key. The "new value" handler removed the delimiting
        null when it wrote the data. We don't need it.

Note, as with the "new value" handler, if any errors are reported, we abort the execution
        of the program in this example. As documented, error reporters are not supposed to return.
        But in case they do, the Container Manager wants to know about it! The CMBoolean function
        result is used for that purpose. Nonzero should be returned for success, and if this
        should happen to return for a failure, 0 should be returned as the function result.
        */ static CMBoolean useValue_Handler(CMValue dynamicBaseValue, CMType type,
40                                         CMMetaHandler *metahandler, CMRefCon *refCon)
        {
          CMContainer    container    = CMGetObjectContainer(type);
          CMSession      sessionData  = CMGetSession(container);
          unsigned long  keySize;
          CryptRefConPtr myRefCon;

/* Since the key can be any size, we must get its size before we can allocate our  */
          /* refNum. The size is the first long in the dynamicBaseValue's data.              */

          if (CMReadValueData(dynamicBaseValue, (CMPtr)&keySize, 0, sizeof(unsigned long)) !=
        sizeof(unsigned long)) {
            CMError(sessionData, "Incorrect byte length read while reading encryption key size in
        container \"^0\"", CMReturnContainerName(container));
            return (0);
          }

/* Allocate the refCon that we will pass among the handlers. Since we are doing a  */
          /* dynamic allocation here we will use the "malloc" handler defined for the container.*/

          myRefCon = (CryptRefConPtr)CMMalloc(sizeof(CryptRefCon) + keySize, sessionData);
          if (myRefCon == NULL) {
            CMError(sessionData, "Cannot allocate space for file encryption handler refCon in
        container \"^0\"", CMReturnContainerName(container));
            return (0);
          } myRefCon->sessionData = sessionData;       /* save current session pointer          */
```

Attorney Docket No.: APPL: P-1120 MCF/WSW
wsw/appl/1120.001                150

- 151 -

```
        /* Read the key directly into our allocated refNum and save the key size...    */ myRefCon->keySize = keySize;                    /* save key size                */

       if (CMReadValueData(dynamicBaseValue, (CMPtr)myRefCon->theKey, sizeof(unsigned long),
        (CMSize)keySize) != keySize) {
            CMError(sessionData, "Incorrect byte length read while reading encryption key in
        container \"^0\"", CMReturnContainerName(container));
            CMFree(myRefCon, sessionData);
            return (0);
        }

/* Set the dataOffset field of the refCon with the amount of data we read in both the */
        /* above reads...                                                                     */
        myRefCon->dataOffset = sizeof(unsigned long) + keySize;

/* All that's left to do here is to return the refCon and the pointer to the value */
        /* operations metahandler to the Container Manager who called us...                */
        *metahandler = (CMMetaHandler)cryptValueMetahandler;/* return metahandler       */
        *refCon      = (CMRefCon)myRefCon;                  /* ...and refCon             */ return (1);                                    /* we're now ready to go          */
    }

/*----------------------------------------------------------------------*
       | cryptValueMetahandler - metahandler for a dynamic value handler set |
    *----------------------------------------------------------------------*

This is the metahandler that the "use value" handler returns to the Container Manager.
    It defines the addresses for all the value operations handlers supported for files.

35  The dynamic value operations handlers have the following prototypes:                */ static CMSize getValueSize_Handler(CMValue value);
    static CMSize readValueData_Handler(CMValue value, CMPtr buffer, CMCount offset, CMSize
    maxSize);
40  static void writeValueData_Handler(CMValue value, CMPtr buffer, CMCount offset, CMSize
    size);
    static void insertValueData_Handler(CMValue value, CMPtr buffer, CMCount offset, CMSize
    size);
    static void deleteValueData_Handler(CMValue value, CMCount offset, CMSize size);
45  static void getValueInfo_Handler(CMValue value, CMContainer *container, CMObject *object,
                                     CMProperty *property, CMType *type,
                                     CMGeneration *generation);
    static void setValueType_Handler(CMValue value, CMType type);
    static void setValueGeneration_Handler(CMValue value, CMGeneration generation);
50  static void releaseValue_Handler(CMValue value);
                                                                                         /*
    Note that these handlers have exactly the same calling conventions as the standard API
    routines. These handlers must also have the same semantics. What happens is that every
    time a dynamic value is passed to the Container Manager, it is validated and then checked
55  to see if it is indeed a dynamic value. If it is, the corresponding handler is called to
    do the work.

The actual handler called for the dynamic value may or may NOT be associated with the
    type associated with the dynamic value. Just like C++, dynamic values may be "subclassed"
60  via their (base) types. If a handler for a particular operation is not defined for a
    value, its "base value" is used to get the "inherited" handler. This continues up a
    dynamic value's chain of base values, up to the original "real" value that spawned the
    base values from the CMNewValue() or CMUseValue().

    In this example we had two types, the "crypt" base type and its base value type, i.e, the
    one passed to newCryptValue(). The dynamic value returned from there was for the crypt
    type. So if we don't supply a value handler for a particular operation, the operation
    will end up be done to the base value.
```

Attorney Docket No.: APPL: P-1120 MCF/WSW
wsw/appl/1120.001                         151

- 152 -

Taking advantage of this means you don't have to supply a handler unless it is absolutely necessary. This minimizes the coding, not to mention code size! We actually do take advantage of the method ('er, excuse me, value operation) inheritance here. All value operations which do not involve encryption, decryption, or data offsets (remember we wrote our own data to the base value) are not defined (i.e., we return NULL for their address) as handlers.

The "setValueType"/"setValueGeneration" handlers are such handlers. It should be pointed out that if the type is changed, you are "pulling" the rug out" from under the dynamic value creation. Once released, the value will not have a crypt base type, unless, of course, the new type had one.

Note that we actually declare all the value operations handlers as "static" since they only need to be visible in this file. The Container Manager gets at them through the addresses we return from here.

The handlers do their work by calls back to the Container Manager. But the values passed back cannot be the dynamic value passed in. This could lead to a recursive and endless loop. This IS detected by the Container Manager as an error condition.

In our crypt case, the handlers will use the refCon to do their respective operations on the base value which we get from the passed value by doing a CMGetBaseValue() on it.

By the time a dynamic value operation handler has been called, all validation checks have been done on the dynamic value by the Container Manager. So they need not be done every time here. Validation checks include such things as the Container Manager being initialized, non-NULL value pointers, etc. In short, all the validations the value routines do for normal values before discovering it should call a dynamic value handler.
*/

```
static CMHandlerAddr cryptValueMetahandler(CMType targetType, CMconst_CMGlobalName
operationType)
{
    static char *operationTypes[] = {CMGetValueSizeOpType,    /* 0 */ /* Operation Types */
                                     CMReadValueDataOpType,    /* 1 */
                                     CMWriteValueDataOpType,   /* 2 */
                                     CMInsertValueDataOpType,  /* 3 */
                                     CMDeleteValueDataOpType,  /* 4 */
                                     CMGetValueInfoOpType,     /* 5 */
                                     CMSetValueTypeOpType,     /* 6 */
                                     CMSetValueGenOpType,      /* 7 */
                                     CMReleaseValueOpType,     /* 8 */
                                     NULL};
    char    **t;
    CMType ignored = targetType;

/* Look up the operation type in the operationTypes table above...           */ t = operationTypes - 1;
    while (*++t) if (strcmp((char *)operationType, *t) == 0) break;

/* Now that we got it (hopefully), return the appropriate routine address... */ switch (t - operationTypes) {
        case 0: return ((CMHandlerAddr)getValueSize_Handler);    /* CMGetValueInfoOpType     */
        case 1: return ((CMHandlerAddr)readValueData_Handler);   /* CMReadValueDataOpType    */
        case 2: return ((CMHandlerAddr)writeValueData_Handler);  /* CMWriteValueDataOpType   */
        case 3: return ((CMHandlerAddr)insertValueData_Handler); /* CMInsertValueDataOpType  */
        case 4: return ((CMHandlerAddr)deleteValueData_Handler); /* CMDeleteValueDataOpType  */
        case 5: return (NULL);/* use inherited handler or API *//* CMGetValueInfoOpType     */
        case 6: return (NULL);/* use inherited handler or API *//* CMSetValueTypeOpType     */
        case 7: return (NULL);/* use inherited handler or API *//* CMSetValueGenOpType      */
        case 8: return ((CMHandlerAddr)releaseValue_Handler);    /* CMReleaseValueOpType     */ default: return (NULL);
    }
}
```

Attorney Docket No.: APPL: P-1120 MCF/WSW
wsw/appl/1120.001                    152

- 153 -

```
/*=============================================================================*/
/*=============================================================================*/

/* Since all that's left are the value operations that do encrypting and decrypting, we  */
/* need a private routine to do the encryption/decryption work...                         */

/*-----------------------*
  | Encrypt/Decrypt Data |
  *-----------------------*

This routine takes data, consisting of dataSize bytes, and encrypts or decrypts it using
the key, keySize bytes. The algorithm does a simple "exclusive-or" of the key with the
data. So encryption and decryption are the same. Which way it happens depends on whether
the call is for reading or writing.

Note, the key is cyclicly used over the data. As such which key character used depends
on the offset of each data character. Therefore the starting offset for the data is
passed.

This implementation only makes sense if no data is inserted or deleted once encrypted.
Hence, inserts and deletes are not supported in this example implementation.
*/ static void CM_NEAR crypt(unsigned char *data, unsigned long dataSize,
                          unsigned char *key,  unsigned long keySize,
                          unsigned long offset)
{
    unsigned char *keyStart = key;

if (keySize == 0) return;           /* no key means no encryption
*/ key += (offset % keySize);          /* starting key char is a function of offset*/ while (dataSize--) {                /* process each character of the data... */
        *data++ ^= *key++;              /* ...encrypt/decrypt it                 */
        if (++offset % keySize == 0)    /* ...if we exhausted the key...         */
            key = keyStart;             /* ...cycle it                           */
    }
}

/*=============================================================================*/
/*=============================================================================*/

/* What follows now are the individual dynamic value operations handlers whose addresses*/
/* we returned from the above metahandler. As stated above, these routines MUST have    */
/* the same semantics (within reason) as the corresponding API routine that calls them. */
/* If a routine doesn't make sense for the dynamic value it should report an error.     */

/* All validation has already been done by the time a handler routine is called. Except */
/* for validation, the API routine that calls the handler does NOTHING else. Note,      */
/* however, that since there is a one-to-one mapping between the handlers and their     */
/* corresponding API routines, many handlers end up doing a call back to the Container  */
/* Manager to do their tasks passing the parameters unaltered (e.g., buffer pointers,   */
/* sizes, etc.). The Container Manager always trys to validate its parameters as best   */
/* it can. For example, a NULL buffer pointer is processed appropriately. What all      */
/* this means is that the handlers do not need to do these valiations either on the     */
/* parameters. It can be left to the Container Manager if the parameters are passed in  */
/* a call back.                                                                         */

/* What each of these handlers must do first, usually, is get the refCon we built in    */
/* the "use value" handler. The refCon contains the encryption key and key size.        */
/* Remember, we have to adjust all passed offsets by the keysize sinze we wrote the key */
/* to the base value (in the "new value" handler) but the caller doesn't know that.     */
```

Attorney Docket No.: APPL: P-1120 MCF/WSW
wsw/appl/1120.001                    153

- 154 -

```
/*-----------------------------------------------------------*
 | getValueSize_Handler - CMGetValueSize() dynamic value handler |
 *-----------------------------------------------------------*

The character size of the file is returned.

We must adjust the size by the size of our own data. The user is not aware of that stuff.
    We do similar offset arithmetic in the handlers that involve offsets.
*/ static CMSize getValueSize_Handler(CMValue value)
{
  CryptRefConPtr refCon = (CryptRefConPtr)CMGetValueRefCon(value);

return (CMGetValueSize(CMGetBaseValue(value)) - refCon->dataOffset);
}

/*-----------------------------------------------------------*
 | readValueData_Handler - CMReadValueData() dynamic value handler |
 *-----------------------------------------------------------*

The encrypted data, starting at the offset, for the value is read and decrypted into the
    buffer. The size of the data read is returned. Up to maxSize characters will be read
    (can be 0).

The data is read starting at the offset, up to the end of the data, or maxSize characters,
    whichever comes first. Offsets are relative to 0, where 0 is the first byte of the
    file. If the starting offset is greater than or equal to the current data size, no data
    is read and 0 returned.
*/ static CMSize readValueData_Handler(CMValue value, CMPtr buffer, CMCount offset, CMSize maxSize)
{
  CryptRefConPtr refCon = (CryptRefConPtr)CMGetValueRefCon(value);
  CMSize         amountRead;

/* Read the data and decrypt it...                                       */ amountRead = CMReadValueData(CMGetBaseValue(value), buffer, refCon->dataOffset + offset, maxSize);

crypt((unsigned char *)buffer, (unsigned long)amountRead,
        refCon->theKey, refCon->keySize, (unsigned long)offset);

return (amountRead);
}

/*-----------------------------------------------------------*
 | writeValueData_Handler - CMWriteValueData() dynamic value handler |
 *-----------------------------------------------------------*

The buffer is encrypted and written to the container and defined as the data for the
    value. If the value already has data associated with it, the buffer overwrites the "old"
    data starting at the offset character position. size bytes are written.

If the current size of the value data is T, then the offset may be any value from 0 to
    T. That is, existing data may be overwritten or the value extended with new data. The
    value of T can be gotton using CMGetValueSize(). Note, no "holes" can be created. An
    offset cannot be greater than T.
*/ static void writeValueData_Handler(CMValue value, CMPtr buffer, CMCount offset, CMSize size)
{
  CryptRefConPtr refCon     = (CryptRefConPtr)CMGetValueRefCon(value);
```

- 155 -

```
            CMContainer    container = CMGetValueContainer(value);
            unsigned char  *cryptBuffer;

/* We must encrypt the passed buffer before sending it to the base value for writing. */
            /* It is possible that the buffer passed to us here is a simple string constant. ANSI */
            /* does NOT specify where string constants are placed. They could be in the code.     */
            /* Since code segments may be execute only and not permit modification, we must copy  */
            /* the string to a local buffer and encrypt that. [For what it's worth, the RS/6000   */
            /* showed this protected behavior.]                                                   */ if (size == 0) return;                   /* nothing to do if no data to write */ cryptBuffer = (unsigned char *)CMMalloc(size, refCon->sessionData);
            if (cryptBuffer == NULL) {
              CMError(refCon->sessionData, "Unable to allocate output encryption buffer in container
            \"^0\"",
                      CMReturnContainerName(container));
              return;
            } memcpy((char *)cryptBuffer, (char *)buffer, (size_t)size);

/* Encrypt the data in the local buffer and write it. After that we can free the  */
            /* buffer.                                                                        */ crypt(cryptBuffer, (unsigned long)size, refCon->theKey, refCon->keySize, (unsigned
            long)offset);

CMWriteValueData(CMGetBaseValue(value), cryptBuffer, refCon->dataOffset + offset, size);

CMFree((CMPtr)cryptBuffer, refCon->sessionData);
          }

/*---------------------------------------------------------------------*
           | insertValueData_Handler - CMInsertValueData() dynamic value handler |
           *---------------------------------------------------------------------*

The buffer is encrypted and inserted into the value's data at the specified offset. size
            bytes are inserted.

If the current size of the value data is T, then the offset may be any value from 0 to
            T. That is, the insertion may be anywhere within the data value or the value extended
            with new data. The value of T can be gotton using CMGetValueSize(). Note, no "holes" can
            be created. An offset cannot be greater than T. Also, note, that an insertion at
            offset T is identical to a CMWriteValueData() to the same place.

Note, this routine is not supported for crypt values. See crypt() comments for further
            details.
          */ static void insertValueData_Handler(CMValue value, CMPtr buffer, CMCount offset, CMSize
          size)
          {
            CryptRefConPtr refCon = (CryptRefConPtr)CMGetValueRefCon(value);
            CMCount        unused1 = offset;
            CMSize         unused2 = size;
            CMPtr          unused3 = buffer;

CMError(refCon->sessionData, "Insertions into encrypted data for container \"^0\" are not
          supported",
                    CMReturnContainerName(CMGetValueContainer(value)));
          }

/*---------------------------------------------------------------------*
           | deleteValueData_Handler - CMDeleteValueData() dynamic value handler |
           *---------------------------------------------------------------------*
```

Attorney Docket No.: APPL: P-1120 MCF/WSW
wsw/appl/1120.001

- 156 -

```
Deletes size bytes from the value data starting at the offset.  If the offset is greater
than the value data size, nothing is deleted.  The amount to delete may be greater than
the current data size. In that case, all the data starting from the offset will be
deleted.  If ALL the data is deleted, the value is defined as null, i.e. a data length of
0.

Note, this routine is not supported for crypt values.  See crypt() comments for further
details.
*/ static void deleteValueData_Handler(CMValue value, CMCount offset, CMSize size)
{
  CryptRefConPtr refCon = (CryptRefConPtr)CMGetValueRefCon(value);
  CMCount         unused1 = offset;
  CMSize          unused2 = size;

CMError(refCon->sessionData, "Deletions of encrypted data for container \"^0\" are not supported",
          CMReturnContainerName(CMGetValueContainer(value)));
}

/*-----------------------------------------------------------------*
 | getValueInfo_Handler - CMGetValueInfo() dynamic value handler |
 *-----------------------------------------------------------------*

The specified information for the refNum associated with an value is returned.  A
parameter may be NULL indicating that info is not needed.

Since no encryption or decryption is involved, we actually use the inherited routine.
cryptValueMetahandler() returned NULL for this handler indicating it isn't used for this
dynamic value.  We do show what it would do if it were really called.
*/ static void getValueInfo_Handler(CMValue value, CMContainer *container, CMObject *object,
                                 CMProperty *property, CMType *type,
                                 CMGeneration *generation)
{
  CMGetValueInfo(CMGetBaseValue(value), container, object, property, type, generation);
}

/*-----------------------------------------------------------------*
 | setValueType_Handler - CMSetValueType() dynamic value handler |
 *-----------------------------------------------------------------*

The type ID from the type is set for the specified value.

Since no encryption or decryption is involved, we actually use the inherited routine.
cryptValueMetahandler() returned NULL for this handler indicating it isn't used for this
dynamic value.  We do show what it would do if it were really called.
*/ static void setValueType_Handler(CMValue value, CMType type)
{
  CMSetValueType(CMGetBaseValue(value), type);
}

/*-----------------------------------------------------------------*
 | setValueGeneration_Handler - CMSetValueGeneration() dynamic value handler |
 *-----------------------------------------------------------------*

The generation for the specified subvalue is set.  The generation number must be greater
than or equal to 1.
```

Attorney Docket No.: APPL: P-1120 MCF/WSW
wsw/appl/1120.001                156

- 157 -

```
  Since no encryption or decryption is involved, we actually use the inherited routine.
  cryptValueMetahandler() returned NULL for this handler indicating it isn't used for this
  dynamic value. We do show what it would do if it were really called.
  */ static void setValueGeneration_Handler(CMValue value, CMGeneration generation)
  {
    CMSetValueGeneration(CMGetBaseValue(value), generation);
  }

/*----------------------------------------------------------------*
   | releaseValue_Handler - CMReleaseValue() dynamic value handler |
   *----------------------------------------------------------------*

The association between the refNum and the indirect file dynamic value is destroyed.
  There should be no further operations on the value once this routine is called. This
  handler is only called if this is the LAST use of the dynamic value.

A count is kept by the Container Manager of every CMUseValue() and CMNewValue(). Calling
  CMReleaseValue() reduces this count by one. When the last release is done on the dynamic
  value, this handler will be called.

Note, in the context of these crypt values, the only thing to do here free the refCon
  memory.

Warning! It is an error for the release handler to release its passed base value. It can
  free any other values, just not its base. The reason is that the Container Manager is
  responsible for calling the release handlers for all base types.
  */ static void releaseValue_Handler(CMValue value)
  {
    CryptRefConPtr  refCon = (CryptRefConPtr)CMGetValueRefCon(value);
    CMSession       sessionData = refCon->sessionData;

CMFree(refCon, sessionData);              /* free our refCon              */
  }

CM_END_CFUNCTIONS
```

- 158 -

APPENDIX C

```
/*--------------------------------------------------------------------*
 |                                                                    |
 |                   <<< ExampleIndFileHandlers.h >>>                 |
 |                                                                    |
 |     Example Indirect File Dynamic Value Handler Package Interfaces |
 |                                                                    |
 |                            Ira L. Ruben                            |
 |                              4/4/92                                |
 |                                                                    |
 |                    Copyright 1992 Apple Computer, Inc.             |
 |                         All rights reserved.                       |
 |                                                                    |
 *--------------------------------------------------------------------*

This file contains the interfaces for indirect file value example of dynamic value use.
    See ExampleIndFileHandlers.c for complete documentation on the implementation.  What is
    provided here is all that you would need to use indirect file values.  See
    newIndirectFileValue() for further details.
*/ ifndef __XINDFILEHANDLERS__
define __XINDFILEHANDLERS__ include "CM_API.h"

CM_CFUNCTIONS

CMValue CM_FIXEDARGS newIndirectFileValue(CMObject object, CMProperty property,
                                  CMType type,
                                  char CM_PTR *pathname, char CM_PTR *mode);
/*
    This is a special case of CMNewValue() in that a new value entry of the specified type is
    created for the specified object with the specified property.  A refNum for this value is
    returned.  However, unlike CMNewValue(), the refNum is associated with an value whose data
    (file) is indirectly pointed to by a pathname.  Whenever the returned refNum is used for
    a value operation, that operation will take place on the file pointed to by the pathname.

The specified file is opened according to the open mode.  This may have any one of the
    the following values:

"r",  "rb"    open the file for reading
            "r+", "rb+"   open the file for updating
            "w+", "wb+"   truncate or create file and open for updating (reading/writing)

The "b" is always implied if it is not explicitly specified.  If a write mode ("w") is
    specified with a "+", the "+" is assumed.

Note, if the file is opened for writing ("wb+"), then all future uses of the value, i.e.,
    via CMUseValue() will imply update mode ("rb+").  Further, dynamic value operations do
    both reads and writes of their data.  Since a file type may be a base type of some other
    type, update mode is always assumed ("wb+").

If a file is opened for reading, then a CMUseValue() will open preserve the open status
    and open for reading only.  Similarly, update mode is preserved.  The write is the only
    exception.  This is because there is no way (in this example at least) to tell
    CMUseValue() a change in open mode.  Sorry!  It bothers me too!

The indirect value we want to support here is for data "pointed to" by a file pathname.
    All value operations on the indirect value will then be to the file.

Note, multiple indirections are permitted!  That is the data pointed to by an indirect
    value might be for another indirect value.

There is one restriction on this indirect value implementation. That is that data inserts
    and deletes are NOT supported.  File indirections are supported using standard C stream
```

- 159 -

```
        I/O for portability of this example. With standard C there is no way to cut a file size
        down. Hence deletes cannot be done. Although inserts could be supported, the cost in
        data I/O is potentially expensive. Thus inserts are not supported either.
        */
  define FileValueGlobalName (CMGlobalName)"User:FileValue"  /* file global name (type) */ define RegisterFileValueType(container) \
             (CMSetMetaHandler(CMGetSession(container), \
             FileValueGlobalName, fileDynamicValueMetahandler), \
             CMRegisterType(container, FileValueGlobalName))
        /*
        If file values are created in a container and then the executing session terminated, the
        file values can be used in a future session just like normal values by calling
        CMUseValue(). The only requirement is that you must register the crypt base type prior
        to doing the CMUseValue(). To make this simpler, the above macro is defined. Just call
        RegisterFileValueType() to do the registration.

        Note RegisterFileValueType() is defined as an expression which can be assigned to a
        CMType if you so desire. This would be done to mix the file type into some other
        combination of base types.

A new value with a file type requires two values passed to CMNewValue(), i.e., the
        pathname and the open mode. The parameters are described in newIndirectFileValue()
        above. This fact must be known when mixing file types with other types to set the proper
        CMNewValue() "..." parameters.
        */

        CMHandlerAddr CM_FIXEDARGS fileDynamicValueMetahandler(CMType targetType,
             CMconst_CMGlobalName operationType);
        /*
        This metahandler is called by the Container Manager for dynamic value creation to allow
        the Container Manager to get the addresses of the "metadata", "new value", and "use
        value" handlers. These handlers are used as part of the process of creating dynamic
        values. See code for further documentation.

Note, the Container Manager uses the address of this metahandler when it sees a type
        which has this metahandler registered for it. Registering the metahandler and the type
        can be done with the RegisterFileValueType macro defined above.
        */

CM_END_CFUNCTIONS
45
        #endif
```

- 160 -

APPENDIX D

```
/*---------------------------------------------------------------------*
|                                                                      |
|                    <<< ExampleIndFileHandlers.c >>>                  |
|                                                                      |
|           Example Indirect File Dynamic Value Handler Package        |
|                                                                      |
|                             Ira L. Ruben                             |
|                               4/4/92                                 |
|                                                                      |
|                    Copyright 1992 Apple Computer, Inc.               |
|                           All rights reserved.                       |
|                                                                      |
*----------------------------------------------------------------------*

This file illustrates how one might implement indirect values using the "dynamic value"
    mechanisms provided by the Container Manager. Dynamic values are special values which
    "know" how to manipulate on their own value data. They do this through a set of value
    operation handlers which are expected to be semantically the same as the standard API
    value operations. This is described in more detail later.

The indirect value we want to support here is for data "pointed to" by a file pathname.
    All value operations on the indirect value will then be to the file.

Note, multiple indirections are permitted! That is the data pointed to by an indirect
    value might be for another indirect value.

There is one restriction on this indirect value implementation. That is that data inserts
    and deletes are NOT supported. File indirections are supported using standard C stream
    I/O for portability of this example. With standard C there is no way to cut a file size
    down. Hence deletes cannot be done. Although inserts could be supported, the cost in
    data I/O is potentially expensive. Thus inserts are not supported either.

Basically, dynamic values are similar to C++ objects where the handlers are the object's
    methods. Dynamic values are a generalized mechanism that provides for type inheritance.
    They are similar to C++ objects where the handlers are the object's methods and an
    object's type represents its class. They are dynamic in the sense that they only exist
    from creation (discussed below) and last until until they are released (CMReleaseValue()).

The indirect file example we will illustrate here illustrates the type inheritance where
    the type of the indirect value (which describes what we're kind of file its using) has as
    its base type, a "file" type. The file type will be used to create the dynamic value
    whose value operation handlers will effect the file operations.

Follow the code in this file in the order presented. The comments document the steps
    required to support indirection through a file pathname. The newIndirectFileValue()
    routine defines the interface that can be used to create an indirect file value. It
    would be called just like any other Container Manager API routine.
*/

/*----------------------------------------------------------------------*
| DOS (80x86) USERS -- USE THE "LARGE" MEMORY MODEL WHEN COMPILED FOR 80X86 MACHINES |
*-----------------------------------------------------------------------*

The Container Manager is built with this same option and assumes all handler and
    metahandler interfaces are similarly built and can be accessed with "far" pointers.
*/

/*#include <types.h>*/
#include <stddef.h>
include <stdlib.h>
#include <stdio.h>
#include <string.h>
#include <errno.h>
#include <stdarg.h>
```

Attorney Docket No.: APPL: P-1120 MCF/WSW
wsw/appl/1120.001                  160

- 161 -

```
#ifndef __CM_API__
include "CM_API.h"
#endif
#ifndef __XINDFILEHANDLERS__
#include "ExampleIndFileHandlers.h"
#endif
```

CM_CFUNCTIONS

```
/* See comments in CM_API_Environment.h about CM_CFUNCTIONS/CM_END_CFUNCTIONS (used   */
/* only when compiling under C++).                                                    */

/* In order to make this code read from the top down, it is necessary in a few instances*/
/* to forward reference some metahandler functions. Due to some "complaints" from       */
/* certain C compilers (who shall remain nameless), the forward declarations are placed */
/* here. Basically, ignore this stuff.                                                  */ static CMHandlerAddr fileValueMetahandler(CMType targetType,
        CMconst_CMGlobalName operationType);
```

/* GENERAL NOTE...

In order to make the code as general as possible, the session handlers provided by the
API are used. This includes memory allocation, deallocation, error reporter, and
access to the container identification. These interfaces allow us to use the same
memory and error handlers that the Container Manager uses as provided to
CMStartSession() through the metahandler passed there. The container identification
interface allows us to add that information to the error reports. The wording of these
messages follows the "flavor" of those done by the Container Manager itself.
*/

/*----------------------------------------------------------------------------*
 | newIndirectFileValue - create refNum for a value that indirects to a data file |
 *----------------------------------------------------------------------------*/

This is a special case of CMNewValue() in that a new value entry of the specified type is
created for the specified object with the specified property. A refNum for this value is
returned. However, unlike CMNewValue(), the refNum is associated with an value whose data
(file) is indirectly pointed to by a pathname. Whenever the returned refNum is used for
a value operation, that operation will take place on the file pointed to by the pathname.

The specified file is opened according to the open mode. This may have any one of the
the following values:

"r", "rb"    open the file for reading
    "r+", "rb+"   open the file for updating
    "w+", "wb+"   truncate or create file and open for updating (reading/writing)

The "b" is always implied if it is not explicitly specified. If a write mode ("w") is
specified with a "+", the "+" is assumed.

Note, if the file is opened for writing ("wb+"), then all future uses of the value, i.e.,
via CMUseValue() will imply update mode ("rb+"). Further, dynamic value operations do
both reads and writes of their data. Since a file type may be a base type of some other
type, update mode is always assumed ("wb+").

If a file is opened for reading, then a CMUseValue() will open preserve the open status
and open for reading only. Similarly, update mode is preserved. The write is the only
exception. This is because there is no way (in this example at least) to tell
CMUseValue() a change in open mode. Sorry! It bothers me too!

The way we implement this function is to create a new value according to the passed
object, property, and type. But it is NOT this value we want to return. What we want to
do is create a dynamic value based on this value.

- 162 -

Basically all we do here is make sure the proper types are registered and based prior to doing a "normal" CMNewValue(). But it isolates the type registration to this one place so we can illustrate how to create the desired dynamic value.

The types are the key to generating dynamic values. A dynamic value results when a value is created by to CMNewValue() or attempted to be used by CMUseValue(), and the following two conditions occur:

1. The type or any of its base types (if any, created by CMAddBaseType()), are for global names that have associated metahandlers registered by CMRegisterType().

2. The metahandlers support the operation type to return a "use value" handler, and in addition for CMNewValue(), "metadata" and "new value" handlers.

"Metadata" handlers are used to define metadata that is a format description that directs CMNewValue() on how to interpret it's "..." parameters to produce a data packet of those parameters. The data packet is sent to the "new value" handler. In this routine we will do a CMNewValue() to create the dynamic value with the newIndirectFileValue() pathname and mode passed as the "..." parameters.

"New value" handlers are used to define initialization data for the "use value" handlers based on the data packets. The "use value" handlers are called to set up and return refCons. Another metahandler address is also returned from the "use value" handler. This is used to get the address of the value operation handlers corresponding to the standard API value routines.

The goal is to create a dynamic value to return, which when used will produce the desired indirect-to-a-file effect. Thus we need two types:

1. A type that describes the meaning of this indirect value. That is the type passed to this routine.

2. A base type that represents a "file" in general. The user's type is given the "file" type as its base type.

It is that general "file" base type that most of this file supports. Namely the various metahandlers and handlers for files (stream files in this example). Indeed, the only thing we do here is set up the types, register their methandlers, and do the CMNewValue().
*/

```
CMValue CM_FIXEDARGS newIndirectFileValue(CMObject object, CMProperty property,
                                          CMType type,
                                          char CM_PTR *pathname, char CM_PTR *mode)
{
    CMContainer container;
    CMSession   sessionData;
    CMType      fileType;
    CMValue     dynamicValue;

/* Get the container refNum and session data pointer. They are needed for registering */
    /* metahandlers and types and for reporting errors. Note, if the container is passed  */
    /* as NULL, the session pointer will end up being NULL. In that case, we can't report */
    /* the error and just return NULL.                                                    */ container   = CMGetObjectContainer(object);
    sessionData = CMGetSession(container);

if (sessionData == NULL)       /* if no session...                                    */
        return (NULL);             /* ...there is nothing much else we can do here        */

/* Do a safety check on the refNums...                                                */ if (object == NULL || property == NULL || type == NULL || pathname == NULL || mode == NULL) {
        CMError(sessionData, "Null object, property, type refNum or null pathname or mode passed to newIndirectFileValue()");
        return (NULL);
    }
```

Attorney Docket No.: APPL: P-1120 MCF/WSW
wsw/appl/1120.001

- 163 -

```
/* If you wanted to really be paranoid, you could check that the property and type   */
/* both belonged to the same container. But lets be "trusting" for now!               */

/* Register the "file" type (or reregister it just to make sure its registered) and  */
/* then define the metahandler for that type which will return the "metadata", "new  */
/* value", and "use value" handlers (described later in this file). Note, the "file" */
/* global name, as well as the metahandler are published in the indirect file header */
/* file to allow other combinations of base types that might want files as one of    */
/* their inherited types. Further, to use the value we're creating in the future     */
/* sessions, the caller simply does a CMUseValue(). But that requires the type and   */
/* its metahandler be registered just as we do here. As a convenience we provide a   */
/* macro to do this in the header file. For clearity, we do it explicitly here.      */

CMSetMetaHandler(sessionData, FileValueGlobalName, fileDynamicValueMetahandler);
fileType = CMRegisterType(container, FileValueGlobalName);
if (fileType == NULL) return (NULL);

/* The file type will be defined as a base type for the caller's type. The caller's  */
/* type is already defined. It is assumed to be a type that describes what kind of   */
/* file indirection this is. The type heirarchy we want looks something like this:   */

/*                                                                                   */
/*                         File Type (bottom type)                                   */
/*                              *                                                    */
/*                              *                                                    */
/*                              *                                                    */
/*                         Caller's Type (top type)                                  */

/* In other words, we want the file type as a base type of the description type. This */
/* is easily accomplished as follows:                                                 */

CMAddBaseType(type, fileType);

/* Base types are essentially values for a special "base type" property added to the */
/* type object. Above we're defining fileType as a single base type for the type.    */

/* That's about all there is to it! Now all that's left is to do the CMNewValue()    */
/* to create the dynamic value.                                                       */ dynamicValue = CMNewValue(object, property, type, pathname, mode);

/* The dynamicValue is now created! We can return it to the caller. Note that the    */
/* pathname and mode are passed to CMNewValue(). It has no idea what these are! But  */
/* it does know how to deal with them. Specifically, it passes them to the "metadata"*/
/* "new value" handlers during the creation of the dynamic value. CMNewValue() knows */
/* there are two additional parameters because of the metadata we defined for the base*/
/* type. You can see it works something like "printf()", although across two different*/
/* places. The metadata tells CMNewValue() to consume the additional parameters just */
/* like the "printf()" format string tells "printf()".                               */

/* Getting back to the dynamic value -- to reiterate, the rules for dynamic value    */
/* creation are that when a CMNewValue() or CMUseValue() are done, if the passed type,*/
/* or any of its base types have (through associated metahandlers) a "use value"     */
/* handler, and additionally for CMNewValue(), a "metadata" and "new value" handler, */
/* a dynamic value is created.                                                        */ return (dynamicValue);
}

/* That's all there is to it! From this point on we turn our attention to the definition*/
/* of the metahandlers and handlers.                                                  */

/*===================================================================================*/
/*===================================================================================*/
```

Attorney Docket No.: APPL: P-1120 MCF/WSW
wsw/appl/1120.001

- 164 -

```
/*--------------------------------------------------------------------*
 | fileDynamicValueMetahandler - matahandler for file dynamic value creation |
 *--------------------------------------------------------------------*/
```

The first methandler to be defined is the metahandler called from CMNewValue() or CMUseValue() for dynamic value creation. It does this to see if a type, which had this metahandler registered for the type global name, has a "use value" handler, and additionally for CMNewValue(), "metadata" and "new value" handlers defined. That is the criteria on whether a dynamic value is to be created.

The "metadata", "new value", and "use value" handlers have the following prototypes:   */

```
static CMMetaData metaData_Handler(CMType type);
static CMBoolean newValue_Handler(CMValue dynamicBaseValue, CMType type,
                                  CMDataPacket dataPacket);
static CMBoolean useValue_Handler(CMValue dynamicBaseValue, CMType type,
                                  CMMetaHandler *metahandler, CMRefCon *refCon);
```

The parameters are defined later in this file in the documentation for these routines.  /*
*/

```
CMHandlerAddr CM_FIXEDARGS fileDynamicValueMetahandler(CMType targetType,
CMconst_CMGlobalName operationType)
{
  CMType ignored = targetType;

if (strcmp((char *)operationType, CMDefineMetaDataOpType)==0) /* "metadata"  */
    return ((CMHandlerAddr)metaData_Handler);
  else if (strcmp((char *)operationType, CMNewValueOpType) == 0)/* "new value" */
    return ((CMHandlerAddr)newValue_Handler);
  else if (strcmp((char *)operationType, CMUseValueOpType) == 0)/* "use value" */
    return ((CMHandlerAddr)useValue_Handler);
  else
    return (NULL);                                /* what's the question? */
}
```

```
/*--------------------------------------------------------------------*
 | metaData_Handler - return the matadata for the indirect file type |
 *--------------------------------------------------------------------*/
```

The "metadata" handler is called from CMNewValue() so that the proper number of its "..." parameters can be placed into a data packet to be passed to the "new value" handler. This handler takes the type for which we ant to return the corresponding metadata.

In the case of indirect file values, we want to pass the newIndirectFileValue() parameters that defines the pathname and open mode. The metadata "%p %p" will serve the purpose. It specifies a pointer to the pathname and mode strings.

Note, we can define any format we thing is appropriate for the "new value" handler so long as it uses CMScanDataPacket() to extract the parameters and uses this handler itself to get the metadata format string. That's what we will do when we get to the "new value" handler.
*/

```
static CMMetaData metaData_Handler(CMType type)
{
  CMType unused = type;

return ((CMMetaData)"%p(=path) %p(=mode)");
}
```

```
/*--------------------------------------------------------------------*
 | newValue_Handler - create permanent data for the "use value" handler |
 *--------------------------------------------------------------------*/
```

The "new value" handler is called from CMNewValue() for dynamic value creation just prior

- 165 - to calling the "use value" handler. It is not used by CMUseValue().

"New value" handlers are used to define initialization data for the "use value" handlers. It is assumed that such data will be some function of the original parameters passed to CMNewValue(). These are packed into the dataPacket according to the metadata defined for the type. If there are multiple base types, each type's metadata directs CMNewValue() on how many of its "..." parameters to consume in build a data packet.

Base types are processed in a depth-first manner, so CMNewValue() "..." parameters are consumed left-to-right, for the deepest base type to the highest. For example, given the following type inheritance heirarchy (read these as T1 inherits from T2 and T3, and so on):

```
            T4    T5
             *   *
              * *
          T2    T3
            *  *
             **
              T1
```

The depth-first search, starting at T1, yields the sequence: T2 T4 T5 T3 T1. Then this is the order the CMNewValue() "..." parameters must be in. It is also the order the dynamic value layers are generated. T1 is the top layer, and T2 the bottom. T1 would be the dynamic value returned from CMNewValue().

In this example we only have a single base type, the "file" type, which has metadata defined to pass the file pathname and open mode string pointers.

From this data we want to write permanent information so that the "use value" handler, which is always called for CMNewValue() and CMUseValue(), can create an appropriate refCon to pass among the value operation handlers. The data layout chosen is as follows:    */

```
struct FileData {              /* File data layout:                          */
   char  mode[4];              /*    open mode                               */
   short pathnameLength;       /*    size of the pathname (including null)   */
};                             /*    the pathname follows the size           */
typedef struct FileData FileData;

#define FileDataSize (sizeof(FileData))
```
                                                                              /*
In the above data, we only have to remember the open mode, the pathname length and the pathname string. This is the data we will write to the dynamic value's base value. It is thus permanently remembered. Now, if the container is opened for reading, if a CMUseValue() is done on the value, the "use value" handler will read the data just as in the CMNewValue() case. Remember that newIndirectFileValue() is done only to initially create the crypt value. Future uses don't call it. So nothing should be written that can't be used by only calling "use value" handler without its "new value" handler.

Note, that the data includes the length of the pathname. This is necessary so that the "use value" handler knows how much to read for the pathname. This will therefore require multiple reads by the "use value" handler.

On final point, if any errors are reported, we abort the execution of the program in this example. As documented, error reporters are not supposed to return. But in case they do, the Container Manager wants to know about it! The CMBoolean function result is used for that purpose. Nonzero should be returned for success, and if this should happen to return for a failure, 0 should be returned as the function result.
*/

```
static CMBoolean newValue_Handler(CMValue dynamicBaseValue, CMType type, CMDataPacket dataPacket)
{
   CMContainer container   = CMGetObjectContainer(type);
   CMSession   sessionData = CMGetSession(container);
   CMCount     i;
   char        *pathname, *mode0, *mode, *m, c;
   FileData    fileData;
```

```
/* Scan the dataPacket to get the pathname and mode back into variables. The API      */
/* provides CMScanDataPacket() to do that. We reverse what CMNewValue() did by using  */
/* our own "metadata" handler to get the metadata to direct the extraction of         */
/* dataPacket fields back to variables (sort of like a "scanf()").                    */ i = CMScanDataPacket(type, metaData_Handler(type), dataPacket, &pathname, &mode);

if (i != 2) {
    CMError(sessionData, "Unable to get all of CMNewValue()'s \"...\" pathname parameter in container \"^0\"", CMReturnContainerName(container));
    return (0);
}

/* Set the pathname length in the data buffer (include the null)...                   */ fileData.pathnameLength = (short)(strlen(pathname) + 1);

/* Validate the open mode and put it in the data buffer. We only accept "w[b][+]" and */
/* "r[b][+]". We always insert the "b" if it isn't there. We also insert "+" on "w"   */
/* if it isn't there.                                                                 */ mode0 = mode;
m = fileData.mode;                      /* save original mode for possible errors */
c = *mode++;                            /* build mode directly in data buffer    */
if (c == 'w' || c == 'r') {
    *m++ = c;                           /* "r"        "w"                        */
    c = *mode++;
    if (c == 'b') {
        *m++ = 'b';                     /* "rb"       "wb"                       */
        c = *mode++;
        if (c == '+') {
            *m++ = '+';                 /* "rb+"      "wb+"                      */
            c = *mode++;
        } else if (*fileData.mode == 'w') {   /*          "wb+"                    */
            *m++ = '+';
        }
    } else if (c == '+') {
        *m++ = 'b';                     /* "r"        "w+"                       */
        *m++ = '+';                     /* "rb+"      "wb+"                      */
        c = *mode++;
    } else {
        *m++ = 'b';                     /* "rb"       "wb"                       */
        if (*fileData.mode == 'w')      /*            "wb+"                      */
            *m++ = '+';
    }
} else
    c = '?';                            /* error                                 */ if (c != '\0') {                        /* must be looking at null delimiter in mode*/
    CMError(sessionData, "Invalid open mode (\"^0\") in container \"^1\"", mode0, CMReturnContainerName(container));
    return (0);
}

*m = '\0';                              /* null at end of the mode string        */

/* Write the data buffer that "use value" will read. We are going to "cheat" a little */
/* here and write pathname separately just like the "use value" handler will read it. */

CMWriteValueData(dynamicBaseValue, (CMPtr)&fileData, 0, FileDataSize);
CMWriteValueData(dynamicBaseValue, (CMPtr)pathname, FileDataSize, (CMSize)fileData.pathnameLength);

return (1);                             /* that's all there is to do here!       */
}
```

Attorney Docket No.: APPL: P-1120 MCF/WSW
wsw/appl/1120.001

- 167 -

```
/*----------------------------------------------------------------*
 | useValue_Handler - create a dynamic value and its associated metahandler |
 *----------------------------------------------------------------*/

The "use value" handler is called for both CMNewValue() and CMUseValue(). For
   CMNewValue(), it is called after the "new value" handler. Either way, the "use value"
   handler is expected to build a refCon to pass among its value operation handlers, and
   to return a pointer to the metahandler that will yield the addresses of those handlers.

Generally, the refCon is built from the data written to a dynamic values base value by
   the "new value" handler. That data is permanent, and thus a CMUseValue() on the value
   of the dynamic value type will cause the creation of the dynamic value even when the
   "new value" handler is not called (as is the case for CMUseValue()).

As with the "new value" handler, the type is passed as a convenience. It may or may not
   be needed. For the "new value" handler it is passed to CMScanDataPacket() to convert
   the data packet back into variables. Here, it may not be needed. It is possible for a
   type object to contain OTHER data for other properties. Types, after all, are ordinary
   objects. There is nothing prohibiting the creation of additional properties and their
   values. This fact could be used to pass additional (static?) information to the "new
   value" or "use value" handlers which would read the data values.

In this example, the "new value" handler data written to the base value is as defined by
   the FileData struct defined in the "new value" handler. It contains the open mode and
   pathname.

The refCon we build from this data has the following layout:                */ struct FileRefCon {                    /* File handler's refCon:            */
      CMSession    sessionData;           /*   ptr to the current container session */
      FILE         *f;                    /*   file variable to pointed to file */
      char         pathname[1];           /*   the START of the pathname       */
   };
   typedef struct FileRefCon FileRefCon, *FileRefConPtr;                        /*

The current session data pointer, which we need to allocate the refCon is kept just as a
   convenience in case we need it again. At the very least it will be needed to free the
   refCon.

The refCon is accessable to all the handler routines via a CMGetValueRefCon() call.

Note, as with the "new value" handler, if any errors are reported, we abort the execution
   of the program in this example. As documented, error reporters are not supposed to return.
   But in case they do, the Container Manager wants to know about it! The CMBoolean function
   result is used for that purpose. Nonzero should be returned for success, and if this
   should happen to return for a failure, 0 should be returned as the function result.
   */ static CMBoolean useValue_Handler(CMValue dynamicBaseValue, CMType type,
                                     CMMetaHandler *metahandler, CMRefCon *refCon)
   {
      CMContainer    container    = CMGetObjectContainer(type);
      CMSession      sessionData  = CMGetSession(container);
      FileRefConPtr  myRefCon;
      FileData       fileData;

/* Read in the the open mode and pathname length written by the "new value" handler */
      /* according to the FileData format...                                              */ if (CMReadValueData(dynamicBaseValue, (CMPtr)&fileData, 0, FileDataSize) != FileDataSize)
      {
         CMError(sessionData, "Incorrect byte length read while reading indirect (pathname)
   value data in container \"^0\"", CMReturnContainerName(container));
         return (0);
      }

/* Allocate the refCon that we will pass among the handlers. Since we are doing a   */
      /* dynamic allocation here we will use the "malloc" handler defined for the container.*/
```

```
    myRefCon = (FileRefConPtr)CMMalloc(sizeof(FileRefCon) + fileData.pathnameLength,
sessionData);
    if (myRefCon == NULL) {
       CMError(sessionData, "Cannot allocate space for file handler refCon in container
\"^0\"", CMReturnContainerName(container));
       return (0);
    } myRefCon->sessionData = sessionData;              /* save the current session ptr    */

/* Read the pathname directly into our allocated refNum...                           */ if (CMReadValueData(dynamicBaseValue, (CMPtr)myRefCon->pathname, FileDataSize,
    (CMSize)fileData.pathnameLength) != (CMSize)fileData.pathnameLength) {
       CMError(sessionData, "Incorrect byte length read while reading pathname in container
\"^0\"", CMReturnContainerName(container));
       CMFree(refCon, sessionData);
       return (0);
    }

/* Open the file.  We use the open mode provided in the fileData. If its is "wb" or  */
    /* "wb+" then it can only be from newIndirectFileValue(). This is because after we do */
    /* the open, we CHANGE the open mode in the data to "rb+" for future updating.  This */
    /* is not a satisfying solution.  But there is no clean way to tell a CMUseValue(),  */
    /* which is all future uses of the value that will get to us here, there's no clean  */
    /* way to pass a different open mode. We could clutter up this example and provide a */
    /* "useIndirectFileValue()" that did the "CMUseValue() for the caller and changed the */
    /* data to the appriate mode (a parameter to the useIndirectFileValue) BEFORE doing a */
    /* CMUseValue().  That would fake out this routine. But even that would only work for */
    /* a container opened for update mode because we're rewriting the data we're using   */
    /* here.  Still another solution would be to pass the mode is a static global!  But  */
    /* we have been avoiding them like the plague everywhere. The bottom line -- screw it!*/ myRefCon->f = fopen(myRefCon->pathname, fileData.mode);  /* open the file...        */
    if (myRefCon->f == NULL) {                               /* oops!                   */
       CMError(sessionData, "Cannot open \"^0\" using mode \"^1\" for container \"^2\"\n ^3",
           myRefCon->pathname, fileData.mode, CMReturnContainerName(container),
strerror(errno));
       CMFree(refCon, sessionData);
       return (0);
    } if (*fileData.mode == 'w') {                      /* if file was opened for writing  */
       strcpy(fileData.mode, "rb+");                  /* future opens will be updating   */
       CMWriteValueData(dynamicBaseValue, (CMPtr)&fileData, 0, FileDataSize);
    }                                                 /* it's forever changed!           */

/* All that's left to do here is to return the refCon and the pointer to the value  */
    /* operations metahandler to the Container Manager who called us...                 */

*metahandler = (CMMetaHandler)fileValueMetahandler;  /* return metahandler          */
    *refCon      = (CMRefCon)myRefCon;                   /* ...and refCon               */ return (1);                                          /* we're now ready to go       */
}

/*---------------------------------------------------------------------------*
 | fileValueMetahandler - metahandler for a dynamic value operations handlers |
 *---------------------------------------------------------------------------*

This is the metahandler that the "use value" handler returns to the Container Manager.
    It defines the addresses for all the value operations handlers supported for files.

The dynamic value operations handlers have the following prototypes:              */ static CMSize getValueSize_Handler(CMValue value);
```

Attorney Docket No.: APPL: P-1120 MCF/WSW
wsw/appl/1120.001

- 169 -

```
        static CMSize readValueData_Handler(CMValue value, CMPtr buffer, CMCount offset, CMSize
    maxSize);
        static void writeValueData_Handler(CMValue value, CMPtr buffer, CMCount offset, CMSize
    size);
        static void insertValueData_Handler(CMValue value, CMPtr buffer, CMCount offset, CMSize
    size);
        static void deleteValueData_Handler(CMValue value, CMCount offset, CMSize size);
        static void getValueInfo_Handler(CMValue value, CMContainer *container, CMObject *object,
                        CMProperty *property, CMType *type,
                        CMGeneration *generation);
        static void setValueType_Handler(CMValue value, CMType type);
        static void setValueGeneration_Handler(CMValue value, CMGeneration generation);
        static void releaseValue_Handler(CMValue value);

/*
    Note that these handlers have exactly the same calling conventions as the standard API
    routines. These handlers must also have the same semantics. What happens is that every
    time a dynamic value is passed to the Container Manager, it is validated and then checked
    to see if it is indeed a dynamic value. If it is, the corresponding handler is called to
    do the work.

The actual handler called for the dynamic value may or may NOT be associated with the
    type associated with the dynamic value. Just like C++, dynamic values may be "subclassed"
    via their (base) types. If a handler for a particular operation is not defined for a
    value, its "base value" is used to get the "inherited" handler. This continues up a
    dynamic value's chain of base values, up to the original "real" value that spawned the
    base values from the CMNewValue() or CMUseValue().

In this example we had two types, the "file" base type and its base "real" value type,
    i.e, the one passed to newIndirectFileValue(). The dynamic value returned from there was
    for the file. So if we don't supply a value handler for a particular operation, the
    operation will end up be done to the base "real" value.

Taking advantage of this means you don't have to supply a handler unless it is absolutely
    necessary. This minimizes the coding, not to mention code size! We actually do take
    advantage of the method ('er, excuse me, value operation) inheritance here. The file
    operations for the "getValueInfo", "setValueType", and "setValueGeneration" are not
    defined (i.e., we return NULL for their address) as handlers.

For "getValueInfo", "setValueType", and "setValueGeneration" it's obvious you want to use
    the base "real" value. Note however, if the type is changed, you are "pulling" the rug
    out" from under the dynamic value creation. Once released, the value will not have a file
    base type, unless, of course, the new type had one.

Note that we actually declare all the value operations handlers as "static" since they
    only need to be visible in this file. The Container Manager gets at them through the
    addresses we return from here.

The handlers do their work by calls back to the Container Manager. But the values passed
    back cannot be the dynamic value passed in. This could lead to a recursive and endless
    loop. This IS detected by the Container Manager as an error condition.

In our indirect file case, the handlers will use the refCon to do their respective
    operations on the file. Remember stream file variable was placed in the refCon by the
    "use value" handler when it opened the file.

By the time a dynamic value operation handler has been called, all validation checks have
    been done on the dynamic value by the Container Manager. So they need not be done every
    time here. Validation checks include such things as the Container Manager being
    initialized, non-NULL value pointers, etc. In short, all the validations the value
    routines do for normal values before discovering it should call a dynamic value handler.

Note, as documented in the comments at the start of this file, we do not support data
    deletes and inserts. However, we do define handlers for these. We could not provide
    handlers and just return NULL for those operation types. But by providing handlers we
    can report a more appropriate error message than the more generic one used by the API
    when it descovers it needs a handler and none was provided.
```

Attorney Docket No.: APPL: P-1120 MCF/WSW
wsw/appl/1120.001

- 170 -

One other thing to keep in mind. Since these handlers operate directly on a file, a file type can only be used as a bottom-most layer of a set of layered dynamic values. For example, an encryption type can have a file type as its base value. But the file type cannot have any meaningful additional base types of its own. So you couldn't, for example, have a file type that has an encryption base.

In theory, given a different definition of "file" types, i.e., what their handlers do, you could have a file type with an encryption base type. Only the fact that "file" type handlers don't do their operations in terms of their base value is prohibiting this.
*/

```
static CMHandlerAddr fileValueMetahandler(CMType targetType, CMconst_CMGlobalName operationType)
{
    static char *operationTypes[] = {CMGetValueSizeOpType,    /* 0 */ /* Operation Types */
                                     CMReadValueDataOpType,   /* 1 */
                                     CMWriteValueDataOpType,  /* 2 */
                                     CMInsertValueDataOpType, /* 3 */
                                     CMDeleteValueDataOpType, /* 4 */
                                     CMGetValueInfoOpType,    /* 5 */
                                     CMSetValueTypeOpType,    /* 6 */
                                     CMSetValueGenOpType,     /* 7 */
                                     CMReleaseValueOpType,    /* 8 */
                                     NULL};
    char    **t;
    CMType ignored = targetType;

/* Look up the operation type in the operationTypes table above...            */ t = operationTypes - 1;
    while (*++t) if (strcmp((char *)operationType, *t) == 0) break;

/* Now that we got it (hopefully), return the appropriate routine address...  */ switch (t - operationTypes) {
       case 0: return ((CMHandlerAddr)getValueSize_Handler);    /* CMGetValueSizeOpType    */
       case 1: return ((CMHandlerAddr)readValueData_Handler);   /* CMReadValueDataOpType   */
       case 2: return ((CMHandlerAddr)writeValueData_Handler);  /* CMWriteValueDataOpType  */
       case 3: return ((CMHandlerAddr)insertValueData_Handler); /* CMInsertValueDataOpType */
       case 4: return ((CMHandlerAddr)deleteValueData_Handler); /* CMDeleteValueDataOpType */
       case 5: return (NULL);/* use inherited handler or API *//* CMGetValueInfoOpType    */
       case 6: return (NULL);/* use inherited handler or API *//* CMSetValueTypeOpType    */
       case 7: return (NULL);/* use inherited handler or API *//* CMSetValueGenOpType     */
       case 8: return ((CMHandlerAddr)releaseValue_Handler);    /* CMReleaseValueOpType    */ default: return (NULL);
    }
}

/*==============================================================================*/
/*==============================================================================*/

/* What follows now are the individual dynamic value operations handlers whose addresses*/
/* we returned from the above metahandler.  As stated above, these routines MUST have   */
/* the same semantics (within reason) as the corresponding API routine that calls them. */
/* If a routine doesn't make sense for the dynamic value it should report an error.     */

/* All validation has already been done by the time a handler routine is called. Except */
/* for validation, the API routine that calls the handler does NOTHING else.  Note,     */
/* however, that since there is a one-to-one mapping between the handlers and their     */
/* corresponding API routines, many handlers end up doing a call back to the API to do  */
/* their tasks passing the parameters unaltered (e.g., buffer pointers, sizes, etc.).   */
/* The API always trys to validate its parameters as best it can. For example, a NULL   */
/* buffer pointer is processed appropriately. What all this means is that the handlers  */
/* do not need to do these valiations either on the parameters. It can be left to the   */
/* API if the parameters are passed in a call back.                                     */
```

Attorney Docket No.: APPL: P-1120 MCF/WSW
wsw/appl/1120.001                170

- 171 -

```
/* What each of these handlers must do first, usually, is get the refCon we built in   */
/* the "use value" handler.  The refCon contains the file variable for the file to be  */
/* operated upon by the handlers.                                                      */

/*----------------------------------------------------------------*
 | getValueSize_Handler - CMGetValueSize() dynamic value handler |
 *----------------------------------------------------------------*

The character size of the file is returned. We do this be seeking to the end of the file
and getting that position.  Other systems might have more efficient (?) ways of doing
this.
*/ static CMSize getValueSize_Handler(CMValue value)
{
    FileRefConPtr refCon = (FileRefConPtr)CMGetValueRefCon(value);
    int           err;

fseek(refCon->f, 0L, SEEK_END);                    /* seek to the end of file  */ err = ferror(refCon->f);                           /* check for error...       */
    if (err != 0) {
        CMError(refCon->sessionData, "Error trying to get file size of file \"^0\" for container \"^1\"\n   ^2",
            refCon->pathname, CMReturnContainerName(CMGetValueContainer(value)), strerror(err));
        return (0);
    } return ((CMSize)ftell(refCon->f));                 /* size is where we are     */
}

/*----------------------------------------------------------------*
 | readValueData_Handler - CMReadValueData() dynamic value handlr |
 *----------------------------------------------------------------*

The data, starting at the offset, for the file is read into the buffer.  The size of the
data read is returned.  Up to maxSize characters will be read (can be 0).

The data is read starting at the offset, up to the end of the data, or maxSize characters,
whichever comes first.  Offsets are relative to 0, where 0 is the first byte of the
file.  If the starting offset is greater than or equal to the current file size, no data
is read and 0 returned.
*/ static CMSize readValueData_Handler(CMValue value, CMPtr buffer, CMCount offset, CMSize maxSize)
{
    FileRefConPtr refCon   = (FileRefConPtr)CMGetValueRefCon(value);
    CMSize        fileSize = getValueSize_Handler(value);
    CMSize        amountRead;
    int           err;

/* The offset is with respect to the file.  If it is beyond the end of the file we  */
    /* we don't read anything.                                                          */ if (offset >= fileSize) return (0);

/* Read the data from the file.  Up to maxSize or fileSize - offset bytes are read, */
    /* whichever is smaller.  The actual amount read is returned.                       */ fseek(refCon->f, (long)offset, SEEK_SET);
    err = ferror(refCon->f);                           /* check for error...       */
    if (err != 0) {
        CMError(refCon->sessionData, "Error trying to set write position of file \"^0\" for container \"^1\"\n   ^2",
```

Attorney Docket No.: APPL: P-1120 MCF/WSW
wsw/appl/1120.001                171

```
            refCon->pathname, CMReturnContainerName(CMGetValueContainer(value)),
  strerror(err));
      return (0);
    } amountRead = (CMSize)fread((char *)buffer, 1,
               (size_t)((maxSize <= fileSize - offset) ? maxSize : (fileSize - offset)),
               refCon->f);

return (amountRead);
}

/*----------------------------------------------------------------*
 | writeValueData_Handler - CMWriteValueData() dynamic value handler |
 *----------------------------------------------------------------*

The buffer is written to the file and defined as the data for the indirect value. Note,
this OVERWRITES data in the file, possibly extending the file. It is, however, an error
to try to create a "hole" in the file by writing beyond the end.
*/ static void writeValueData_Handler(CMValue value, CMPtr buffer, CMCount offset, CMSize size)
{
    FileRefConPtr refCon    = (FileRefConPtr)CMGetValueRefCon(value);
    CMSize        fileSize  = getValueSize_Handler(value);
    int           err;

/* First do the error check to see if caller is trying to write beyond the current */
    /* end of file.                                                                    */ if (offset > fileSize) {
        CMError(refCon->sessionData, "Attempt to write beyond eof in file \"^0\" for container \"^1\"",
                refCon->pathname, CMReturnContainerName(CMGetValueContainer(value)));
        return;
    }

/* Now all we have to do is simply write the data to the file...                   */ if (size > 0) {
        fseek(refCon->f, (long)offset, SEEK_SET);         /* must have some data to write */
        err = ferror(refCon->f);
        if (err != 0) {                                    /* check for error...            */
            CMError(refCon->sessionData, "Error trying to set write position of file \"^0\" for container \"^1\"\n   ^2",
                    refCon->pathname, CMReturnContainerName(CMGetValueContainer(value)),
                    strerror(err));
            return;
        } fwrite((char *)buffer, 1, (size_t)size, refCon->f);
    }
}

/*----------------------------------------------------------------*
 | insertValueData_Handler - CMInsertValueData() dynamic value handler |
 *----------------------------------------------------------------*

If supported, this routine inserts size bytes from the buffer into the file at the
specified offset. However, in this example, for indirection to a file of data, we simply
report an error that this functionality is not supported. To do so is potentially
expensive in data I/O.

Remember, this is only an example. We (I) don't want to distract from the intent of this
file of how to support indirection with dynamic values.
```

Attorney Docket No.: APPL: P-1120 MCF/WSW
wsw/appl/1120.001

- 173 -

```
*/ static void insertValueData_Handler(CMValue value, CMPtr buffer, CMCount offset, CMSize
size)
{
    FileRefConPtr refCon = (FileRefConPtr)CMGetValueRefCon(value);
    CMCount       unused1 = offset;
    CMSize        unused2 = size;
    CMPtr         unused3 = buffer;

CMError(refCon->sessionData, "Insertions into a file \"^0\" for container \"^1\" are not
supported",
            refCon->pathname, CMReturnContainerName(CMGetValueContainer(value)));
}

/*----------------------------------------------------------------*
 | deleteValueData_Handler - CMDeleteValueData() dynamic value handler |
 *----------------------------------------------------------------*

If supported, deletes size bytes from the file starting at the offset. However, in this
 example, for indirection to a file of data, we simply report an error that this
 functionality is not supported. Standard stream C I/O is used to implement these handlers
 for portability. There is no (legal and portable) way to delete data from a stream file.
*/ static void deleteValueData_Handler(CMValue value, CMCount offset, CMSize size)
{
    FileRefConPtr refCon = (FileRefConPtr)CMGetValueRefCon(value);
    CMCount       unused1 = offset;
    CMSize        unused2 = size;

CMError(refCon->sessionData, "Deletions of data in a file \"^0\" for container \"^1\" are
not supported",
            refCon->pathname, CMReturnContainerName(CMGetValueContainer(value)));
}

/*----------------------------------------------------------------*
 | getValueInfo_Handler - CMGetValueInfo() dynamic value handler |
 *----------------------------------------------------------------*

The specified information for the refNum associated with a indirect file value is
 returned. A parameter may be NULL indicating that info is not needed.

We always want the info for the dynamic value's base value. This means we would simply
 do a CMGetBaseValue() and pass the resulting value to CMGetValueInfo(). If that's all we
 need to do we can let the Container Manager do it!  Its automatic handler inheritance
 will do it.

Based on this fact, we show the function code (all one line of it).  The
 fileValueMetahandler() returned NULL for this handler indicating it isn't used for this
 dynamic value.
*/ static void getValueInfo_Handler(CMValue value, CMContainer *container, CMObject *object,
                                 CMProperty *property, CMType *type,
                                 CMGeneration *generation)
{
    CMGetValueInfo(CMGetBaseValue(value), container, object, property, type, generation);
}

/*----------------------------------------------------------------*
 | setValueType_Handler - CMSetValueType() dynamic value handler |
 *----------------------------------------------------------------*

The type ID from the type is set for the specified value.
```

Attorney Docket No.: APPL: P-1120 MCF/WSW
wsw/appl/1120.001

- 174 -

```
      See comments in getValueInfo_Handler() above for the reason this code is not used.
    */
 5  static void setValueType_Handler(CMValue value, CMType type)
    {
      CMSetValueType(CMGetBaseValue(value), type);
    }
10
    /*-----------------------------------------------------------------*
    | setValueGeneration_Handler - CMSetValueGeneration() dynamic value handler |
    *-----------------------------------------------------------------*
    The generation for the specified subvalue is set. The generation number must be greater
    than or equal to 1.

See comments in getValueInfo_Handler() above for the reason this code is not used.
    */
    static void setValueGeneration_Handler(CMValue value, CMGeneration generation)
    {
      CMSetValueGeneration(CMGetBaseValue(value), generation);
25  }

/*-----------------------------------------------------------------*
    | releaseValue_Handler - CMReleaseValue() dynamic value handler |
30  *-----------------------------------------------------------------*

The association between the refNum and the indirect file dynamic value is destroyed.
    There should be no further operations on the value once this routine is called. This
    handler is only called if this is the LAST use of the dynamic value.
35
    A count is kept by the Container Manager of every CMUseValue() and CMNewValue(). Calling
    CMReleaseValue() reduces this count by one. When the last release is done on the dynamic
    value, this handler will be called.

    Note, in the context of these file values, the only thing to do here is close the file,
    and free the refCon memory.

Warning!  It is an error for the release handler to release its passed base value. It can
    free any other values, just not its base. The reason is that the Container Manager is
    responsible for calling the release handlers for all base types.
    */ static void releaseValue_Handler(CMValue value)
    {
      FileRefConPtr refCon = (FileRefConPtr)CMGetValueRefCon(value);
      CMSession      sessionData = refCon->sessionData;

fclose(refCon->f);
      CMFree(refCon, sessionData);            /* close the file                */
    }                                          /* free our refCon              */
                              CM_END_CFUNCTIONS
```

We claim:

1. A computer system, comprising:

storage means for storing a software object and an indication of whether the software object is registered as a real value or a dynamic value, the storage means also for storing a data access handler and for storing a chain of dynamic value handlers if the software object is the dynamic value wherein each dynamic value handler calls a subsequent dynamic value handler in the chain and wherein a bottom dynamic value handler in the chain calls the data access handler;

processor that determines whether the software object is registered as a real value or a dynamic value, the processor executing the chain of dynamic value handlers if the software object is registered as the dynamic value such that the data access handler returns one or more data values from the software object to the chain of dynamic value handlers and each dynamic value handler in the chain performs a data conversion operation on the data values, the processor executing only the data access handler to obtain the data values from the software object if the software object is registered as the real value.

2. The computer system of claim 1, wherein the processor assembles the chain of dynamic value handlers for the software object into the storage means in response to a request for access to the software object.

3. The computer system of claim 2, wherein the chain of dynamic value handlers is specified by a hierarchical tree structure that corresponds to the software object.

4. The computer system of claim 3, wherein the processor executes the chain of dynamic value handlers and the data access routine according to a calling sequence specified by the hierarchical tree structure.

5. The computer system of claim 4, wherein the processor determines the calling sequence by performing a depth-first post-order walk on the hierarchical tree structure.

6. The computer system of claim 1, wherein one of the data conversion operations comprises a data decompression operation on the data values obtained from the software object.

7. The computer system of claim 1, wherein one of the data conversion operations comprises a format conversion operation on the data values obtained from the software object.

8. The computer system of claim 1, wherein the storage means comprises a disk and the data access handler comprises a read file routine for accessing a file system on the disk.

9. The computer system of claim 1, wherein the storage means comprises a memory and the data access handler causes the processor to perform a read operation to the memory.

10. The computer system of claim 1, wherein the storage means comprises a persistent storage means and the data access handler causes the processor to perform an input/output to the persistent storage means.

11. A method for accessing a software object, comprising the steps of:

registering the software object as a dynamic value if a data access operation and a chain of one or more data conversion operations are required to access the software object;

registering the software object as a real value if only the data access operation is required to access the software object;

determining whether the software object is registered as a real value or a dynamic value in response to a request to access the software object;

if the software object is registered as the dynamic value, then performing the data access operation on the software object to obtain one or more data values from the software object and then performing each data conversion operation in the chain on the data values;

if the software object is registered as the real value, then performing the data access operation on the software object to obtain the data values from the software object.

12. The method of claim 11, wherein each data conversion operation in the chain is performed by a corresponding dynamic value handler of a chain of dynamic value handlers for the software object.

13. The method of claim 12, wherein the step of registering the software object as a dynamic value includes the step of defining a hierarchical tree structure corresponding to the software object such that the hierarchical tree structure specifies the chain of dynamic value handlers.

14. The method of claim 13, wherein the step of performing each data conversion operation in the chain includes the step of determining a calling sequence for the chain of dynamic value handlers wherein the calling sequence is specified by the hierarchical tree structure.

15. The method of claim 14, wherein the step of determining the calling sequence for the chain of dynamic value handlers includes the step of performing a depth-first post-order walk on the hierarchical tree structure.

16. The method of claim 11, wherein the data conversion operations include a data decompression operation on the data values from the software object.

17. The method of claim 11, wherein the data conversion operations include a format conversion operation on the data values from the software object.

18. The method of claim 11, wherein the data access operation comprises a file system access operation.

19. The method of claim 11, wherein the data access operation comprises a memory read operation.

20. The method of claim 11, wherein the data access operation comprises an input/output operation.

21. An apparatus for accessing a software object, comprising:

means for registering the software object as a dynamic value if a data access operation and a chain of one or more data conversion operations are required to access the software object;

means for registering the software object as a real value if only the data access operation is required to access the software object;

means for determining whether the software object is registered as a real value or a dynamic value in response to a request to access the software object;

means for performing the data access operation on the software object to obtain one or more data values from the software object and then performing each data conversion operation in the chain on the data values if the software object is registered as the dynamic value;

means for performing the data access operation on the software object to obtain the data values from the software object if the software object is registered as the real value.

22. The apparatus of claim 21, wherein each data conversion operation in the chain is performed by a corresponding dynamic value handler of a chain of dynamic value handlers for the software object.

23. The apparatus of claim 22, wherein the means for registering the software object as a dynamic value includes means for defining a hierarchical tree structure corresponding to the software object such that the hierarchical tree structure specifies the chain of dynamic value handlers.

24. The apparatus of claim 23, wherein the means for performing each data conversion operation in the chain includes means for determining a calling sequence for the chain of dynamic value handlers wherein the calling sequence is specified by the hierarchical tree structure.

25. The apparatus of claim 24, wherein the means for determining the calling sequence for the chain of dynamic value handlers includes means for performing a depth-first post-order walk on the hierarchical tree structure.

26. The apparatus of claim 21, wherein the means for performing each data conversion operation includes means for performing a data decompression operation on the data values from the software object.

27. The apparatus of claim 21, wherein the means for performing each data conversion operation includes means for performing a format conversion operation on the data values from the software object.

28. The apparatus of claim 21, wherein the means for performing the data access operation comprises means for performing a file system access operation.

29. The apparatus of claim 21, wherein the means for performing the data access operation comprises means for performing a memory read operation.

30. The apparatus of claim 21, wherein the means for performing the data access operation comprises means for performing an input/output operation.

* * * * *